United States Patent
Molina et al.

(10) Patent No.: US 12,291,407 B2
(45) Date of Patent: May 6, 2025

(54) MODULAR STACK MOVER

(71) Applicant: Dexterity, Inc., Redwood City, CA (US)

(72) Inventors: Matthew Rodolfo Molina, San Francisco, CA (US); Cuthbert Sun, San Francisco, CA (US); Robert Holmberg, Mountain View, CA (US); Jason Kmec, Vacaville, CA (US)

(73) Assignee: Dexterity, Inc., Redwood City, CA (US)

( * ) Notice: Subject to any disclaimer, the term of this patent is extended or adjusted under 35 U.S.C. 154(b) by 150 days.

(21) Appl. No.: 17/963,761

(22) Filed: Oct. 11, 2022

(65) Prior Publication Data
US 2023/0115863 A1     Apr. 13, 2023

Related U.S. Application Data

(60) Provisional application No. 63/254,912, filed on Oct. 12, 2021.

(51) Int. Cl.
| | | |
|---|---|---|
| *B65G 35/06* | (2006.01) | |
| *B65G 19/02* | (2006.01) | |
| *B65G 19/20* | (2006.01) | |
| *B65G 43/10* | (2006.01) | |
| *B65G 47/68* | (2006.01) | |
| *B65G 47/90* | (2006.01) | |
| *B65G 61/00* | (2006.01) | |

(52) U.S. Cl.
CPC ......... *B65G 47/905* (2013.01); *B65G 19/02* (2013.01); *B65G 19/205* (2013.01); *B65G 35/06* (2013.01); *B65G 43/10* (2013.01); *B65G 47/684* (2013.01); *B65G 61/00* (2013.01); *B65G 2811/0673* (2013.01)

(58) Field of Classification Search
CPC ...... B65G 19/02; B65G 19/205; B65G 35/06; B65G 43/10; B65G 47/684; B65G 47/905; B65G 61/00; B65G 2811/0673
USPC ........................................ 198/725
See application file for complete search history.

(56) References Cited

U.S. PATENT DOCUMENTS

| | | | |
|---|---|---|---|
| 5,363,310 A | * | 11/1994 | Haj-Ali-Ahmadi ......... G06Q 10/087 705/28 |
| 8,276,739 B2 | * | 10/2012 | Bastian, II ........... B65G 1/1375 414/277 |

(Continued)

FOREIGN PATENT DOCUMENTS

| | | |
|---|---|---|
| CN | 112693832 | 10/2022 |
| TW | 201936467 | 9/2019 |

(Continued)

*Primary Examiner* — Douglas A Hess
(74) *Attorney, Agent, or Firm* — Van Pelt, Yi & James LLP

(57) ABSTRACT

The present application discloses a robotic modular stack mover system, and a method and a computer system for controlling the robotic modular pusher system. The robotic modular stack mover system includes a first stack mover system configured to cause a vehicle to traverse a first path and a second stack mover system configured to cause the vehicle to traverse a second path. The first stack mover system moves the vehicle along the first path from a source location to a first end location. The vehicle is retrieved from the first end location and the second mover system moves the vehicle along the second path to a destination location.

39 Claims, 30 Drawing Sheets

(56) References Cited

U.S. PATENT DOCUMENTS

| | | | | |
|---|---|---|---|---|
| 9,481,518 B2 * | 11/2016 | Neiser | ............... | B65G 1/1373 |
| 9,738,455 B2 * | 8/2017 | Neiser | ................ | B65G 43/08 |
| 9,969,561 B2 * | 5/2018 | Rhodes, II | ............ | B65G 35/06 |
| 10,144,589 B2 * | 12/2018 | Yamashita | ........... | B65G 1/1378 |
| 10,336,561 B2 * | 7/2019 | Gondoh | ............ | G06Q 10/043 |
| 10,843,333 B2 * | 11/2020 | Wagner | ............... | B25J 9/0093 |
| 11,629,017 B2 * | 4/2023 | Gondoh | ............... | B25J 9/1697 |
| | | | | 414/796.9 |
| 2003/0136086 A1 | 7/2003 | Kalany | | |
| 2018/0273222 A1 | 9/2018 | Jacobs | | |
| 2019/0119049 A1 | 4/2019 | King | | |
| 2021/0114817 A1 | 4/2021 | Choplin | | |
| 2021/0139240 A1 | 5/2021 | Kapust | | |

FOREIGN PATENT DOCUMENTS

| | | |
|---|---|---|
| WO | 2011038442 | 4/2011 |
| WO | 2019003753 | 1/2019 |

\* cited by examiner

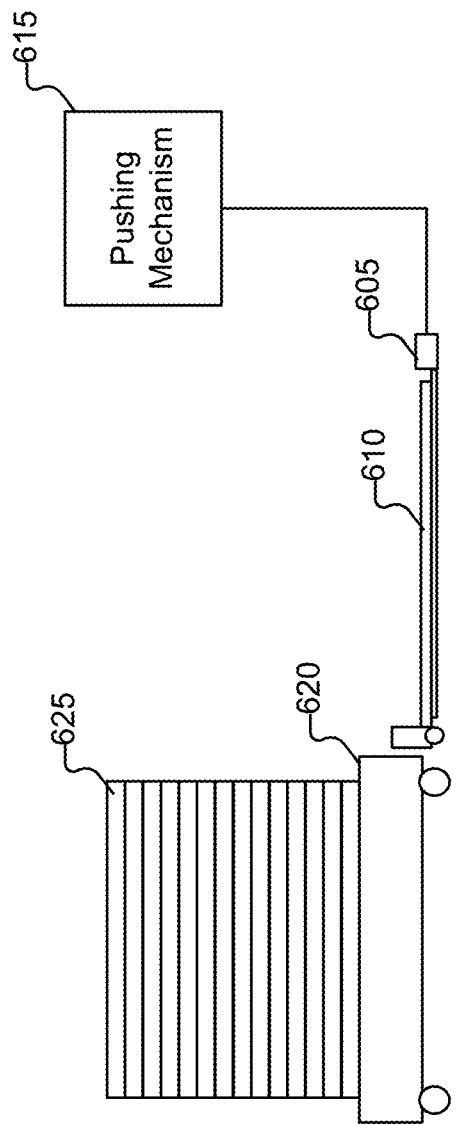

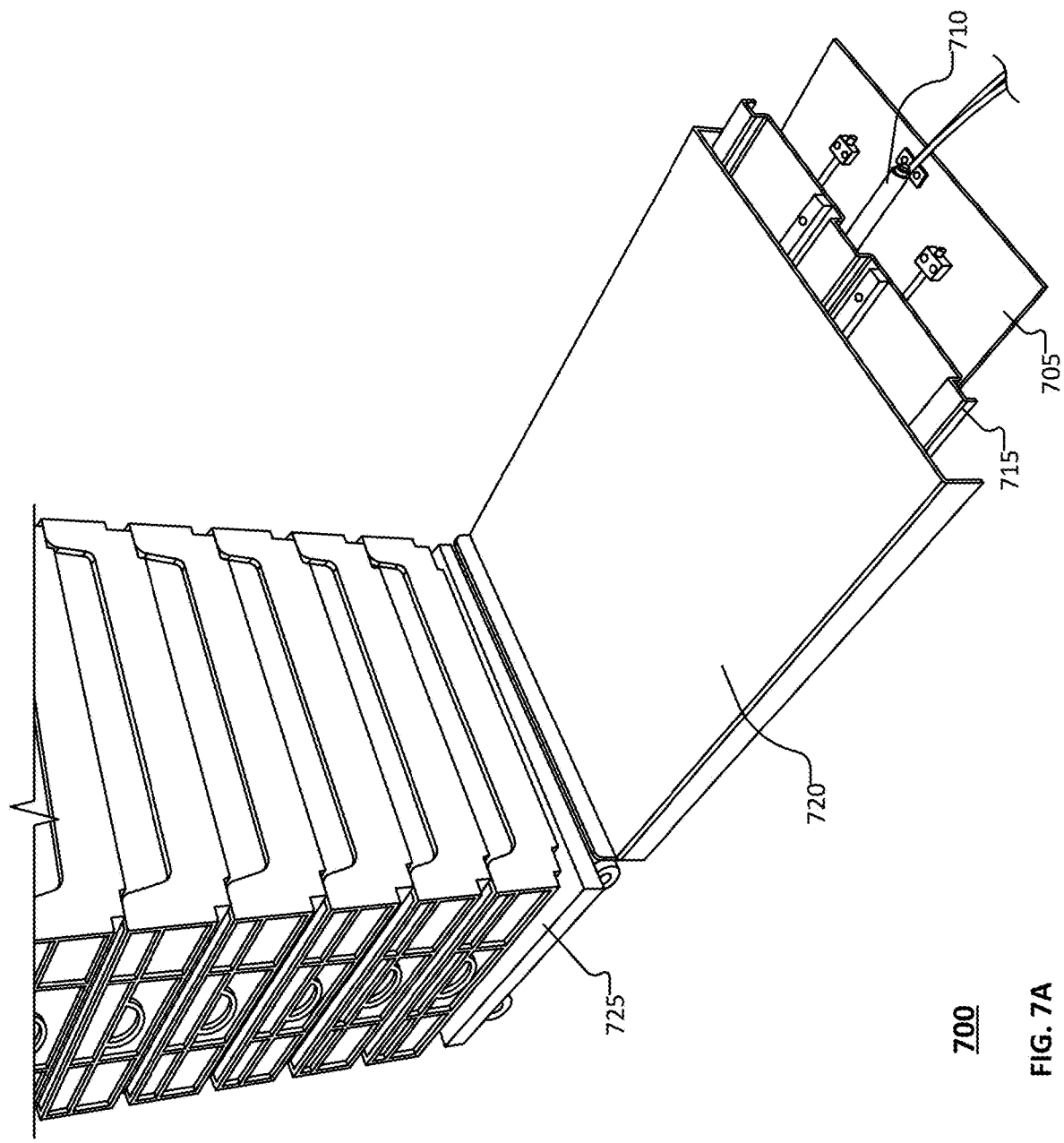

MODULAR STACK MOVER

CROSS REFERENCE TO OTHER APPLICATIONS

This application claims priority to U.S. Provisional Patent Application No. 63/254,912 entitled MODULAR STACK MOVER filed Oct. 12, 2021 which is incorporated herein by reference for all purposes.

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

FIG. 6A is a block diagram illustrating a stack pusher system according to various embodiments.

FIG. 7A is a diagram illustrating a stack pusher according to various embodiments.

DETAILED DESCRIPTION

Figure 1A:
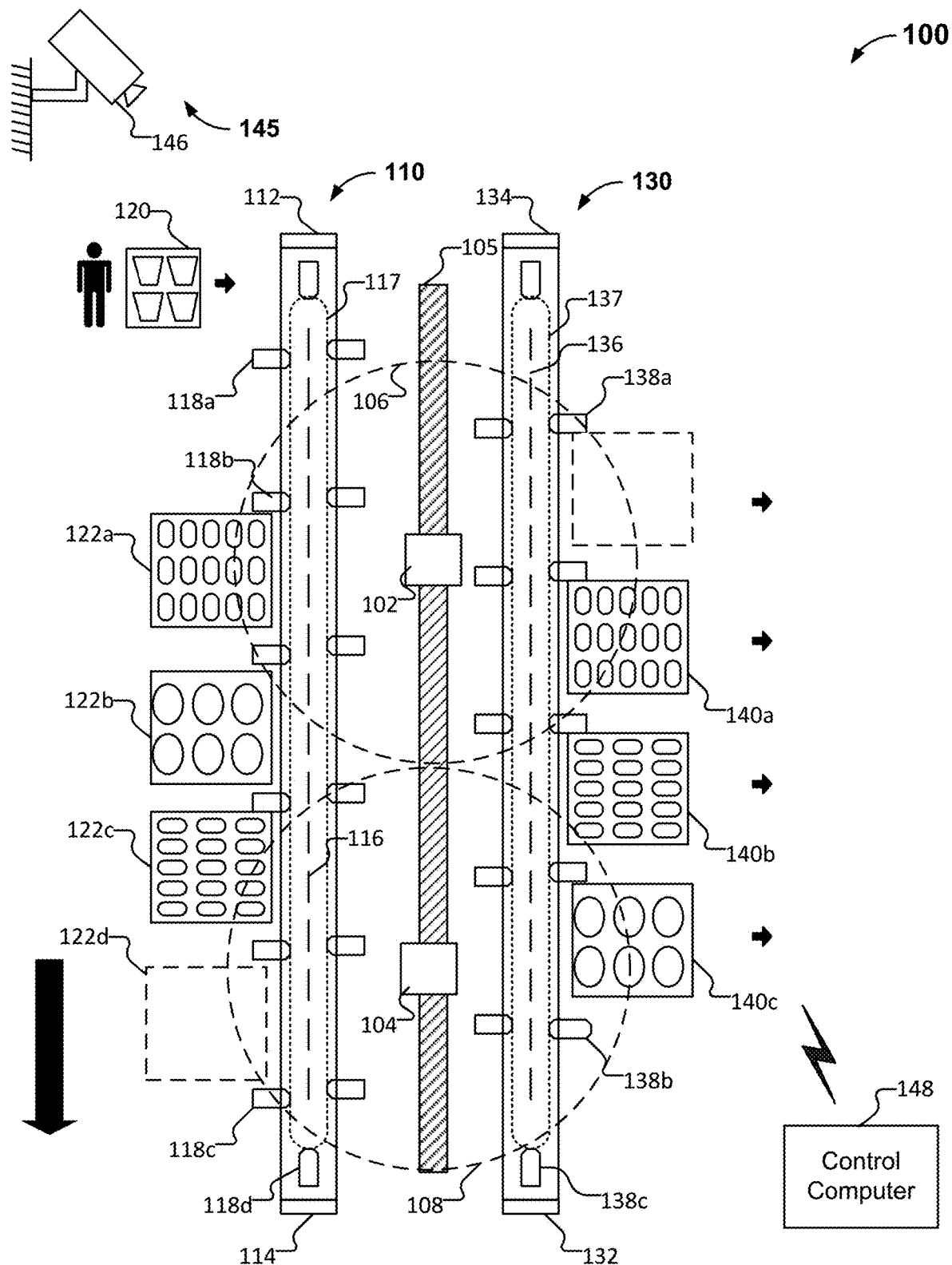
FIG. 1A is a block diagram illustrating a robotic line kitting system according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a vehicle means a cart, a trolley, a dolly, carriage, wagon, pallets, or other structure configured to hold or support one or more items such as trays (e.g., a stack of trays).

As used herein, a kitting system may comprise a robot arm configured to move one or more objects such as in connection with assembling kits and/or packaging kits. In various embodiments, a kitting machine as disclosed herein may comprise one or more kitting shelf machine modules, each comprising a modular component.

Chain driven stack mover systems allow for serialized conveyance of payloads (e.g., vehicles carrying a stack of trays). For example, a stack mover system may comprise a single chain drive with pusher units (e.g., teeth) spaced apart to accommodate a payload. A payload may be placed into a position and engaged (e.g., pushed from behind) by a pusher unit, which pushes/pulls the payload alongside the chain drive (e.g., in a defined channel or path, into successive positions that enable one or more robotic arms (e.g., mounted on a rail that runs alongside the stack mover system) to pick/place items from/to the vehicle (e.g., a topmost tray), and add/remove trays to/from the stack, etc.

Chain driven stack movers are difficult to scale in length because of limitations of cost and mechanical output capabilities for a single drivetrain. Further, related art chain driven stack movers are restricted to a linear path. For example, related art chain driven stack movers are not extensible to move vehicles in paths with turns, etc., in order to maximize the use of a warehouse space or workspace of a robot.

Various embodiments include a modular stack mover system. The modular stack mover system may be configured to move vehicles (e.g., dollies, carts, stacks of objects/trays, etc.) from an input end (also referred to as a source location) to an end location (also referred to as a destination location). The modular stack mover system comprises a plurality of stack mover systems. For example, the modular stack mover system comprises a first stack mover system and a second stack mover system. The first stack mover system is configured to cause a vehicle to traverse a first path (e.g., a path from a source location to a first end location). The second stack mover system is configured to cause the vehicle to traverse a second path (e.g., a path from the first end location or input end of the second mover system to a destination location). The first stack mover system and/or second stack mover system may be configured to push or pull the vehicle along their respective paths. As an example, a stack mover system may comprise a plurality of pusher units that are mounted (or otherwise connected) to a drive chain that is driven by a motor, and as the drive chain is driven, the pusher units push the vehicle (e.g., apply a linear force to the vehicle such as in the direction of the path along which the stack mover system is configured to move the vehicle).

Various embodiments include a kitting system. The kitting system may be configured to perform one or more pick/place operations with respect to a tray or other receptacle, such as a tray of a stack of trays carried by a vehicle (e.g., a dolly, a cart, etc.). The kitting system includes a modular stack mover system, a robot arm, and a control computer. The kitting system may further include a stack pusher system and/or a buffer zone (e.g., a buffer conveyance structure). The modular stack mover system comprises a plurality of stack mover systems. For example, the modular stack mover system comprises a first stack mover system and a second stack mover system. The first stack mover system is configured to cause a vehicle to traverse a first path (e.g., a path from a source location to a first end location). The second stack mover system is configured to cause the vehicle to traverse a second path (e.g., a path from the first end location or input end of the second mover system to a destination location). In some embodiments, the second stack mover system retrieves the vehicle from the first end location (e.g., the first end location can correspond to a source location for the second stack mover system). In some embodiments, the system comprises a buffer zone between the first stack mover system and the second stack mover system. For example, the system uses a buffer conveyance structure or a stack pusher system to advance the vehicle from the first end location of the first mover system to the input end (e.g., the source location) of the second stack mover system. The control computer is configured to robotically control the modular stack mover system (e.g., the first stack mover system and the second stack mover system, etc.) and the robot arm in coordination to move the vehicle through the workspace and to pick/place items from/to the vehicle. The control computer may further control a stack pusher and/or buffer conveyance structure in coordination with the modular stack mover system.

According to various embodiments, a robotic stack pusher system comprises an actuation device and a plurality of pusher structures. The pusher structures in the plurality of pusher structures are nested when the system is in a retracted state. For example, any one pusher structure is at least partially enveloped by a previous pusher structure (if any) in the system. The system controls the actuation device that causes the plurality of pusher structures to telescopically extend from the retracted state to an extended state. As the plurality of pusher structures extend to the extended state, at least one of the pusher structures engages a payload (e.g., a stack of receptacles such as on a dolly) to load the payload to the robot workspace (e.g., to a robotic stack mover system that is configured to move the payload through the robot workspace (e.g., to move the payload to within operable range of one or more robots for the robot(s) to perform a kitting operation with respect to the payload). The kitting operation may include unloading a set of receptacles (e.g., trays) in the payload. For example, the robot picks items from a receptacle in the payload and places the items on a conveyance structure or other destination location. The kitting operation may include loading a set of receptacles in the payload. For example, the payload may be a stack of empty trays. A robot may pick items from a source location (e.g., a conveyance structure that carries items to the robot workspace) the robot sequentially places the items in the trays.

In response to determining to move the vehicle, the system controls to move the vehicle to the destination location (e.g., according to a determined plan). For example, the system actuates a driving unit (e.g., the system drives a motor) to cause the vehicle to move to the destination location. In response to determining that a kitting operation performed with respect to the vehicle is complete (e.g., all items are de-stacked from the vehicle, a stacking of a set of items is complete, etc.), the system controls to move the vehicle to a vehicle return location and/or to move another vehicle to the destination location. Further, in response to determining that the kitting operation performed with respect to the vehicle is complete, the system controls the robotic stack pusher system to move another payload (e.g., payload on a vehicle such as a dolly) to the payload introduction location and controls the robotic stack mover system to move a next payload to the destination location.

In various embodiments, a modular stack mover system is provided. The modular stack mover system may include two or more modules (e.g., a first mover system and a second mover system, etc.) that collectively move a vehicle through a workspace. The two or more modules may be chained together or otherwise linked together to provide a longer stack mover and/or to provide a system that is not a single line (e.g., the modules may be arranged to move the vehicle along a path that turns, wraps around, etc. In various embodiments, the modular stack mover incorporates and/or provides one or more of integration into multiple robot configurations, system decoupling, and synchronization.

In some embodiments, modular stack mover systems as disclosed herein may be positioned parallel to each other or at right angles to each other (e.g., to form an "L" or "U" shaped moving system or path along which the vehicle is moved).

In various embodiments, a modular stack mover as disclosed herein and/or another stack mover, other robotically controlled instrumentality, and/or human worker, and/or some combination thereof, is used to advance a vehicle (e.g., a stack of trays) into a buffer position (e.g., a buffer zone), and a robotically controlled pusher or other instrumentality is used to push the vehicle into a receiving position from which a receiving stack mover (or other robotically controlled instrumentality) is configured to push/pull the vehicle into the receiving stack mover and to move the vehicle, such as along a linear channel or guide defined by and/or otherwise associated with the receiving stack mover system.

In various embodiments, partly overlapping single chain movers (e.g., stack mover systems), each engaging the vehicle (e.g., the stack of trays) from an opposite side, enables one mover (e.g., a first stack mover system) to advance the stack into the overlap zone (also referred to herein as a transition zone), and then the other mover (e.g., a second stack mover system) engages the stack and moves the stack along its path (e.g., a linear path defined by a guide rail, drive chain, etc.).

Although embodiments described herein are provided in the context of a kitting system or picking and placing items from a tray, various embodiments may be implemented in various other contexts such as palletizing systems, singulation systems, etc. For example, although the robotic stack pusher system is described herein in the context of a kitting system in which a robot arm is controlled to perform kitting operation with respect to items in a payload (e.g., a stack of receptacles, etc.), the robotic stack pusher system may be deployed in various other systems, such as a palletization system, a singulation system etc. For example, the robotic stack pusher system may be used in a palletization system such as in connection with introducing (e.g., pushing) a pallet to a robot workspace for depalletization. As another example, the robotic stack pusher system may be used in a singulation system, such as in connection with moving a stack of trays comprising items that have been singulated, etc.

In some embodiments, the system comprises a robotic stack pusher system that loads payloads (e.g., pushes stacks of trays) to a robotic stack mover system that is configured to move the payloads through the robot workspace. An example of a robotic stack mover system is further described in U.S. patent application Ser. No. 17/713,077 filed on Apr. 4, 2022, the entirety of which is hereby incorporated herein for all purposes.

As used herein, depalletization includes picking an item from a pallet, such as from a stack of items on the pallet, moving the item, and placing the item at a destination location such as a conveyance structure. An example of palletization/depalletization system and/or process for palletizing/de-palletizing a set of items is further described in U.S. patent application Ser. No. 17/343,609, the entirety of which is hereby incorporated herein for all purposes.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of singulation system and/or process for singulating a set of items is further described in U.S. patent application Ser. No. 17/246,356, the entirety of which is hereby incorporated herein for all purposes.

As used herein, kitting includes the picking of one or more items/objects from corresponding locations and placing the one or more items in a predetermined location in a manner that a set of the one or more items correspond to a kit. An example of a kitting system and/or process for kitting a set of items is further described in U.S. patent application Ser. No. 17/219,503, the entirety of which is hereby incorporated herein for all purposes. Another example of a kitting system and/or process for kitting a set of items is further described in U.S. patent application Ser. No. 16/224,513 filed on Dec. 18, 2018, entitled "Robotic Kitting System" (published on Mar. 26, 2020 as United States Patent Application Publication No. 2020/0095001), the contents of which are incorporated herein for all purposes.

FIG. 1A is a block diagram illustrating a robotic line kitting system according to various embodiments. In the example shown, system 100 includes a robotic stack mover system 110. System 100 uses robotic stack mover system 110 to move (e.g., along a path) tray stacks 122a, 122b, and 122c (e.g., or vehicles in which stacks of trays are comprised or are to be loaded) in position for robot arms 102 and 104 to perform kitting operations such as de-stacking tray stacks 122a, 122b, and 122c, or stacking trays or placing items on trays of stacks of trays. In some embodiments, system 100 controls robotic stack mover system 110 to move tray stacks 122a, 122b, and 122c to respective locations within, or in proximity to, workspaces of robot arms 202 and 104 (e.g., which may correspond to ranges 106 and 108). Robotic stack mover system 110 autonomously moves stacks of trays (or other vehicles) that are inserted to robotic stack mover system 110 (e.g., a predefined insertion location, between pusher units, etc.).

In various embodiments, robotic stack mover system 110 includes a driving unit 112 configured to move tray stacks 122a, 122b, and 122c such as by driving a mechanism to apply respective forces on tray stacks 122a, 122b, and 122c. As an example, the driving unit 112 comprises a motor that is driven based at least in part on a determination to move the tray stacks 122a, 122b, and 122c. System 100 may control the motor via computer control such as by control computer 148 operatively connected to robotic stack mover system 110. In various embodiments, driving unit 112 further includes one or more driving sprockets that are actuated in response to the motor being driven. For example, the motor is connected to at least one of the one or more driving sprockets, and in response to the motor being driven forces are translated from the motor to the one or more driving sprockets. Alternatively, or in addition, driving unit 112 may comprise a crank pulley or other mechanism to drive movement of a drive chain, belt, etc.

In various embodiments, robotic stack mover system 110 includes a tensioning unit 114. Tensioning unit 114 may be part of the drive system of robotic stack mover system 110 and ensures the drive system has sufficient tension. In addition, tensioning unit 114 may serve as a recirculation point for the drive system (e.g., a drive chain is redirected and recirculated back to driving unit 112). In some embodiments, tensioning unit 114 comprises one or more tensioning sprockets. At least one tensioning sprocket of the one or more tensioning sprockets is movably mounted in a manner that the at least one tension sprocket changes a tension of the drive chain when the at least one tensioning sprocket is moved. The at least one tensioning sprocket that is movably mounted to tensioning unit 114 may be moved/adjusted via manual intervention such as by a user, or via control of a computer system of system 100. The tensioning unit is configured to adjust/enforce a tension in the drive chain of robotic stack mover system 110.

In various embodiments, robotic stack mover system 110 includes drive chain 117. Drive chain 117 traverses the distance between driving unit 112 and tensioning unit 114. Drive chain 117 receives force from driving unit 112 to cause drive chain 117 to move (e.g., to circulate within robotic stack mover system 110). In some embodiments, drive chain 117 is a double-pitch chain having a profile that comprises a hole or recess in which a tooth of a driving sprocket fits for the driving unit to engage drive chain 117.

In some embodiments, drive chain 117 is a belt made such as a thermoplastic belt. Robotic stack mover system 110 may further include guide rail 116 that is configured to provide support for drive chain 117 to ensure that drive chain 117 traverses a longitudinal direction between driving unit 112 and tensioning unit 114. The longitudinal direction of guide rail 116 may be parallel to (or similar to) the direction of rail 105 along which robot arms 102 and 104 (e.g., and on which robot arms 102 and 104 are mounted such as via robot carriages) traverse to pick and place items (e.g., trays, objects from trays, carts, etc.).

In the example shown in FIG. 1A, drive chain 117 includes a set of pusher units such as pusher units 118a, 118b, 118c, and 118d. The pusher units of the set of pusher units may be disposed at a predetermined distance along drive chain 117. The predetermined distance may be determined based on a dimension of a vehicle, or an object such as a tray or tray stack. For example, the predetermined distance may be 25% greater than the dimension (e.g., length) of a tray or tray stack. As another example, the predetermined distance may be 10% greater than the dimension (e.g., length) of a tray or tray stack. As another example, the predetermined distance may be 15% greater than the dimension (e.g., length) of a tray or tray stack. As another example, the predetermined distance may be 50% greater than the dimension (e.g., length) of a tray or tray stack. In some embodiments, the predetermined distance between two adjacent pusher units (e.g., pusher unit 118a and pusher unit 118b) is sufficiently large for a vehicle (e.g., a tray stack such as tray stack 122a, 122b, and 122c) to be inserted (e.g., with ease) between the two adjacent pusher units. For example, the predetermined distance is set to be equal to the sum of a dimension of the vehicle (e.g., a length, a width, etc.) and a buffer spacing (e.g., 1 to 6 inches, etc.). In various embodiments, the predetermined distance between the pusher units is configurable. For example, system 100 or a human operator may adjust spacing of pusher units by moving a subset of pusher units and/or by removing a subset of pusher units. The pusher units may be mounted on drive chain 117 (e.g., bolted to a bracket on a link of drive chain 117, etc.), or integral with the drive chain 117 such as by a ridge or other structure.

In various embodiments, the pusher units are configured to provide support for the pushing (e.g., exerting force on) a vehicle such as tray stack 122a, 122b, and 122c. As drive chain 117 is driven (e.g., by a driving sprocket), the pusher units respectively move and cause vehicles with which the pusher units are engaged to move. The pusher unit may be made of various materials such as metals or alloys. The material of the pusher unit may be selected based on a rigidity and/or hardness to ensure that the pusher unit properly moves the vehicles (e.g., the pusher units do not deform when engaged with the vehicle or deform less than a predetermined deformation threshold). The pusher units may have various profiles that are selected based at least in part on a configuration of an implementation of robotic stack mover system 110. For example, as illustrated in FIG. 1A, pusher units 118a, 118b, 118c, and 118d are sufficiently large (e.g., extend from the drive chain) to engage the corresponding vehicle. As another example, pusher units 118a, 118b, 118c, and 118d comprise a chamfer at a proximal end of the pusher units 118a, 118b, 118c, and 118d (e.g., the end connected to drive chain 117). The chamfer on the pusher units may be configured based on a size and geometry of robotic stack mover system 110 (e.g., the geometry of the drive chain 117 when sufficiently taut between driving unit 112 and tensioning unit 114). For example, the chamfer is configured to ensure that a pusher unit has clearance at driving unit 112 and tensioning unit 114 during recirculation of drive chain 117. As illustrated in FIG. 1A, pusher unit 118*d* is recirculating (e.g., changing direction) at an end of robotic stack mover system 110 at which tensioning unit 114 is located. As pusher unit traverses the curvature of the recirculation, the chamfer ensures provides sufficient clearance between the pusher unit and adjacent pusher units, other links in drive chain 117, etc. In some embodiments, a pusher unit has a chamfer on a distal end (e.g., an end opposing the end attached to the drive chain). For example, pusher unit 138*b* of robotic stack mover system 130 comprises a chamfer at the distal end and the proximal end. A chamfer on the distal end of a pusher unit promotes the insertion/removal of vehicles from a space between adjacent pusher units. For example, the chamfer on the distal end serves to guide stacks of trays into and/or out of the space between adjacent pusher units. In various embodiments, pusher units comprise chamfers at the distal end, the proximal end, or both.

In various embodiments, the tray stacks 120, 122*a*, 122*b*, 122*c* may be pushed manually into an insertion zone. The insertion zone may be located at a beginning of the path which the tray stacks traverse when robotic stack mover system 110 moves the tray stack. For example, as illustrated in FIG. 1A, tray stack 120 is inserted at an end of robotic stack mover system 110 at which driving unit 112 is located. Tray stack 120 may be manually inserted into the insertion zone when a pusher unit is not within the insertion zone (e.g., when the tray stack can be inserted between two adjacent pusher units). In various embodiments, insertion of tray stacks may be automated, such as via robotic control of a stack pusher system that inserts/loads the tray stacks to an input end of robotic stack mover system 110. For example, an insertion structure may insert tray stacks at a time determined based on one or more of (i) a location of at least one pusher unit (e.g., relative locations of pusher units may be determined if a predetermined spacing between pusher units is known), (ii) a determination that no pusher units are located within insertion zone (e.g., appropriate clearance is provided for proper insertion), (iii) a speed at which drive chain 117 is being inserted, (iv) an order in which tray stacks are to be de-stacked (or filled by stacking of trays, etc.), (v) a manifest corresponding to the particular tray stack (e.g., a list of items on the tray stack, or that are to be loaded onto tray stack), (vi) a state of robot arm 102 or 104, etc. As an example, the insertion structure may comprise a conveyor (e.g., a conveyor belt) that moves the tray stack from a source location to the insertion zone. As another example, a robot may be controlled to insert the tray stack to the insertion zone. Upon insertion of the tray stack to robotic stack mover system 110, robotic stack mover system autonomously advances the source tray stacks (e.g., tray stacks 122*a*, 122*b*, and/or 122*c*) through the workspace (e.g., defined by robotic stack mover system 110 or guide rail 116). In various embodiments, tray stacks may be inserted at other locations where a space between adjacent pusher units is available (e.g., no tray stack occupies the space). For example, tray stack 122*b* may be inserted at its location as robot arm 102 is de-stacking tray stack 122*a* and/or robot arm 104 is de-stacking tray stack 122*c*. In some embodiments, tray stacks are inserted at a spacing that comprises at least N pusher units, where N is an integer. For example, in some implementations tray stacks may occupy adjacent spaces between pusher units such as shown with tray stacks 122*a*, 122*b*, and/or 122*c*. As another example, in some implementations tray stacks are inserted every other set of pusher units such as to avoid adjacent tray stacks, such as shown with tray stack placeholder 122*d*. The tray stack placeholders (e.g., spaces with no tray stacks inserted between adjacent pusher units) may be implemented to provide clearance between tray stacks and to ensure that robot arms 102, 104 do not collide with adjacent tray stacks while picking and placing items (e.g., trays) to/from tray stacks. In some embodiments, the system uses tray stack placeholders if the system determines that a height of a particular tray stack exceeds a predetermined height threshold.

In some embodiments, tray stacks 122*a*, 122*b*, and/or 122*c* may be advanced through/by robotic stack mover system 110 under robotic control. For example, the speed and times at which the tray stacks 122*a*, 122*b*, and/or 122*c* are advanced by/through robotic stack mover system 110 may be controlled to facilitate efficient grasping of trays from the tray stacks 122*a*, 122*b*, and/or 122*c*.

In the example shown, a single rail (e.g., rail 105) is disposed along one long side of the robotic stack mover system 110. In this example, two robots, one comprising robot arm 102 and another comprising robot arm 104, are mounted movably, independent of one another, on rail 105. For example, each robot arm 102, 204 may be mounted on a self-propelled chassis that rides along rail 105. In various embodiments, each robot arm 102, 204 terminates with an end effector used to perform the kitting operations. In an implementation in which tray stacks are stacked or de-stacked, robot arms 102 or 104 may terminate with a tray handling end effector. In an implementation in which objects are picked and placed from the vehicles, robot arm 102, 104 may terminate with a suction-based end effector, a pincher end effector, etc. The end effector(s) of robot arm 102 and/or robot arm 104 are operated under robotic control. The robotic control may be determined based on a plan for picking/moving/placing the items (e.g., trays) and/or information pertaining to the workspace, such as presence of objects within the range 106 (e.g., workspace) of robot arm 102 or range 208 (e.g., workspace) of robot arm 104.

System 100 comprises vision system 145. In various embodiments, vision system 245 obtains the information associated with the workspace of robot arm 102, robot arm 104, or workspace of robotic stack mover system 110 and/or robotic stack mover system 130. Vision system 145 obtains the information associated with the workspace based at least in part on data obtained by one or more sensors (e.g., an image system such as a 2D/3D camera, a laser sensor, an infrared sensor, a sensor array, a weight sensor, etc.). As an example, as illustrated in FIG. 1A, vision system 145 includes a camera 146. Various other types of sensors may be implemented in connection with vision system 145. In various embodiments, system 100 may include a plurality of 3D (or other) cameras, such as camera 146, and may use image and depth data generated by such cameras to generate a three-dimensional view of at least relevant portions of the workspace and scene, such as the scene/state shown in FIG. 1A. In some embodiments, cameras such as camera 146 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by vision system 145 such as camera 146 is used to move robot arms and end effectors into a position near a tray or stack of two or more trays to be grasped and picked up from a source stack and/or to position the tray(s) near a destination at which they are to be place, e.g., at the top of a corresponding destination stack. In some embodiments, force control is used to complete the final phases of a pick/grasp episode and/or a placement episode.

Although a single camera (e.g., camera 146) mounted to a wall in the workspace of system 100 is shown in FIG. 1A, in various embodiments, multiple cameras or other sensors, or a combination thereof, may be mounted statically in a workspace. In addition, or instead, one or more cameras or other sensors may be mounted on or near each robot arm 102, 104, such as on the arm itself, and/or on the end effector of the corresponding robot arm, and/or on a structure that travels with the robot arm 102, 104 as it is moved along rail 105.

A robotic control system (e.g., a computer that controls robot arm 102, robot arm 104, and/or robotic stack mover system 110, such as control computer 148) controls the end effector to actuate the opening/closing of the end effector such as in connection with grasping or releasing a tray and/or the moving of tray stacks 122a, 122b, 122c, such as by driving drive chain 117. The robotic control system controls robotic stack mover system 110 and/or robot arms 102, 104 (e.g., the end effector) based at least in part on (i) image data of the workspace (e.g., obtained using vision system 145), (ii) one or more sensors comprised in (or connected to) the corresponding end effector, and/or (iii) one or more sensors comprised in (or connected to) robotic stack mover system 110 (or robotic stack mover system 130). In some embodiments, the robotic control system controls robotic stack mover system 110 and/or robot arms 102, 104 (e.g., the end effector) based at least in part on information pertaining to one or more tray stacks such as an identifier of the tray stacks, a manifest of the tray stacks, an order corresponding to the tray stacks, etc. In some embodiments, the one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or a handle comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the side of a tray, and/or (v) obtain information indicative of whether the grasping mechanism is closed or otherwise engaged with the tray.

The respective robot arms 102, 104 are operated at the same time, fully autonomously, to pick trays from tray stacks 122a, 122b, and/or 122c and place them on destination tray stacks, such as destination tray stacks 140a, 140b, and/or 140c, in a destination tray stack assembly area on an opposite side of rail 205 from robotic stack mover system 110 and tray stacks 122a, 122b, and/or 122c. As example, control computer 148 may determine plans for respectively operating robot arms 102, 104 to pick/place respective items/trays. The plans for operating robot arms 102, 104 may be determined based at least in part on a coordination of the movement of robot arms 102, 104 (e.g., to avoid collisions, awkward poses or configurations, etc.). The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective tray stacks 122a, 122b, and/or 122c and stacking them on a corresponding destination tray stack 140a, 140b, and/or 140c. Completed destination tray stacks 140a, 140b, and/or 140c may be removed from the destination tray stack assembly area, as indicated by arrows, e.g., to be place on trucks, rail cars, containers, etc. for delivery to a further destination, such as a retail store.

In various embodiments, each robot arm 102, 104 operates in a very tight space of roughly 2.5 m in width and has a very light footprint. The robot utilizes its full workspace and intelligently plans its motion optimizing its grasp and/or efficiency (e.g., time, collision avoidance, etc.) in de-stacking the source tray stacks 122a, 122b, 122c. It recognizes the need to perform orientation changes and handles that accordingly while avoiding obstacles. The robot moves to the correct output (destination tray stacks 140a, 140b, 140c) corresponding to the right customer while coordinating with the other robots on the rail 105. It then uses advanced force control and interactions with the environment to figure out a proper place strategy. The cycle then restarts.

In various embodiments, system 100 comprises robot stack mover system 130 such as in connection with moving destination tray stacks 140a, 140b, 140c (e.g., along a path corresponding to a direction of a guide rail 136 of robot stack mover system 130, or a direction of rail 105 along which robot arms 102, 204 traverse. Robot stack mover system 130 may be implemented to provide a structure to move destination tray stacks 140a, 140b, 140c to facilitate moving stacks within range of a particular robot arm, or to allow insertion of additional destination tray stacks as other destination tray stacks are completed. As an example, if tray stack 122a comprises a tray including objects different from tray stacks 122b, 122c, and system 100 determines that a set of such objects are to be placed on destination tray stack 140c, system 100 may control robotic stack mover system 130 to move destination tray stack 140c to within range 106 of robot arm 102 (e.g., because tray stack 122a is within range of robot arm 102 but robot arm 102 is unable to reach destination tray stack 140c in the example shown in FIG. 1A).

Referring further to FIG. 1A, in the example shown in the system 100 includes a control computer 148 configured to communicate wirelessly with robotic elements comprising system 100, including in various embodiments one or more of: robotic stack mover system 110; robotic stack mover system 130; the wheeled chassis on which tray stacks 122a, 122b, and/or 122c are stacked (if self-propelled); the robot arms 102, 104 and/or the respective chassis on which the robot arms 102, 104 are mounted on rail 105; and the robotically controlled end effectors of robot arms 102, 104. In various embodiments, the robotic elements are controlled by control computer 148 based on input data, such as invoice, order, and/or manifest information, as well as input state information (e.g., information pertaining to the workspace such as obtained by vision system 145), such as inventory data indicating which source tray stacks include which type and/or quantity of product. As an example, tray stacks 122a, 122b, 122c may respectively comprise a same item (e.g., a same product), and destination tray stacks 140a, 140b, 140c may comprise a variety of items (e.g., system 100 assembles the set of items for the destination tray stacks based on an order, manifest, etc.).

Tray stacks 122a, 122b, 122c may be inserted into a gate or other ingress/control structure at the input end of robotic stack mover system 110 (e.g., where tray stack 120 is inserted into robotic stack mover system 110). Robotic stack mover system 110 moves the tray stacks 122a, 122b, 122c along a path defined by a direction of rail 105 (or guide rail 116) to optimize throughput and minimize robot displacement, e.g., by minimizing how far and/or often the robot arms 202, 204 must be moved along rail 105 to grasp source trays and place them on respective destination stacks. The tray stacks 122a, 122b, 122c can come in with trays in different orientations/weights/and weight distribution. System 100 uses force and moment control to operate robot arms 102, 104 to insert a thumb or other protrusion gently and securely into a tray and plans its motion and tray trajectory in order to not collide with itself or the environment. In various embodiments, each robot arm 102, 104 operates in a very tight space of roughly 2.5 m in width and has a very light footprint. The robot (e.g., via control of control computer 148) utilizes its full workspace and intelligently plans its motion optimizing its grasp and/or efficiency (e.g., time, collision avoidance, etc.) in de-stacking the tray stacks 122a, 122b, and/or 122c. System 100 (e.g., control computer 148) recognizes the need to perform orientation changes and handles that accordingly while avoiding obstacles. The robot moves to the correct output (destination tray stack 140a, 140b, 140c) corresponding to the right customer while coordinating with the other robots on the rail 105. System 100 then uses advanced force control and interactions with the environment to figure out a proper place strategy. The cycle then restarts.

Although system 100 illustrates an operator inserting stack 120 to the input end of robotic stack mover system 110, in various embodiments system 100 comprises a robotic stack pusher system (not shown) that inserts (e.g., pushes) a stack (e.g., stack 120) to an input end (which may also referred to herein as a destination location or end position for the robotic stack pusher system or a payload introduction location of a robotic stack mover system) of robotic stack mover system 110. The input end of robotic stack mover system 110 may be a conveyance structure (e.g., a conveyor, etc.). In some embodiments, robotic stack pusher system 110 pushes the stack from a buffer zone (e.g., an area comprising a set of stacks to be loaded to robotic stack mover system) to the input end of robotic stack mover system 110. Control computer 148 may control both the robotic stack pusher system and robotic stack mover system 110. For example, control computer 148 controls the robotic stack pusher system and robotic stack mover system 110 in coordination to input stacks to the system and to process the stacks (e.g., moving the stacks through the robot workspace and using robot arms 102, 104 to perform kitting operations, etc.). The robotic stack pusher system may engage and push a stack to the input end until the system determines that the stack is engaged by robotic stack mover system 110, such as by a pusher on robotic stack mover system 110.

Robotic stack mover system 130 may be similar to robotic stack mover system 110. For example, robotic stack mover system 130 includes driving unit 132, tensioning unit 134, guide rail 136, drive chain 137, and a set of pusher units such as pusher units 138a, 138b, and 138c. In various embodiments, a robotic stack mover system includes a driving unit and a tensioning unit disposed at opposing ends of a guide rail. As illustrated using robotic stack mover system 110 and robotic stack mover system 130, sides at which the driving units and tensioning units are respectively located may be interchangeable.

Although in the example shown in FIG. 1A, system 100 comprises robotic stack mover system 110 and robotic stack mover system 130, in various embodiments, system 100 includes one robotic stack mover system, or system 100 is configured such that a robotic stack mover system is not included on a side of robot opposite another side of the robot arm that includes a robotic stack mover system (e.g., system 100 includes robotic stack mover system 110 but does not include robotic stack mover system 130). Examples of implementations in which robotic stack mover systems are not placed on opposing sides of a robot arm include a system configured to obtain trays from a conveyance structure (e.g., a conveyor, a chute, etc.) to stack trays on vehicles (e.g., tray stacks 122a, 122b, 122c, etc.), or a system configured to de-stack trays from the vehicles (e.g., tray stacks 122a, 122b, 122c, etc.) and to place the respective trays on a conveyance structure to transport the trays to another area of a facility (e.g., the robot arms singulate the trays obtained from the vehicles). In such implementations, the system comprises a conveyance structure on a side of robot arms 102, 104 that opposes the side of robot arms 102, 104 on which robotic stack mover system 110 is disposed. Another example of an implementation in which in which robotic stack mover systems are not placed on opposing sides of a robot arm includes a system in which robot arms are controlled to stack trays or kit sets of items (e.g., objects) from a shelf system or a conveyance system that provides (e.g., carries) the items to the workspace of the robot arms. An example of such an implementation is illustrated in FIG. 1C.

Figure 1B:
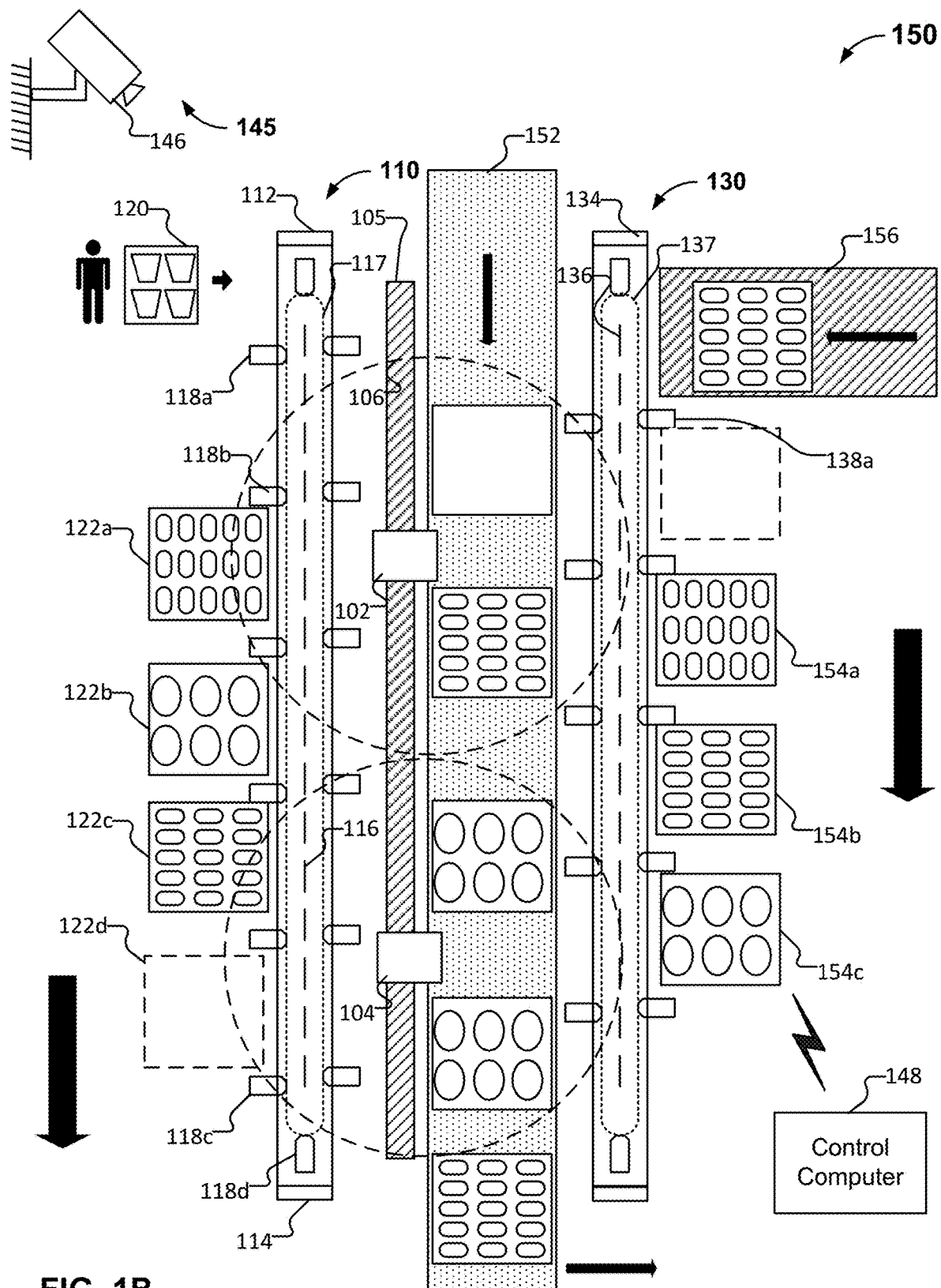
FIG. 1B is a block diagram illustrating a robotic line kitting system according to various embodiments.
Figure 1C:
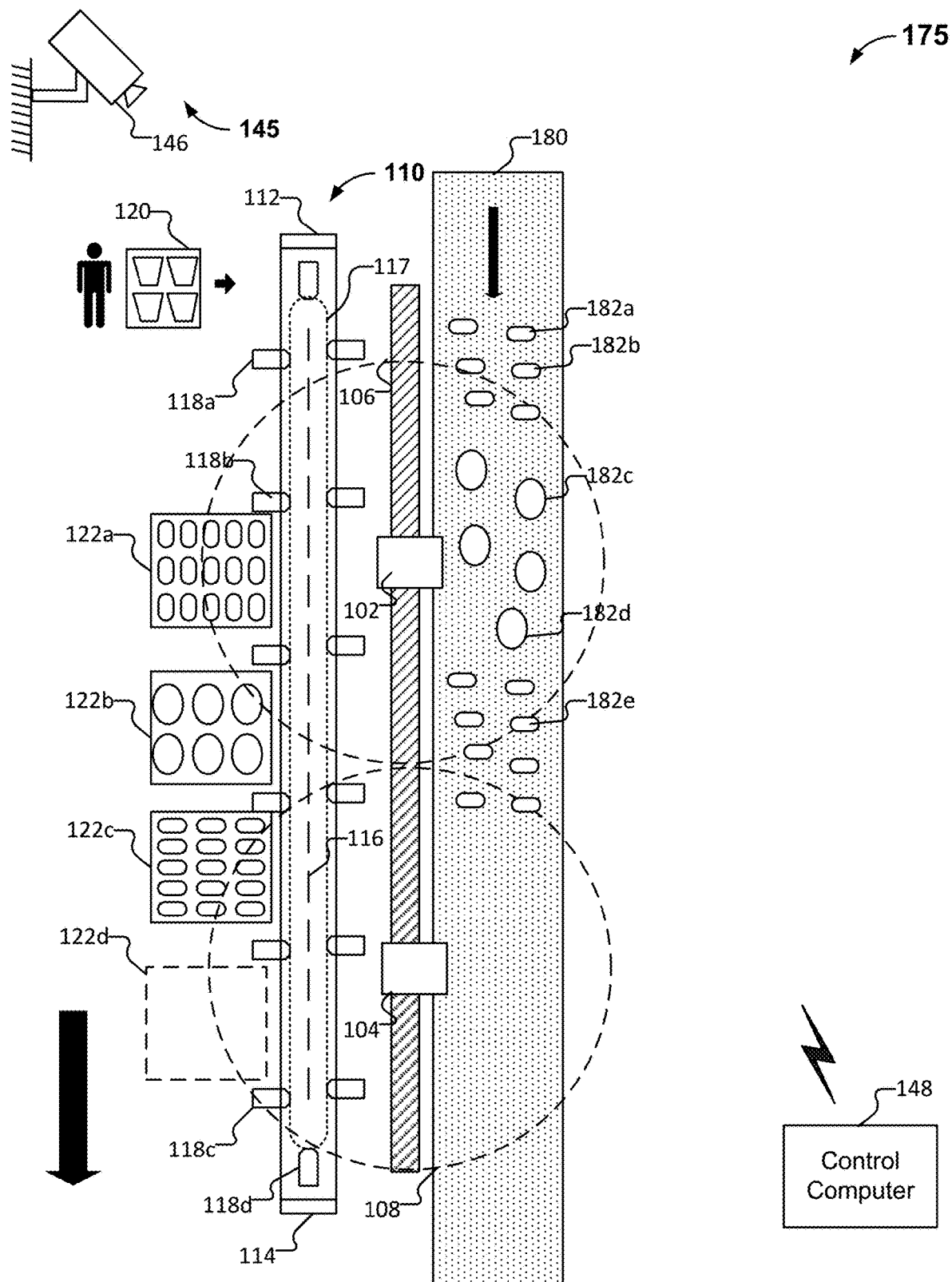
FIG. 1C is a block diagram illustrating a robotic line kitting system according to various embodiments.

FIG. 1B is a block diagram illustrating a robotic line kitting system according to various embodiments. In the example shown in FIG. 1B, tray stacks are inserted on opposing sides of rail 105. In various embodiments, robot arms 102 and 104 are controlled to perform kitting operations with respect to tray stacks 122a, 122b, 122c, 154a, 154b, and/or 154c.

In various embodiments, robot arms 102 and 104 are controlled to de-stack items (e.g., trays) with respect to tray stacks 122a, 122b, 122c, 154a, 154b, and/or 154c. Robot arms 102 pick trays from tray stacks 122a, 122b, 122c, 154a, 154b, and/or 154c and place the trays on a conveyance structure 152, which carries the de-stacked/unloaded trays to a destination location (e.g., another area of a facility). Robotic stack mover system 110 and robotic stack mover system 130 respectively move tray stacks 122a, 122b, and 122c, and tray stacks 154a, 154b, 154c such as to facilitate the de-stacking operation (e.g., to optimize efficiency for robot arms 102, 104 to de-stack the tray stacks, or to provide space for insertion of another tray stack, etc.).

In various embodiments, robot arms 102 and 104 are controlled to stack items (e.g., trays) with respect to tray stacks 122a, 122b, 122c, 154a, 154b, and/or 154c. Robot arms 102 can pick trays delivered via conveyance structure 152 and place the trays on tray stacks 22122a, 122b, 122c, 154a, 154b, and/or 154c. The tray stacks 122a, 122b, 122c, 154a, 154b, and/or 154c may be stacked according to a manifest such as an order or invoice. Robotic stack mover system 110 and robotic stack mover system 130 respectively move tray stacks 122a, 122b, and 122c, and tray stacks 154a, 154b, 154c such as to facilitate the stacking or de-stacking operation (e.g., to optimize efficiency for robot arms 102, 104 to stack the tray stacks, or to provide space for insertion of another tray stack, etc.).

As illustrated in FIG. 1B, system 150 may include an autonomous tray stack insertion unit 156. The autonomous tray stack insertion unit 156 can be a conveyance structure, such as a conveyor, a robotic stack pusher system, etc. System 150 (e.g., via control computer 148) controls autonomous tray stack insertion unit 156 to insert tray stacks to a space between adjacent pusher units. System 150 may control autonomous tray stack insertion unit 156 based on a state of robotic stack mover system 130 or a state of one or more tray stacks engaged by robotic stack mover system 130 (e.g., tray stacks 154a, 154b, and/or 154c). As an example, if system 150 comprises a tray stack insertion zone comprising autonomous tray stack insertion unit 156, system 150 may determine to insert a new tray stack in response to a determination that a kitting operation has been completed with respect to tray stack 154c (which can be moved to a vehicle return area), such as a determination that a manifest or packing list for tray stack 154c is completed, or the tray stack has reached a threshold height.

According to various embodiments, system 100 comprises one or more robotic stack pusher systems (not shown) to insert a stack to robotic stack mover system(s) 110, 130, and/or to insert trays to conveyance structure 152. Although the example illustrated in FIG. 1B includes stack 120 being manually inserted by an operator or a stack being inserted (e.g., automatically or robotically) via conveyor 155, system 100 may comprise a robotic stack pusher system(s) to insert stacks to an input end of robotic stack mover system 110 or an input end of robotic stack mover system 130. In some embodiments, robotic stack pusher system pushes the stack from a buffer zone (e.g., an area comprising a set of stacks to be loaded to robotic stack mover system) to the input end of robotic stack mover system 110 or robotic stack mover system 130. Control computer 148 may control both the robotic stack pusher system and robotic stack mover system 110. For example, control computer 148 controls the robotic stack pusher system and robotic stack mover system 110 and/or robotic stack mover system 130 in coordination to input stacks to the system and to process the stacks (e.g., moving the stacks through the robot workspace and using robot arms 102, 104 to perform kitting operations, etc.). The robotic stack pusher system may engage and push a stack to the input end until the system determines that the stack is engaged by robotic stack mover system 110, such as by a pusher on robotic stack mover system 110 (e.g., pusher unit 118a, etc.) or robotic stack mover system 130 (e.g., pusher unit 138a, etc.).

FIG. 1C is a block diagram illustrating a robotic line kitting system according to various embodiments. In the example shown in FIG. 1C, system 175 comprises robotic stack mover system 110 and a conveyance structure 180. Robotic stack mover system 110 and a conveyance structure 180 are located on opposing sides of the rail along which robot arms 102, 104 traverse. In various embodiments, robot arms 102 and 104 are controlled to perform kitting operations with respect to tray stacks 122a, 122b, 122c. For example, robot arms 102, 104 pick objects (e.g., objects such as 182a, 182b, 182c, 182d, or 182e) from conveyance structure 180 and place the objects on tray stacks 122a, 122b, and/or 122c. As another example, robot arms 102, 104 pick objects from tray stacks 122a, 122b, and/or 122c and place the objects on conveyance structure 180, which carries the objects to a corresponding destination location.

Although in the examples shown in FIGS. 1A, 1B, and 1C the trays each contain only one type of object, in various embodiments and applications source and destination trays having mixes of items may be handled to assemble destination stacks of trays as disclosed herein. Similarly, although in the examples shown in FIGS. 1A, 1B, and 1C the source stacks of trays each contain only trays of the same type and content, in other embodiments and applications source tray stacks may include a mix of trays and/or item types. For example, the control computer 148 may be provided with information indicating which types of trays are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

According to various embodiments, a system combining (e.g., comprising both) a robotic stack pusher system and a robotic stack mover system enables the system to automatically process a set of vehicles (e.g., stacks of trays). The system may detect when a particular stack/vehicle is processed (e.g., a kitting operation with respect to the stack/vehicle is complete), and in response to detecting that the particular stack/vehicle is processed (or in anticipation of the processing of the particular/stack vehicle being completed), the system may control the robotic stack mover system may move the stack/vehicle to a stack/vehicle return (e.g., an output end), and the system may control the control the robotic stack pusher system to load a stack/vehicle to an input end (e.g., destination location) of the robotic stack mover system. The system may then control the robotic stack mover system to process the stack/vehicle (e.g., to perform a kitting operation with respect to the stack or vehicle, or other pick/place operation). The system may iterate over the moving stacks/vehicles through the workspace using the robotic stack mover system and inputting new stacks/vehicles to the workspace (e.g., to the input end of the robotic stack mover system) using the robotic stack pusher system until no further stacks/vehicles are to be processed.

Figure 2:
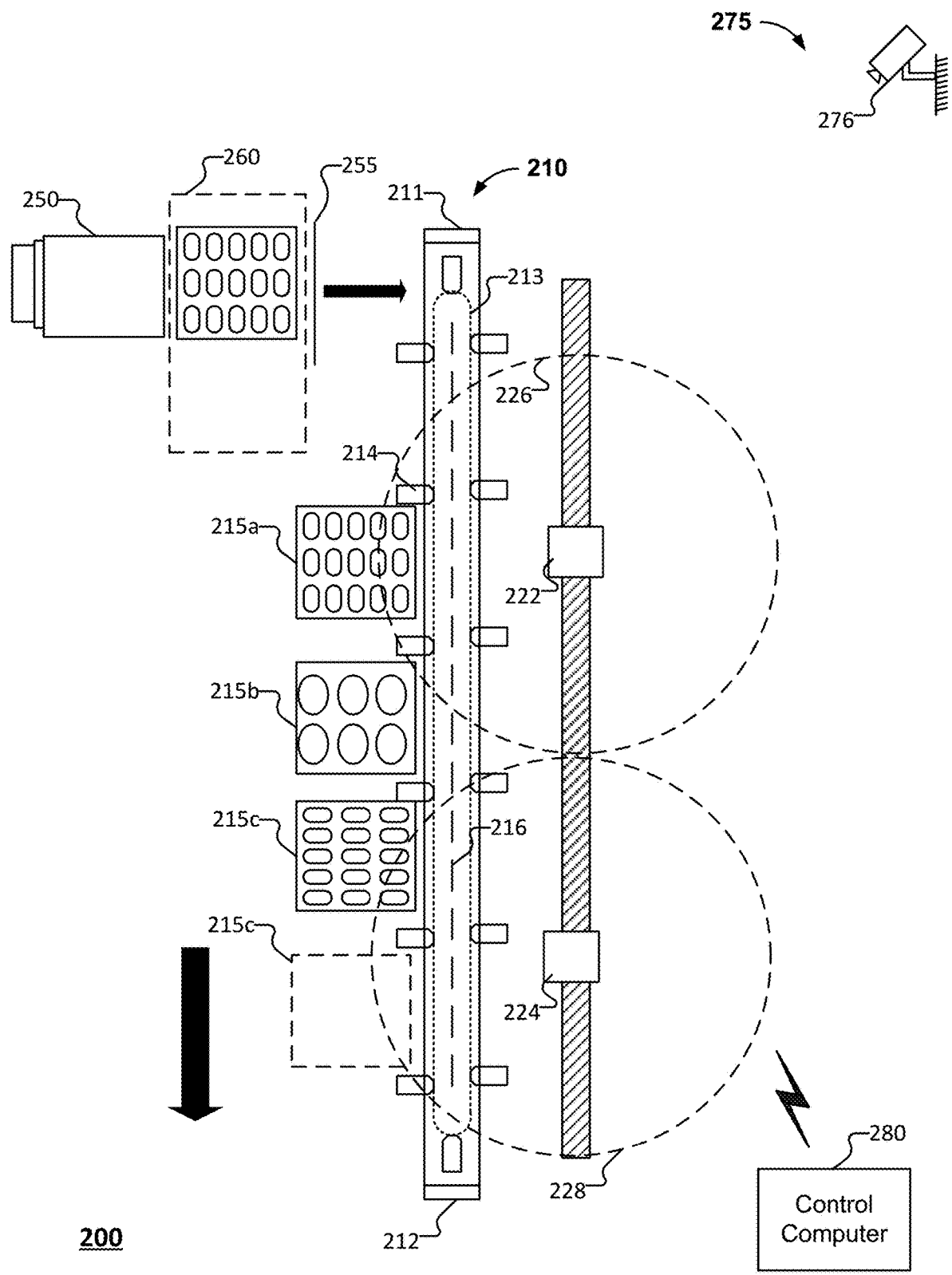
FIG. 2 is a block diagram illustrating a robotic line kitting system according to various embodiments.

FIG. 2 is a block diagram illustrating a robotic line kitting system according to various embodiments. In the example shown, system 200 comprises stack pusher system 250 deployed alongside stack mover system 210. System 200 uses stack pusher system 250 to insert (e.g., push) stacks to an input end of stack mover system 210. In response to determining that a stack is inserted to the input end of stack mover system 210, system 200 uses stack mover system 210 to move the stack through the workspace, such as to within range of one or more robot arms (e.g., robotics arm 222, 224).

In some embodiments, stack pusher system 250 comprises one or more pusher structures (e.g., a stack engagement pusher structure, a first pusher structure, etc.) that telescopically extend, thereby pushing stacks towards the input end of stack mover system 210. System 200 may further comprise control computer 280 that is controls stack pusher system 250. For example, control computer 280 determines a plan for operating stack pusher system 250 (e.g., inserting/pushing a stack to an input end of stack mover system 210. Control computer 280 controls stack pusher system 250 to transition the one or more pusher structures from a retracted state to the extended state. In response to determining that the stack is inserted to the input end of stack mover system 210, control computer 280 controls stack pusher system 250 to retract the one or more pusher structures to the retraction state. When the stack pusher system 250 is retracted, a next stack may be loaded for insertion/pushing by stack pusher system 250.

The stack(s) to be loaded to stack mover system 210 may be buffered/staged in buffer zone 260. Buffer zone 260 is disposed between stack pusher system 250 and stack mover system 210. For example, buffer zone 260 is disposed at a distance from stack mover system 210 that is equal to or less than the expected or required throw of stack pusher system 250 (e.g., the distance that the stack pusher system 250 is to move the stacks). Buffer zone 260 may comprise a plurality of stacks that are queued for insertion to stack mover system 210. In some embodiments, a buffer conveyance structure is comprised in buffer zone 260. As an example, the buffer conveyance structure may be a robotically controlled conveyor. The buffer conveyance structure may be configured to move a next stack into a location at which stack pusher system 250 is to engage the stack (e.g., an input end to stack pusher system 250). In some embodiments, control computer 280 controls the buffer conveyance structure to advance the next stack to the location at which stack pusher system 250 is to engage such next stack. For example, control computer 280 may control the buffer conveyance structure in coordination with stack pusher system 250 in connection with inserting stacks to stack mover system 210.

In some embodiments, system 200 comprises gating structure 255. Gating structure 255 may be part of stack pusher system 250, buffer zone 260 (e.g., part of the buffer conveyance structure), or a standalone device. Gating structure 255 is configured to mediate insertion of stacks to stack mover system 210. For example, gating structure 255 comprises a gate that may be robotically controlled, such as by control computer 280. Gating structure 255 may be disposed between buffer zone 260 and stack mover system 210 in order to prevent/impede stacks from entering the input end of stack mover system 210 when the gate closed and to permit stacks to be inserted to the input end of stack mover system 210 when the gate is open. In some implementations, gating structure 255 may be disposed between stack pusher system 250 and buffer zone 260, or system 200 may comprise a plurality of gating structures-one disposed between stack pusher system 250 and buffer zone 260, and the other disposed between buffer zone 260 and stack mover system 210.

Control computer 280 may control actuation of the gate to move the gate to an open position or a closed position. In some embodiments, control computer 280 controls gating structure 255 (e.g., actuation of the gate) in coordination with stack mover system 210 or otherwise based on information pertaining to the workspace or state of stack mover system 210. Gating structure 255 may comprise one or more sensors, such as light sensors or cameras that are used to detect one or more of whether a stack is loaded to buffer zone 260, a queue of stacks in buffer zone 260, a state of the gate (e.g., whether the gate is open or closed), etc. Control computer 280 may control gating structure 255 based at least in part on information obtained by the one or more sensors of gating structure 255 or one or more sensors disposed elsewhere in system 200 (e.g., a vision system of system 200). For example, control computer 280 controls gating structure 255 based at least in part on one or more of (i) a determination of whether the input end of stack mover system 210 is vacant, (ii) a determination that a stack is being output from stack mover system 210 (e.g., after robot arms 222, 224 have completed a kitting operation with respect to such stack), and (iii) a determination that robot arms in the workspace have completed an operation with respect to a stack being moved by stack mover system 210 through the workspace (e.g., the robot arms have completed a kitting operation to unload or load tray(s) of a stack).

Various other factors may be used in connection with controlling gating structure 255 to open/close the gate.

System 200 uses robotic stack mover system 210 to move (e.g., along a path) tray stacks 215a, 215b, and 215c (e.g., or vehicles in which stacks of trays are comprised or are to be loaded) in position for robot arms 222 and 224 to perform kitting operations such as de-stacking tray stacks 215a, 215b, and 215c, or stacking trays or placing items on trays of stacks of trays. In some embodiments, system 200 controls robotic stack mover system 210 to move tray stacks 215a, 215b, and 215c to respective locations within, or in proximity to, workspaces of robot arms 222 and 224 (e.g., which may correspond to ranges 806 and 808). Robotic stack mover system 210 autonomously moves stacks of trays (or other vehicles) that are inserted to robotic stack mover system 210 (e.g., a predefined insertion location, between pusher units, etc.). Stack mover system 210 may be controlled in coordination with stack pusher system 250, or additionally, a buffer conveyance in buffer zone 260 and/or gating structure 255.

In various embodiments, robotic stack mover system 210 includes a driving unit 211 configured to move tray stacks 215a, 215b, and 215c such as by driving a mechanism to apply respective forces on tray stacks 215a, 215b, and 215c. As an example, the driving unit 211 comprises a motor that is driven based at least in part on a determination to move the tray stacks 215a, 215b, and 215c. System 200 may control the motor via computer control such as by control computer 280 operatively connected to robotic stack mover system 210. Driving unit 211 may be similar to, or the same as, driving unit 112 of system 100 of FIGS. 1A-1C.

In various embodiments, robotic stack mover system 210 includes tensioning unit 212. Tensioning unit 212 may be part of the drive system of robotic stack mover system 210 and ensures the drive system has sufficient tension. In addition, tensioning unit 212 may serve as a recirculation point for the drive system (e.g., a drive chain is redirected and recirculated back to driving unit 211). The tensioning unit is configured to adjust/enforce a tension in the drive chain of the system. Tensioning unit 212 may be similar to, or the same as tensioning unit 114 of system 100 of FIG. 1A.

In various embodiments, robotic stack mover system 210 includes drive chain 213. Drive chain 213 traverses the distance between driving unit 211 and tensioning unit 212. Drive chain 213 receives force from driving unit 211 to cause drive chain 213 to move (e.g., to circulate within robotic stack mover system 210). In some embodiments, drive chain 213 is a double-pitch chain having a profile that comprises a hole or recess in which a tooth of a driving sprocket fits for the driving unit to engage drive chain 213. Drive chain 213 may be similar to, or the same as drive chain 117 of system 100 of FIG. 1A. Robotic stack mover system 210 may further include a guide rail that is configured to provide support for drive chain 213 to ensure that drive chain 213 traverses a longitudinal direction between driving unit 211 and tensioning unit 212. The longitudinal direction of the guide rail may be parallel to (or similar to) the direction of a rail along which robot arms 222 and 224 (e.g., and on which robot arms 222 and 224 are mounted such as via robot carriages) traverse to pick and place items (e.g., trays, objects from trays, carts, etc.).

In the example shown in FIG. 2, drive chain 213 includes a set of pusher units such as pusher units such as pusher unit 214. The pusher units of the set of pusher units may be disposed at a predetermined distance along drive chain 213. The predetermined distance may be determined based on a dimension of a tray or tray stack. For example, the predetermined distance may be 25% greater than the dimension (e.g., length) of a tray or tray stack. As another example, the predetermined distance may be 10% greater than the dimension (e.g., length) of a tray or tray stack. As another example, the predetermined distance may be 15% greater than the dimension (e.g., length) of a tray or tray stack. As another example, the predetermined distance may be 50% greater than the dimension (e.g., length) of a tray or tray stack. In some embodiments, the predetermined distance between two adjacent pusher units (e.g., pusher unit 818) is sufficiently large for a vehicle (e.g., a tray stack such as tray stack 215a, 215b, or 215c) to be inserted between the two adjacent pusher units. For example, the predetermined distance is set to be equal to the sum of a dimension of the vehicle (e.g., a length, a width, etc.) and a buffer spacing (e.g., 1 to 6 inches, etc.). In various embodiments, the predetermined distance between the pusher units is configurable. For example, system 200 or a human operator may adjust spacing of pusher units by moving a subset of pusher units and/or by removing a subset of pusher units. The pusher units may be mounted on drive chain 213 (e.g., bolted to a bracket on a link of drive chain 213, etc.), or integral with the drive chain 213 such as by a ridge or other structure.

In various embodiments, the pusher units are configured to provide support for the pushing (e.g., exerting force on) a vehicle such as tray stack 215a, 215b, or 215c. As drive chain 213 is driven (e.g., by a driving sprocket), the pusher units respectively move and cause vehicles with which the pusher units are engaged to move. The pusher units (e.g., pusher unit 214) may be similar to, or the same as pusher units 218a, 218b, 218c, and 218d of system 200 of FIG. 2A. The pusher units may have various profiles that are selected based at least in part on a configuration of an implementation of robotic stack mover system 210.

In various embodiments, the tray stacks 215a, 215b, 215c may be pushed manually into an insertion zone. The insertion zone may be located at a beginning of the path which the tray stacks traverse when robotic stack mover system 210 moves the tray stack. For example, as illustrated in FIG. 2A, tray stack 220 is inserted at an end of robotic stack mover system 210 at which driving unit 211 is located. In various embodiments, insertion of tray stacks may be automated. For example, the insertion zone may correspond to the input end at which stacks are inserted/pushed by stack pusher system 250. For example, stack pusher system 250 may insert tray stacks at a time determined based on one or more of (i) a location of at least one pusher unit (e.g., relative locations of pusher units may be determined if a predetermined spacing between pusher units is known), (ii) a determination that no pusher units are located within insertion zone (e.g., appropriate clearance is provided for proper insertion), (iii) a speed at which drive chain 213 is being inserted, (iv) an order in which tray stacks are to be de-stacked (or filled by stacking of trays, etc.), (v) a manifest corresponding to the particular tray stack (e.g., a list of items on the tray stack, or that are to be loaded onto tray stack), (vi) a state of robot arm 222 or 224, etc. Upon insertion of the tray stack to robotic stack mover system 210, robotic stack mover system autonomously advances the source tray stacks (e.g., tray stacks 215a, 215b, and/or 215c) through the workspace (e.g., defined by robotic stack mover system 210 or a guide rail of robotic stack mover system 210). In various embodiments, tray stacks may be inserted at other locations where a space between adjacent pusher units is available (e.g., no tray stack occupies the space). For example, tray stack 215b may be inserted at its location as robot arm 222 is de-stacking tray stack 215a and/or robot arm 224 is de-stacking tray stack 215c. In some embodiments, tray stacks are inserted at a spacing that comprises at least N pusher units, where N is an integer. For example, in some implementations tray stacks may occupy adjacent spaces between pusher units such as shown with tray stacks 215a, 215b, and/or 215c. As another example, in some implementations tray stacks are inserted every other set of pusher units such as to avoid adjacent tray stacks, such as shown with tray stack placeholder 215d. The tray stack placeholders (e.g., spaces with no tray stacks inserted between adjacent pusher units) may be implemented to provide clearance between tray stacks and to ensure that robot arms 222, 224 do not collide with adjacent tray stacks while picking and placing items (e.g., trays) to/from tray stacks. In some embodiments, the system uses tray stack placeholders if the system determines that a height of a particular tray stack exceeds a predetermined height threshold.

In some embodiments, tray stacks 215a, 215b, and/or 215c may be advanced through/by robotic stack mover system 210 under robotic control. For example, the speed and times at which the tray stacks 215a, 215b, and/or 215c are advanced by/through robotic stack mover system 210 may be controlled (e.g., by control computer 280) to facilitate efficient grasping of trays from the tray stacks 215a, 215b, and/or 215c.

In the example shown, a single rail is disposed along one long side of the robotic stack mover system 210. In this example, two robots, one comprising robot arm 222 and another comprising robot arm 204, are mounted movably, independent of one another, on a rail. For example, each robot arm 222, 224 may be mounted on a self-propelled chassis that rides along a rail. In various embodiments, each robot arm 222, 224 terminates with an end effector used to perform the kitting operations. In an implementation in which tray stacks are stacked or de-stacked, robot arms 222 or 224 may terminate with a tray handling end effector. In an implementation in which objects are picked and placed from the vehicles, robot arms 222 or 224 may terminate with a suction-based end effector, a pincher end effector, etc. In some embodiments, robot arm 222 or 224 terminates with (e.g., has mounted thereon) a multi-mode end effector. The multi-mode end effector may comprise a first grasping mechanism and a second grasping mechanism. The first grasping mechanism may be configured to use a suction-based end effector to grasp objects. The second grasping mechanism may be configured to use a set of gripper arms to grasp objects. The end effector(s) of robot arm 222 and/or robot arm 224 are operated under robotic control. The robotic control may be determined based on a plan for picking/moving/placing the items (e.g., trays) and/or information pertaining to the workspace, such as presence of objects within the range 226 (e.g., workspace) of robot arm 222 or range 228 (e.g., workspace) of robot arm 224.

According to various embodiments, system 200 comprises one or more sensors that capture information pertaining to one or more of a workspace, including one or more of the workspace of a robotic stack pusher system, a robotic stack mover system, a buffer conveyance, a gating structure, etc. The one or more sensors may include a vision system and/or various other types of sensors, including a weight sensor, a light sensor (e.g., a light array), a force sensor, etc. As example, system 200 may include a light sensor(s) that detects whether the robotic stack pusher system is in an extended state or a retracted state, or a position/location of one or more of the pusher structures comprised in the robotic stack pusher system. As another example, system 200 may include a force sensor that detects whether a payload is engaged by the robotic stack pusher system. As another example, system 200 may include a gate sensor(s) that detects a state of the gating structure such as whether a gate is in an open position, a closed position, or a position between the open state and closed state. As another example, system 200 may include one or more light sensors or vision system to determine locations of payloads (e.g., stacks of trays) as the payloads are moved through the robot workspace by the robotic stack mover system, or through the buffer area by a buffer conveyance. All or some of the one or more sensors may be comprised in a vision system of the system such as a vision system that operates to obtain information pertaining to items or components in the workspace of the robot arm, and with which the system controls the robot arm to move items (e.g., to stack/de-stack items with respect to a vehicle).

In the example shown, system 200 comprises one or more sensors, including vision system 275. In various embodiments, vision system 275 obtains the information associated with one or more of the workspace of robot arm 222, robot arm 224, or workspace of robotic stack mover system 210, robotic stack mover system 210, stack pusher system 250, buffer zone 260, and a buffer conveyance that moves stacks in buffer zone 260. Vision system 275 obtains the information associated with the workspace based at least in part on data obtained by one or more sensors (e.g., an image system such as a 2D/3D camera, a laser sensor, an infrared sensor, a sensor array, a weight sensor, etc.). Various other types of sensors may be implemented in connection with vision system 275. In various embodiments, system 200 may include a plurality of 3D (or other) cameras, such as camera 276, and may use image and depth data generated by such cameras to generate a three-dimensional view of at least relevant portions of the workspace and scene, such as the scene/state shown in FIG. 2. In some embodiments, cameras such as camera 276 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by vision system 275 such as camera 276 is used to move robot arms and end effectors into a position near a tray or stack of two or more trays to be grasped and picked up from a source stack and/or to position the tray(s) near a destination at which they are to be place, e.g., at the top of a corresponding destination stack. In some embodiments, force control is used to complete the final phases of a pick/grasp episode and/or a placement episode.

Although a single camera (e.g., camera 276) mounted to a wall in the workspace of system 200 is shown in FIG. 2, in various embodiments, multiple cameras or other sensors, or a combination thereof, may be mounted statically in a workspace. In addition, or instead, one or more cameras or other sensors may be mounted on or near each robot arm 222, 224, such as on the arm itself, and/or on the end effector of the corresponding robot arm, on a structure that travels with the robot arm 222, 224 as it is moved along rail 205, on or around stack pusher system 250, stack mover system 210, and/or buffer zone 260.

A robotic control system (e.g., a computer that controls robot arm 222, robot arm 224, and/or robotic stack mover system 210, such as control computer 280) controls the end effector to actuate the opening/closing of the end effector such as in connection with grasping or releasing a tray and/or the moving of tray stacks 215a, 215b, 215c, such as by driving drive chain 213. The robotic control system controls stack pusher system 250 to move (e.g., push) stacks to the input end of stack mover system 210. For example, the robotic control system controls stack pusher system 250, robotic stack mover system 210 and/or robot arms 222, 224 (e.g., the end effector) based at least in part on (i) image data of the workspace (e.g., obtained using vision system 275), (ii) one or more sensors comprised in (or connected to) the corresponding end effector, (iii) one or more sensors comprised in (or connected to) robotic stack mover system 210 (or robotic stack mover system 230), (iv) one or more sensors comprised in stack pusher system 250, and/or (v) one or more sensors comprised in buffer zone 260. In some embodiments, the robotic control system controls robotic stack mover system 210 and/or robot arms 222, 224 (e.g., the end effector) based at least in part on information pertaining to one or more tray stacks such as an identifier of the tray stacks, a manifest of the tray stacks, an order corresponding to the tray stacks, etc.

In some embodiments, the one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or a handle comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the side of a tray, and/or (v) obtain information indicative of whether the grasping mechanism is closed or otherwise engaged with the tray.

According to various embodiments, the robotic control system controls stack pusher system 250, stack mover system 210, and robot arms 222, 224 in coordination. For example, the robotic control system determines a high-level plan to perform kitting operations with respect to one or more stacks and determines lower-level plans to control each of stack pusher system 250, stack mover system 210, and robot arms 222, 224, as applicable, to perform the task for the high-level plan. The robotic system then controls to implement the lower-level plans in coordination (e.g., simultaneously or contemporaneously) to accomplish the task for the high-level plan. For example, the robotic control system may generate a high-level plan for performing a kitting operation with respect to a particular tray or stack of trays, and the high-level plan may include lower-level plans respectively corresponding to a plan for using stack pusher system 250 to introduce the tray/stack of trays to robotic stack mover system 210, a plan for using robotic stack mover system 210 to move the tray/stack of trays through the workspace, and a plan for using robot arms 222 and/or 224 to perform the kitting operations.

The respective robot arms 222, 224 are operated at the same time, fully autonomously, to pick trays from tray stacks 215a, 215b, and/or 215c and place them on destination tray stacks, such as destination tray stacks in a destination tray stack assembly area on an opposite side of a rail (e.g., a rail along which robot arms 222, 224 traverse) from robotic stack mover system 210 and tray stacks 215a, 215b, and/or 215c. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective tray stacks 215a, 215b, and/or 215c and stacking them on a corresponding destination tray stack. Completed destination tray stacks may be removed from the destination tray stack assembly area, as indicated by arrows, e.g., to be place on trucks, rail cars, containers, etc. for delivery to a further destination, such as a retail store.

In various embodiments, system 200 comprises robot stack mover system 210 such as in connection with moving destination tray stacks (e.g., along a path corresponding to a direction of a guide rail of robot stack mover system 210, or a direction of a rail along which robot arms 222, 224 traverse. Another stack mover system may be implemented to provide a structure to move the destination tray stacks to facilitate moving stacks within range of a particular robot arm, or to allow insertion of additional destination tray stacks as other destination tray stacks are completed. As an example, if tray stack 215a comprises a tray including objects different from tray stacks 215b, 215c, and system 200 determines that a set of such objects are to be placed on destination tray stack 240c, system 200 may control robotic stack mover system 210 to move the destination tray stack to within range 226 of robot arm 222.

Referring further to FIG. 2, in the example shown in the system 200 includes a control computer 248 configured to communicate wirelessly with robotic elements comprising system 200, including in various embodiments one or more of: robotic stack mover system 210; robotic stack pusher system 250; the wheeled chassis on which tray stacks 215a, 215b, and/or 215c are stacked (if self-propelled); the robot arms 222, 224 and/or the respective chassis on which the robot arms 222, 224 are mounted on a rail; and the robotically controlled end effectors of robot arms 222, 224. In various embodiments, the robotic elements are controlled by control computer 280 based on input data, such as invoice, order, and/or manifest information, as well as input state information (e.g., information pertaining to the workspace such as obtained by vision system 275), such as inventory data indicating which source tray stacks include which type and/or quantity of product.

Tray stacks 215a, 215b, 215c may be inserted into a gate or other ingress/control structure at the input end of robotic stack mover system 210 (e.g., where tray stack 220 is inserted into robotic stack mover system 210). Robotic stack mover system 210 moves the tray stacks 215a, 215b, 215c along a path defined by a direction of rail 205 (or guide rail 216) to optimize throughput and minimize robot displacement, e.g., by minimizing how far and/or often the robot arms 222, 224 must be moved along the rail to grasp source trays and place them on respective destination stacks. The tray stacks 215a, 215b, 215c can come in with trays in different orientations/weights/and weight distribution. System 200 uses force and moment control to operate robot arms 222, 224 to insert a thumb or other protrusion gently and securely into a tray and plans its motion and tray trajectory in order to not collide with itself or the environment. In various embodiments, each robot arm 222, 224 operates in a very tight space of roughly 2.5 m in width and has a very light footprint. The robot (e.g., via control of control computer 280) utilizes its full workspace and intelligently plans its motion optimizing its grasp and/or efficiency (e.g., time, collision avoidance, etc.) in de-stacking the tray stacks 215a, 215b, 215c. System 200 (e.g., control computer 280) recognizes the need to perform orientation changes and handles that accordingly while avoiding obstacles. The robot moves to the correct output (e.g., the appropriate destination stack, a conveyance that carries items/trays from the workspace, etc.) corresponding to the right customer while coordinating with the other robots on the rail. System 200 then uses advanced force control and interactions with the environment to figure out a proper place strategy. The cycle then restarts.

In some embodiments, the system comprises gating structure 255 that is controlled to actuate a gate to move to a closed position or an open position. When the gate is configured in the closed position, the gate prevents/impedes payloads from moving from the buffer area/zone 260 to the destination location (e.g., the location at which the payloads are to be introduced to the robotic stack mover system 210). When the gate is configured in the open position, the robotic stack pusher system 250 (e.g., a robotic payload pusher system) may load a payload to the robot workspace. For example, the robotic stack pusher system 250 (e.g., a payload pusher system) may push the payload (e.g., the vehicle) to a destination location such as a location at which payloads are introduced to robotic stack mover system 210.

In some embodiments, system 200 uses control computer 280 to control the actuating device (e.g., to actuate a force, such as a linear force, to move robotic stack pusher system 250 between an extended state and a retracted state) and to control a movement/location of one or more vehicles (e.g., payloads such as stacks of trays on a dolly) inserted to system 200. System 200 may further comprise or be connected to a robot arm, and the system uses control computer 280 to control the robot arm such as in connection with performing a kitting operation with respect to the one or more vehicles/payloads (e.g., stacking/de-stacking items such as trays, etc.). System 200 may comprise a data structure with which the system maintains/stores (i) a mapping of vehicles to manifests (e.g., a packing list or other information indicating a set of items or objects within items comprised in a vehicle), (ii) a mapping of vehicles to locations or relative locations within the system, (iii) a mapping of vehicles to robot arms (e.g., robot arms assigned to stack/de-stack items to/from the vehicle, etc.), (iv) a mapping of robot arms to workspaces or zones corresponding to a range of the robot arms, etc. System 200 may monitor/track a location of a vehicle/payload and accordingly update the data structure such as the mapping(s), etc. System 200 may use the data structure to track specific items (or objects comprised in a particular item/vehicle) within the system such as to track a particular vehicle to which the item is stacked, or a particular vehicle (or associated manifest) from which the item is de-stacked/taken.

Control computer 280 controls stack pusher system 250. Control computer 280 may further control robotic stack mover system 210 to move stacks within a robot workspace and/or a gating structure to control a gate that impedes/permits a payload to be introduced to the robotic stack mover system. In some embodiments, control computer 280 coordinates control of robotic stack pusher system 250 and robotic stack mover system 210 to introduce payloads to a robot workspace, move payloads through the robot workspace for processing (e.g., for robots to perform kitting operations), and to a vehicle (e.g., dolly) return location. In some embodiments, system 200 comprises a buffer conveyance structure that moves payloads from a source location (e.g., a location at which payloads are introduced to the system) to a buffer zone at which the payloads may be moved through/past the gate using robotic stack pusher system 250 (e.g., in connection with loading the payload to the robotic stack mover system). The buffer conveyance structure may include a conveyor or other conveyance mechanism. System 200 may perform coordinated control of two or more of robotic stack pusher system 250, robotic stack mover system 210, gating structure 255, and the buffer conveyance.

Various embodiments include a modular stack mover system comprising two or more stack mover systems (e.g., modules for the modular stack mover system). The two or more stack mover systems may be arranged/oriented to sequentially move vehicles through their respective workspace and to transition movement of the vehicle to the next stack mover system. The two or more stack mover systems may be arranged/oriented to collectively move the vehicles in a single direction, or the two or more stack mover systems may be arranged/oriented to move the vehicles in different directions, such as to move the vehicles in an "L" shape or a "U" shape through the workspace.

Figure 3:
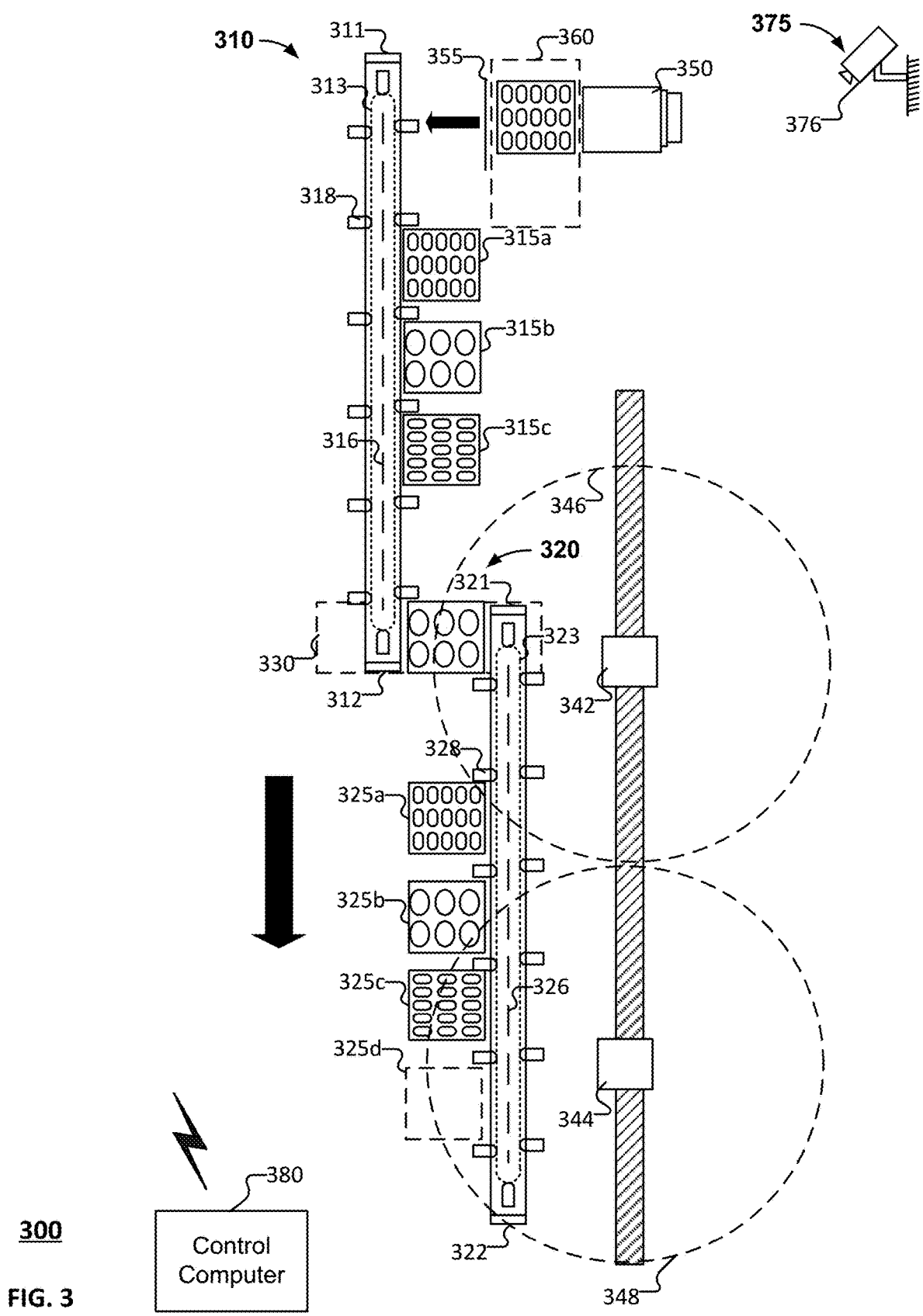
FIG. 3 is a block diagram illustrating a robotic line kitting system according to various embodiments.

FIG. 3 is a block diagram illustrating a robotic line kitting system according to various embodiments. In the example shown, system 300 comprises a modular stack mover system comprising two or more stack mover systems (e.g., a first stack mover system-stack mover system 310, and a second stack mover system-stack mover system 320). A vehicle (e.g., source tray stacks) are introduced to the modular stack mover system at an input end to stack mover system 310, and stack mover system 310 moves the vehicle to an output end (e.g., a destination location, or an input end to stack mover system 320). System 300 transitions from moving the vehicle using the stack mover system 310 to moving the vehicle using stack mover system 320. In some embodiments, system coordinates control of stack mover system 310 and stack mover system 320 to collectively move the vehicle through the workspace of system 300.

As illustrated in FIG. 3, system 300 comprises a mechanism for introducing a vehicle to the modular stack mover system. In the example shown, system 300 comprises stack pusher system 350 that is controlled (e.g., via control computer 380) to insert/introduce a vehicle (e.g., a stack of trays) to an input end of robotic stack mover system 310 (e.g., the first stack mover system module in the modular stack mover system). Stack pusher system 350 may engage a vehicle queued/staged in buffer zone 360 and move the vehicle from buffer zone 360 to the input end. In some embodiments, system 300 comprises (or buffer zone 360 or stack pusher system 350 comprises) gating structure 355. Gating structure 355 is configured to mediate insertion of vehicles to stack mover system 310. For example, gating structure 255 comprises a gate that may be robotically controlled, such as by control computer 380. Gating structure 355 may be disposed between buffer zone 360 and stack mover system 310 in order to prevent/impede vehicles from entering the input end of stack mover system 310 when the gate closed and to permit stacks to be inserted to the input end of stack mover system 310 when the gate is open. Gating structure 355 may correspond to, or be similar to, gating structure 255 of system 200 of FIG. 2, and gating structure 355 may be similarly controlled by control computer 380 as gating structure 255 is controlled (e.g., by control computer 280).

One or more of the stack mover systems comprised in the modular stack mover system may be a chain driven stack mover system. In the example illustrated, stack mover system 310 and stack mover system 320 are both chain driven stack mover systems. For example, stack mover system 310 comprises drive chain 313 that is driven using driving unit 311 while tensioning unit 312 provides (e.g., mediates) tension of drive chain 313. As another example, stack mover system 320 comprises drive chain 323 that is driven using driving unit 321 while tensioning unit 322 provides (e.g., mediates) tension of drive chain 323.

The stack mover systems comprised in the modular stack mover system may further comprise one or more pusher units (or puller units) that are mounted (e.g., operatively connected) to the corresponding drive chain. The pusher units are moved along a linear length as the corresponding drive chain is driven and the pusher units may engage a vehicle and push/pull the vehicle along the path of the stack mover system. For example, stack mover system 310 comprises a plurality of pusher units, such as pusher unit 318. As drive chain 313 of stack mover system 310 is driven, the pusher units proceed along the path defined by guide rail 316 from the input end at which stack pusher system 350 introduces the vehicle to system 300 to a first end location (e.g., a destination location, transition zone 330, or an input end of stack mover system 320). Accordingly, the pusher units may sequentially move vehicles 315a, 315b, 315c through the workspace towards stack mover system 320. As another example, stack mover system 320 comprises a plurality of pusher units, such as pusher unit 328. As drive chain 323 of stack mover system 320 is driven, the pusher units proceed along the path defined by guide rail 326 from the input end of stack mover system 320 (e.g., transition zone 330, or end at which stack mover system 310 moves the vehicle to introduces the vehicle to stack mover system 320) to an output end (e.g., a destination location, a vehicle return area, etc. In the example shown, drive chain 313 is driven in a clockwise direction, and drive chain 323 is driven in a counterclockwise direction.

According to various embodiments, the stack mover systems comprised in a modular stack mover system are arranged/oriented to move a vehicle in a single direction from an input end of the modular stack mover system (e.g., an input end of a first stack mover system) to an output end (e.g., an output end of a last/second stack mover system). Two or more of the stack mover systems of the modular stack mover system may overlap in a direction along which the vehicle is moved and may be displaced in a direction perpendicular to the direction along which the vehicle is moved. In the example shown, stack mover system 310 and stack mover system 320 overlap along the direction defined by guide rails 316, 326, and displaced (e.g., spaced apart) to enable the vehicle to move through the area at which stack mover systems 310, 320 overlap. With reference to FIG. 3, stack mover systems 310, 320 are sufficiently spaced apart in a horizontal direction to allow for a vehicle to fit therebetween. The extent to which the stack mover systems are displaced (e.g., horizontally displaced) may be based on a size of the vehicle. For example, stack mover systems 310, 320 are horizontally displaced to allow pusher units of stack mover system 310 to effectively engage the vehicle at a first side and for pusher units of stack mover system 320 to effectively engage the vehicle at a second side, which is opposite to the first side. As illustrated in FIG. 3, the overlapping of stack mover systems 310, 320 in a vertical/longitudinal direction and the displacement of stack mover systems 310, 320 in a horizontal direction define a transition zone 330 within which a vehicle is moved by stack mover system 310 and retrieved by stack mover system 320. In response to determining that stack mover system 310 has successfully moved a vehicle to transition zone 330, system 300 (e.g., control computer 380) controls to stop driving drive chain 313 (e.g., driving unit 311) and controls to resume/start driving drive chain 323 for stack mover system 320 to move the vehicle from transition zone 330 and along the path defined by guide rail 326 such that the vehicle is carried within range of robot arms 342, 344. For example, robot arm 342 is configured to have range 346, and robot arm 344 is configured to have range 348. The range of a robot arm may be an area within which the robot arm can efficiently and effectively perform pick and place operations. For example, the range may be an area within which a success rate (or an expected success rate) of a pick/place operation is greater than a predefined threshold.

In some embodiments, system 300 (e.g., control computer 380) coordinates control/driving of stack mover systems 310, 320. For example, system 300 controls stack mover systems to ensure that pusher units for each of stack mover systems 310, 320 do not obstruct movement of the vehicle through transition zone 330. In the example shown, drive chain 313 is driven to orient a next pusher unit of stack mover system 310 preceding the current pushing unit engaged to move the vehicle to ensure that the next pusher unit does not block/obstruct passage of the vehicle through transition zone 330. For example, the next pusher unit may be advanced to be within the housing of tensioning unit 312 so that the next pusher unit is not contacted by the vehicle as the vehicle is moved through transition zone 330. Similarly, system 300 controls stack mover system 320 (e.g., driving unit 321) to ensure that a pusher unit of stack mover system 320 does not obstruct passage or entrance of vehicle through/to transition zone 330. For example, system 300 controls driving unit 321 to drive the drive chain 323 to orient pusher unit via which stack mover system 320 is to engage the vehicle at transition zone 330 to be within a housing of driving unit 321 (or otherwise out of the path of the vehicle moving through transition zone 330). Once a rear of the vehicle passes the input end of stack mover system 320 (e.g., when the rear of the vehicle passes a point at pusher units are recirculated at driving unit 321 end), system 300 controls to drive driving unit 321 and to advance the pusher unit with which to engage the vehicle to a point at which the pusher unit engages the vehicle and applies a linear force on the vehicle to advance the vehicle through the workspace.

According to various embodiments, system 300 comprises one or more sensors that capture information pertaining to one or more of a workspace, including one or more of robotic stack mover systems 310, 320, the workspace of a robotic stack pusher system, transition zone 330, a buffer conveyance, gating structure 355, robot arms 342, 344, etc. The one or more sensors may include a vision system and/or various other types of sensors, including a weight sensor, a light sensor (e.g., a light array), a force sensor, etc. As example, system 300 may include a light sensor(s) that detects whether the robotic stack pusher system is in an extended state or a retracted state, or a position/location of one or more of the pusher structures comprised in the robotic stack pusher system. As another example, system 300 may include a force sensor that detects whether a payload is engaged by the robotic stack pusher system. As another example, system 300 may include a gate sensor(s) that detects a state of the gating structure such as whether a gate is in an open position, a closed position, or a position between the open state and closed state. As another example, system 300 may include one or more light sensors or vision system to determine locations of payloads (e.g., stacks of trays) as the payloads are moved through the robot workspace by the robotic stack mover system, or through the buffer area by a buffer conveyance. All or some of the one or more sensors may be comprised in a vision system of the system such as a vision system that operates to obtain information pertaining to items or components in the workspace of the robot arm, and with which the system controls the robot arm to move items (e.g., to stack/de-stack items with respect to a vehicle).

In the example shown, system 300 comprises one or more sensors, including vision system 375. In various embodiments, vision system 375 obtains the information associated with one or more of the workspace of robot arm 342, 344, or workspace of robotic stack mover system 310, transition zone 330, robotic stack mover system 310, robotic stack mover system 320, stack pusher system 350, buffer zone 360, and a buffer conveyance that moves stacks in buffer zone 360. Vision system 375 obtains the information associated with the workspace based at least in part on data obtained by one or more sensors (e.g., an image system such as a 2D/3D camera, a laser sensor, an infrared sensor, a sensor array, a weight sensor, etc.). Various other types of sensors may be implemented in connection with vision system 375. In various embodiments, system 300 may include a plurality of 3D (or other) cameras, such as camera 376, and may use image and depth data generated by such cameras to generate a three-dimensional view of at least relevant portions of the workspace and scene, such as the scene/state shown in FIG. 3. In some embodiments, cameras such as camera 376 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by vision system 375 such as camera 376 is used to move robot arms and end effectors into a position near a tray or stack of two or more trays to be grasped and picked up from a source stack and/or to position the tray(s) near a destination at which they are to be place, e.g., at the top of a corresponding destination stack. In some embodiments, force control is used to complete the final phases of a pick/grasp episode and/or a placement episode. The modular stack mover system (e.g., system 300) may use the image data generated by vision system 375 in connection with moving vehicles and performing kitting operations with respect to a tray(s) comprised in the vehicle. As an example, the image data generated by vision system 375 may be further used to control in coordination with each other two or more of stack pusher 350, stack mover system 310, stack mover system 320, robot arm 342, robot arm 344.

Although a single camera (e.g., camera 376) mounted to a wall in the workspace of system 300 is shown in FIG. 3, in various embodiments, multiple cameras or other sensors, or a combination thereof, may be mounted statically in a workspace. In addition, or instead, one or more cameras or other sensors may be mounted on or near each robot arm 342, 344, such as on the arm itself, and/or on the end effector of the corresponding robot arm, on a structure that travels with the robot arm 342, 344 as it is moved along a rail, on or around stack pusher system 350, stack mover system 310, and/or buffer zone 360, etc.

Although the example shown in FIG. 3 includes robot arms 342, 344 to perform operations (e.g., kitting operations) with respect to vehicles 325a, 235b, 235c (e.g., tray stacks) being moved using robotic stack mover system 320, various embodiments may include one or more robots that are disposed in proximity/range of robotic stack mover system 310, and such robots may be controlled to perform operations with respect to vehicles 315a, 315b, 315c being moved using robotic stack mover system 310.

Figure 4:
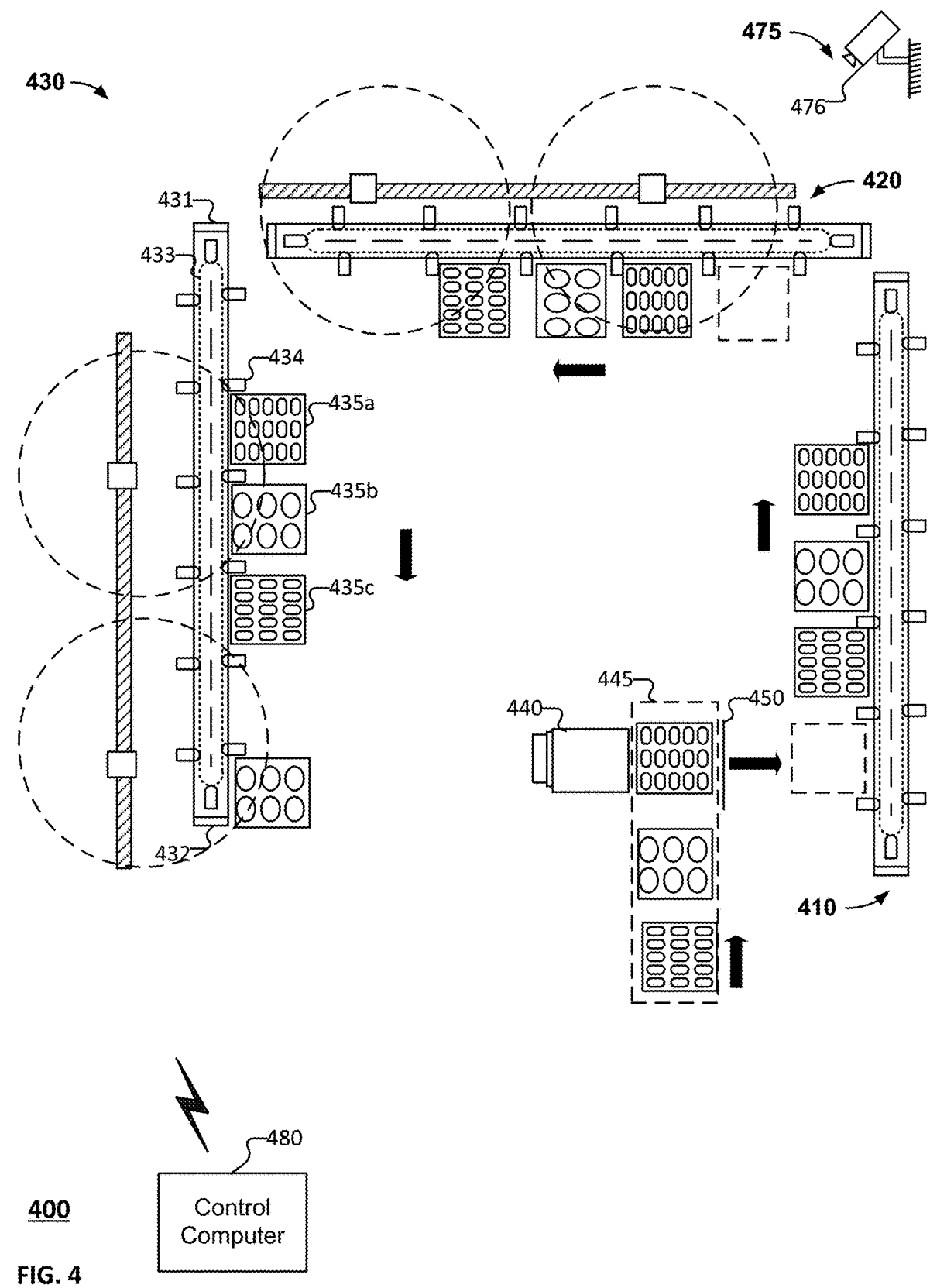
FIG. 4 is a block diagram illustrating a robotic line kitting system according to various embodiments.

FIG. 4 is a block diagram illustrating a robotic line kitting system according to various embodiments. In some embodiments, a kitting system comprises a modular stack mover system comprising two or more modules (e.g., stack mover systems) that are oriented in a non-linear orientation. For example, the modular stack mover system may comprise two or more stack mover systems that are oriented perpendicular to at least one other stack mover system. In the example shown, system 400 comprises a modular stack mover system comprising stack mover system 410 (e.g., a first stack mover system), stack mover system 420 (e.g., a second stack mover system), and stack mover system 430 (e.g., a third stack mover system). System 400 may use the modular stack mover system to move a vehicle through a workspace, such as from an input end (e.g., an input end to stack mover system 410) to an output end (e.g., an output end of stack mover system 430, a destination location, a vehicle return location, etc.). System 400 uses modular stack mover system in coordination with one or more robot arms to move vehicles within range of a robot arm and perform pick/place operations with respect to items/trays on the vehicles.

As illustrated in FIG. 4, a vehicle (e.g., a stack of trays on a dolly) are introduced to an input end of stack mover system 410 by robotic stack pusher system 440. Robotic stack pusher system 440 may engage a vehicle at a buffer zone 445. For example, one or more vehicles may be queued or staged in buffer zone 445. Buffer zone 445 may include a buffer conveyance structure that moves vehicles to a location at which stack pusher system 440 engages the vehicle. System 400 may further include gating structure 450 to mediate input of vehicles to the modular stack mover system. For example, control computer 480 controls gating structure 450 to open/close the gate in connection with inserting vehicles to the input end of stack mover system 410. When gating structure 450 is in an open configuration, a vehicle may pass through the gate and be introduced to stack mover system 410. When gating structure 450 is in a closed configuration, the gate prevents/inhibits a vehicle from entering stack mover system.

After a vehicle is inserted to the input end of stack mover system 410, control computer 480 controls stack mover system 410 to drive a pusher unit that pushes/pulls the vehicle from the input end along a path (e.g., a linear path defined by a guide rail of stack mover system 410. Stack mover system 410 moves the vehicle to an output end, which may correspond to a transition zone between stack mover systems 410, 420 or otherwise correspond to the input end of stack mover system 420. In response to a determination that the vehicle has been inserted/moved to the output end of stack mover system 410 (e.g., the input end of stack mover system 420), control computer 480 controls stack mover system 420 to move the vehicle along its path (e.g., a linear path defined by a guide rail of stack mover system 420). Control computer 480 may further control one or more robot arms disposed within proximity to stack mover system 420 to pick/place items/trays to/from vehicles being moved by stack mover system 420. As an example, the robot arm(s) may perform a pick/place operation while stack mover system 420 moves the vehicle. As another example, stack mover system 420 is controlled to move the vehicle to a location along its path that is within range of the robot arm(s) and controlled to stop moving the vehicle while the robot arm(s) are controlled to perform the pick/place operations with respect to items/trays comprised in the vehicle. Control computer 480 controls stack mover system 420 to move the vehicle to an output end, which may correspond to a transition zone between stack mover systems 420, 430 or otherwise correspond to the input end of stack mover system 420.

In response to a determination that the vehicle has been inserted/moved to the output end of stack mover system 420 (e.g., the input end of stack mover system 430), control computer 480 controls stack mover system 430 to move the vehicle along its path (e.g., a linear path defined by a guide rail of stack mover system 430). In the example shown, stack mover system 430 is a chain driven stack mover system comprising driving unit 431 that is controlled for driving drive chain 433. Stack mover system may further include tensioning unit 432 that is configured/controlled to enforce/control a tension of drive chain 433. Stack mover system 430 comprises a plurality of pusher units such as pusher unit 434. The pusher unit(s) may be operatively connected (e.g., mounted) to drive chain 433. As drive chain 433 is driven, the pusher unit(s) move and apply linear forces on vehicles (e.g., vehicles 435a, 435b, 435c) being pushed/pulled by the pusher units. Accordingly, in response to determining that the vehicle has been inserted to the input end of stack mover system 430 (or to a transition zone), control computer 480 controls stack mover system 430 to drive the drive chain 433 and a pusher unit engages the vehicle and moves the vehicle along the path of stack mover system 430.

In some embodiments, system 400 comprises one or more robots in proximity/range of stack mover system 430 or vehicles being moved by stack mover system 430. Control computer 480 may further control one or more robot arms disposed within proximity to stack mover system 430 to pick/place items/trays to/from vehicles being moved by stack mover system 430. As an example, the robot arm(s) may perform a pick/place operation while stack mover system 430 moves the vehicle. As another example, stack mover system 420 is controlled to move the vehicle to a location along its path that is within range of the robot arm(s) and controlled to stop moving the vehicle while the robot arm(s) are controlled to perform the pick/place operations with respect to items/trays comprised in the vehicle. Control computer 480 controls stack mover system 430 to move the vehicle to an output end (e.g., a vehicle return location), which may correspond to a transition zone between stack mover systems 430, 430 or otherwise correspond to the input end of stack mover system 430.

In some embodiments, system 400 comprises vision system 475, which may include various sensors or cameras such as camera 476. System 400 uses vision system 475 to obtain information pertaining to the workspace, such as to capture a state of the workspace. For example, system 400 may generate a model of the workspace based at least in part on the information obtained by vision system 475. Control computer 480 may use the information obtained by vision system 475 (e.g., the model of the workspace) to control in coordination two or more of stack pusher system 440, stack mover system 410, stack mover system 420, and/or stack mover system 430, and one or more robotic arms.

In the example shown, the path of stack mover system 420 is perpendicular to the paths of stack mover systems 410, 430. Accordingly, modular stack mover system is enabled to move vehicles in a non-linear path, such as an "L" shape or a "U" shape, etc. Orientation of the various stack mover systems may be configured based on a footprint of a warehouse/facility in which modular stack mover system is deployed. For example, the orientation of the various stack mover systems may be oriented to optimize a use of the footprint.

Figure 5:
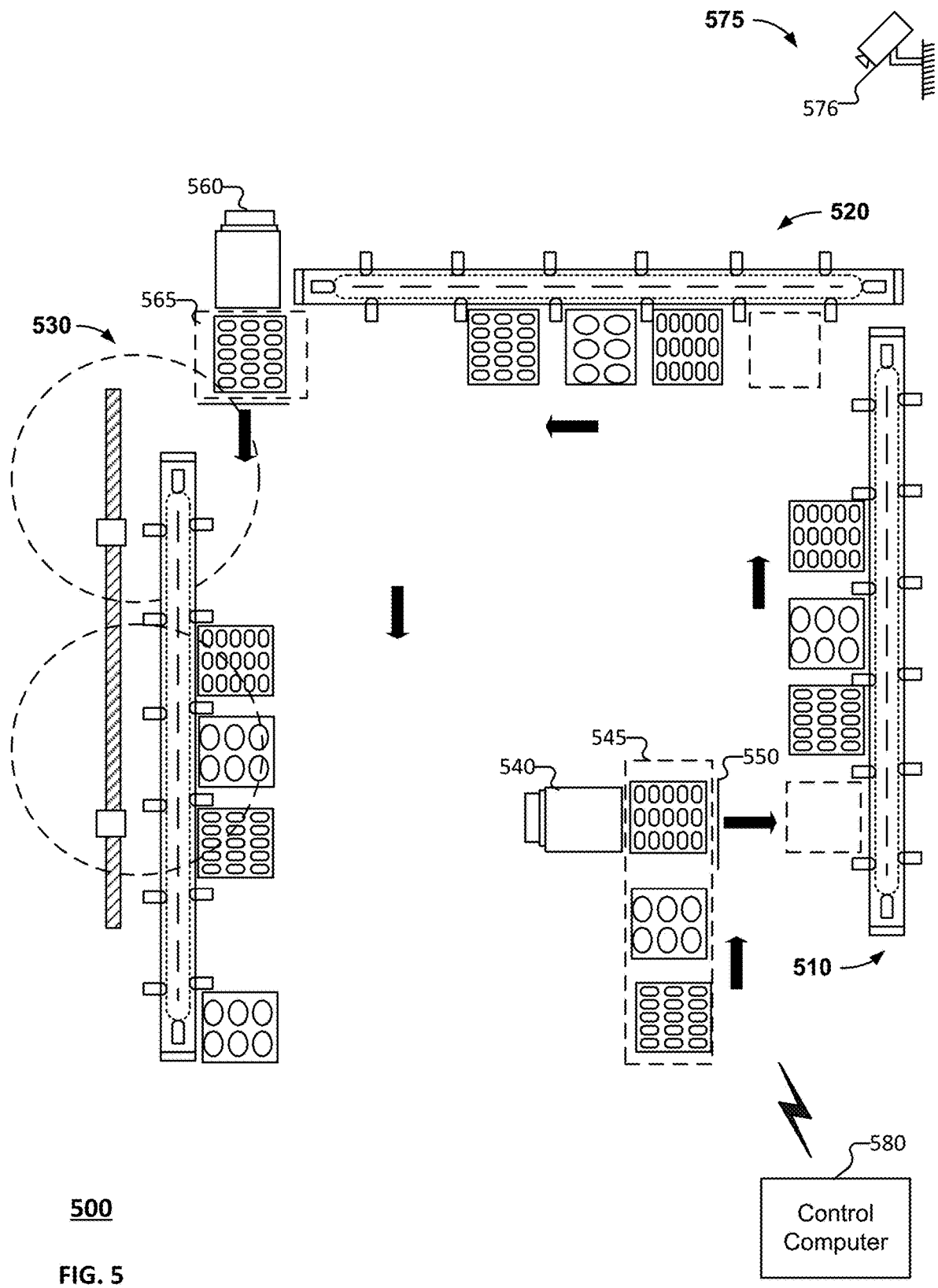
FIG. 5 is a block diagram illustrating a robotic line kitting system according to various embodiments.

FIG. 5 is a block diagram illustrating a robotic line kitting system according to various embodiments. In some embodiments, a modular stack system comprises a transition zone between two stack mover systems of the modular stack system. The transition zone may serve as a bridge that spans a space between the two stack mover systems. The transition zone may have a conveyance structure or stack pusher system that is configured to move vehicles from an output end of a stack mover system to an input end of the subsequent stack mover system.

In the example shown, control computer 580 controls stack pusher system 540 to push a vehicle from buffer zone 545, such as through gating structure 550, to insert the vehicle to an input end of stack mover system 510. In response to determining that the vehicle is inserted to stack mover system 510, control computer 580 controls stack mover system 510 to move the vehicle along its path to an output end of stack mover system 510, which may correspond to an input end of stack mover system 520, or otherwise move the vehicle to a transition zone spanning a distance between stack mover systems 510, 520. In response to determining that the vehicle is inserted to the input end of stack mover system 520, control computer 580 controls stack mover system 520 to move the vehicle from the input end to its output end. In the event that stack mover system 510 moves the vehicle to a transition zone that spans a distance between stack mover systems 510, 520, the vehicle is retrieved (e.g., by stack mover system 520, a conveyance structure or a vehicle pusher configured to move the vehicle from the transition zone to the input end of stack mover system 520).

As illustrated in FIG. 5, stack mover system 520 moves a vehicle to transition zone 565 located at an output end of stack mover system 520. However, because stack mover systems 520, 530 are vertically displaced, stack mover system 530 may not be able to engage the vehicle at the location at which stack mover system 520 moved the vehicle. In some embodiments, system 500 comprises s conveyance structure or stack pusher system 560 to move the vehicle from the output end of stack mover system 520 to an input end of stack mover system 530. In response to determining that the vehicle is inserted to stack mover system 530, control computer 580 controls stack mover system 530 to move the vehicle along its path to an output end (e.g., a vehicle return location).

Control computer 580 may further control one or more robot arms to pick/place items or trays from/to the vehicle. For example, control computer 580 controls the robot arm(s) in coordination with the modular stack mover system (e.g., stack mover system 530 of modular stack mover system). Control computer 580 may control the robot arm(s) to pick/place the item or tray from/to the vehicle as the vehicle is being moved by stack mover system 530. Alternatively, control computer 580 may control the robot arm(s) to perform the pick/place operation when stack mover system 530 has moved the vehicle to a particular location along the path or otherwise in proximity/range of the robot arm(s).

In some embodiments, a kitting system comprises a robot stack pusher system deployed in conjunction with a modular stack mover system.

According to various embodiments, the robotic stack pusher system is configured to load a payload (e.g., a payload such as a stack of trays such as a stack on a dolly) to a payload introduction location of a modular robotic stack mover system. The robotic stack pusher system may load the payload to an input end of a first stack mover system comprised in the modular robotic stack mover system. The robotic modular stack mover system is configured to receive a plurality of vehicles (e.g., dollies) comprising payloads (e.g., stacks of trays on vehicles) and to autonomously move at least one vehicle to a destination location within reach of a robot arm. For example, the robotic modular stack mover system moves the vehicle through the workspace to enable the robotic arm to perform pick/place operations with respect to the vehicle and to return the vehicle to a vehicle return location. The robot arm is controlled to move (e.g., pick and place) items (e.g., trays comprising a plurality of objects) to/from the vehicle (e.g., to/from the stack of trays). In various embodiments, the system determines to move the vehicle to the destination location in connection with determining that the items are to be moved to/from the vehicle (e.g., in response to determining to de-stack a stack of items comprised in the vehicle). The system may determine a plan to move the item to the destination location such as to within a range/workspace of a robot arm such as a particular robot arm among a plurality of robot arms comprised in a kitting system. The plan may include a plan to control a plurality of stack mover systems (e.g., modules of the modular stack mover system) in coordination to move the vehicle through the workspace and to the destination location (e.g., vehicle return location). For example, the plan includes operations to perform with respect to the plurality of stack mover systems during a transition of the vehicle from one mover system (e.g., a first mover system) to another mover system (e.g., a second mover system), such as the transition for moving the vehicle using one mover system and then to move the vehicle using the other mover system.

According to various embodiments, the robotic stack pusher system comprises a set of one or more pusher structures. For example, the stack pusher system comprises at least a payload engagement pusher structure (e.g., a pusher structure that engages a stack of trays to move the stack of trays to a destination location). The system controls to move (e.g., linearly extend) the payload engagement pusher structure from a retracted position to an extended position to engage the payload. In some embodiments, the stack pusher system comprises a plurality of pusher structures, including at least the payload engagement pusher structure and a first pusher structure. The plurality of pusher structures may further include one or more intermediate pusher structures. In the case that the stack pusher system comprises a plurality of pusher structures, the system controls to move the pusher structures to telescopically extend to the extended position. The pusher structures may sequentially extend from their respective individual retracted positions. For example, when the stack pusher system controls the movement of the pusher structures, the stack pusher system controls to move the payload engagement pusher structure to move to be extended relative to the other pusher structures. In response the payload engagement pusher structure being extended to a threshold point (e.g., the payload engagement pusher structure being fully extended relative to the other pusher structures), the stack pusher system controls to sequentially extend the other pusher structures. The pusher structures may be a plate or other planar structures or assemblies that may be stacked on each other in a nested configuration. The plurality of pusher structures may be in a nested configuration when the stack pusher system is in a retracted state, and as the stack pusher system controls to move the payload, the system controls an actuation device that causes the plurality of pusher structures to sequentially extend relative to their respective subsequent pusher structure (e.g., the subsequent pusher structure is a next pusher structure to be moved/extended after the current pusher structure is moved to be extended relative to the subsequent pusher structure). If the stack pusher system comprises the payload engagement pusher structure, the first pusher structure, and one or more intermediate pusher structures, the pusher structures are arranged/configured such that when operating the stack pusher system is transitioned to be arranged in an extended state (e.g., to push the payload), the payload engagement pusher structure is first extended relative to the other pusher structures, then the one or more intermediate pusher structures are extended relative to each other, and then first pusher structure is extended relative to a base plate to which the plurality of pusher structures are operatively connected.

In some embodiments, the stack pusher system includes a plurality of pusher structures that telescopically extend/retract as the system is transitioned to an extended state (e.g., to push the payload to a destination location) or a retracted state (e.g., to allow for a subsequent payload to be loaded to the buffer zone). The use of a plurality of pusher structures that sequentially telescopically extend/retract improves the efficiency of the system for pushing payloads (e.g., stacks of trays). For example, the stack pusher system comprising the nested pusher structures that telescopically extend/retract is more space efficient than a system comprising a single pusher structure that linearly extends from a starting position (e.g., a base plate) because the plurality of pusher structures is nested. The cascading and offset stages (e.g., the offset of a plurality of pusher structures) allows the stack pusher system to be compact (e.g., when in the retracted state). As another example, the stack pusher system is more cost efficient than a stack pusher system comprising a single pusher structure that linearly extends from the starting position. The stack pusher system dimensions, compactness, and function satisfy the criteria or other requirements for moving the payloads and allow for deployment within an available/allotted installation space. The dimensions of the pusher structures may be selectively determined based on dimensions of a space at which the stack pusher system is to be deployed (e.g., in a warehouse).

FIG. 6A is a block diagram illustrating a stack pusher system according to various embodiments. In some embodiments, stack pusher system 600 is implemented in connection with system 100 of FIGS. 1A-1C, system 200 of FIG. 2, system 300 of FIG. 3, system 400 of FIG. 4, and/or system 500 of FIG. 5. For example, stack pusher system 600 may be deployed in a system comprising a robotic stack mover system that is configured to move vehicles (e.g., stacks such as stacks of trays) through a workspace in connection with one or more robot arms performing pick and place operations with respect to the vehicles (or with respect to items in the vehicles).

In the example shown, stack pusher system 600 comprises an actuation device 605, one or more pusher structures 610, and pushing mechanism 615. Actuation device 605 is configured to move at least one pusher structure of the one or more pusher structures. For example, actuation device 605 is configured to move the at least one pusher in connection with moving (e.g., configuring) the one or more pusher structures between a retracted state and an extended state. Actuation device 605 is actuated (e.g., controlled by a control computer) to cause one or more pusher structures 610 to move to an extended state to move (e.g., push) stack 620. Stack 620 may comprise one or more items, such as one or more items comprised in trays 625. In some embodiments, robotic stack pusher system 600 moves stack 620 to an input end (e.g., a destination location) of a robotic stack mover system. For example, a control computer controls actuation device 605 to move one or more pusher structures 610 to an extended state to insert stack 620 to the input end of a robotic stack mover system.

The example illustrated in FIG. 6A shows robotic stack pusher system 600 in a retracted state (e.g., retracted with respect to a base plate or actuation device 605). In some embodiments, robotic stack pusher system 600 (e.g., a control computer controlling robotic stack pusher system 600) controls pushing mechanism 615 to drive actuation device 605 in connection with moving one or more pusher structures 610. Various pusher mechanisms may be implemented to control/apply a force (e.g., a linear force) to at least one pusher structure of one or more pusher structures 610. In some embodiments, the linear force is applied by a linear shaft, the position of which may be controlled via an actuating force of pushing mechanism 615. Examples of the pushing mechanism include (i) air or hydraulic pistons, (ii) linear actuators, and (iii) electric motor driven rack/pinion or other linear gear mechanism, etc. Robotic stack pusher system 600 may control pushing mechanism 615 based on information obtained by one or more sensors comprised in a robot workspace, such as based on a model of the workspace generated based on information obtained from a vision system, etc. For example, the system (e.g., the control computer) controls to actuate actuation device 605 based on a state of pick and place operations with respect to a stack/vehicle being processed by a robotic stack mover system. As another example, the system controls to actuate actuation device 605 based on a state of the robotic stack mover system, such as a determination that a vacant stack area/zone is available (e.g., an area between two adjacent pusher units of robotic stack mover system), etc.

In some embodiments, actuation device 605 comprises a linear shaft or other mechanism to apply a linear force to at least one pusher structure of one or more pusher structures 610. As an example, the linear shaft may be operatively coupled to at least one pusher structure such that the at least one pusher structure receives a linear force and is caused to move when the linear shaft is controlled to move or apply a force in a direction in which the pusher structure(s) extend towards extended state or in a reverse direction according to which the pusher structure(s) retract towards the retracted state.

Figure 6B:
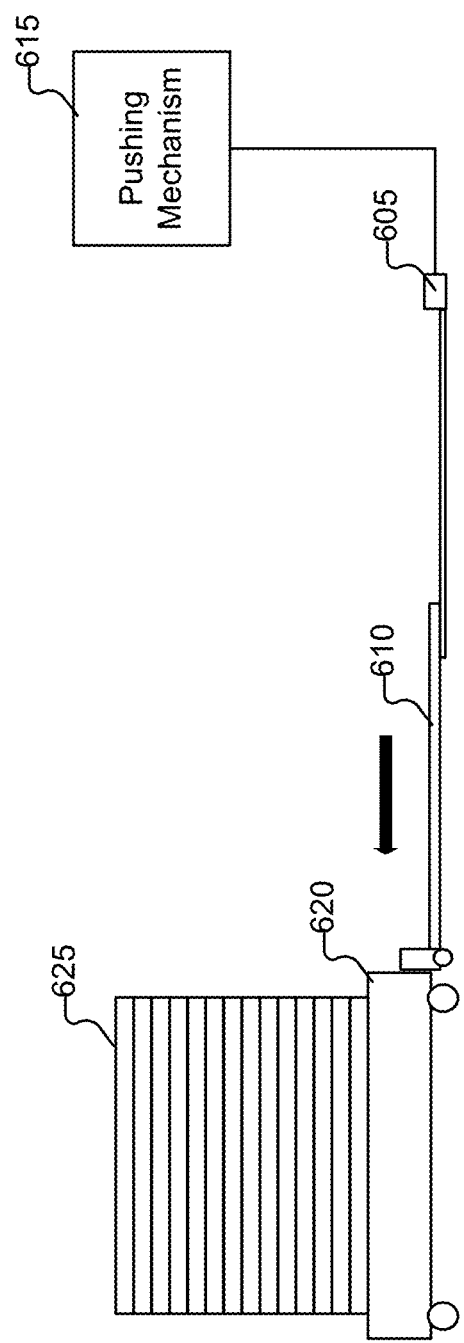
FIG. 6B is a block diagram illustrating a stack pusher system according to various embodiments.

FIG. 6B is a block diagram illustrating a stack pusher system according to various embodiments. In the example shown, actuation device 605 has been controlled to transition one or more pusher structures 610 to an extended state. In response to driving the pushing mechanism 615 and actuating a linear force via actuation device 605, a linear force is applied to one or more pusher structures 610, which in turn push stack 620.

According to various embodiments, a system comprises a stack pusher system (e.g., stack pusher system 600) and a modular stack mover system (e.g., system 400 of FIG. 4, system 500 of FIG. 5, etc.). The system may control the stack pusher system and the modular stack mover system (e.g., comprising two or more modules/stack mover systems) in coordination to cause stack pusher system to insert stacks/vehicles to an input end of the modular stack mover system, and to cause modular stack mover system to move the stacks/vehicles through a robot workspace to allow for robot arms to perform pick and place operations with respect to the stacks/vehicles. An example of a robotic stack mover system is described in further detail in connection with FIGS. 4, 5, and 9.

FIG. 7A is a diagram illustrating a stack pusher according to various embodiments. In some embodiments, robotic stack pusher system 700 comprises a plurality of pusher structures. In the example shown, robotic stack pusher system 700 comprises first pusher structure 715 and stack engagement pusher structure 720. Stack engagement pusher structure 720 (also referred to as a payload engagement pusher structure) engages stack/vehicle 725 and causes stack/vehicle to move, such as in a direction towards an input end of a robotic stack mover system. First pusher structure 715 and/or state engagement pusher structure may be operably connected to base plate 705. Robotic stack pusher system 700 is illustrated in substantially a retracted state. For example, robotic stack pusher system 700 is partially extended (e.g., in relation to base plate 705) to provide illustration of the nested configuration of first pusher structure 715 and stack engagement pusher structure 720. As illustrated in FIG. 7A, first pusher structure 715 is partially enveloped by stack engagement pusher structure 720 when in the retracted state.

The system may control a driving mechanism (not shown) to drive/actuate actuation device 710. Actuation device 710 may comprise a pushing mechanism that applies a linear force on one or more of first pusher structure 715 and stack engagement pusher structure 720, thereby causing robotic stack pusher system 700 to transition to an extended state (e.g., from a retracted state) or to transition to a retracted state (e.g., from the extended state such as after the stack has been successfully inserted to the robotic stack mover system). Examples of the pushing mechanism include (i) air or hydraulic pistons, (ii) linear actuators, and (iii) electric motor driven rack/pinion or other linear gear mechanism, etc. In the example shown, actuation device 710 has a pushing mechanism comprising an air or hydraulic piston. As an example, if the pushing mechanism comprises an air piston, driving the driving mechanism causes the air piston to move in a linear direction that is substantially parallel with the direction in which the pusher structures extend or retract. The air piston may comprise a linear shaft that applies a linear force one or more of first pusher structure 715 and stack engagement pusher structure 720 as the air piston is actuated.

Robotic stack pusher system 700 may be deployed in a warehouse or other facility in which stacks/vehicles are processed and pick and place operations are performed with respect to the stacks/vehicles. In some embodiments, robotic stack pusher system 700 is bolted (or otherwise connected) to the facility via base plate 705 (e.g., base plate 705 may include through holes via which robotic stack pusher system 700 is bolted to the ground). As another example, base plate 705 is made of a sufficiently rigid and/or heavy material (e.g., steel) to enable deployment of robotic stack pusher system 700 without being connected to the ground. Base plate 705 may be sufficiently heavy to prevent robotic stack pusher system 700 from vibrating and/or moving while being operated.

Figure 7B:
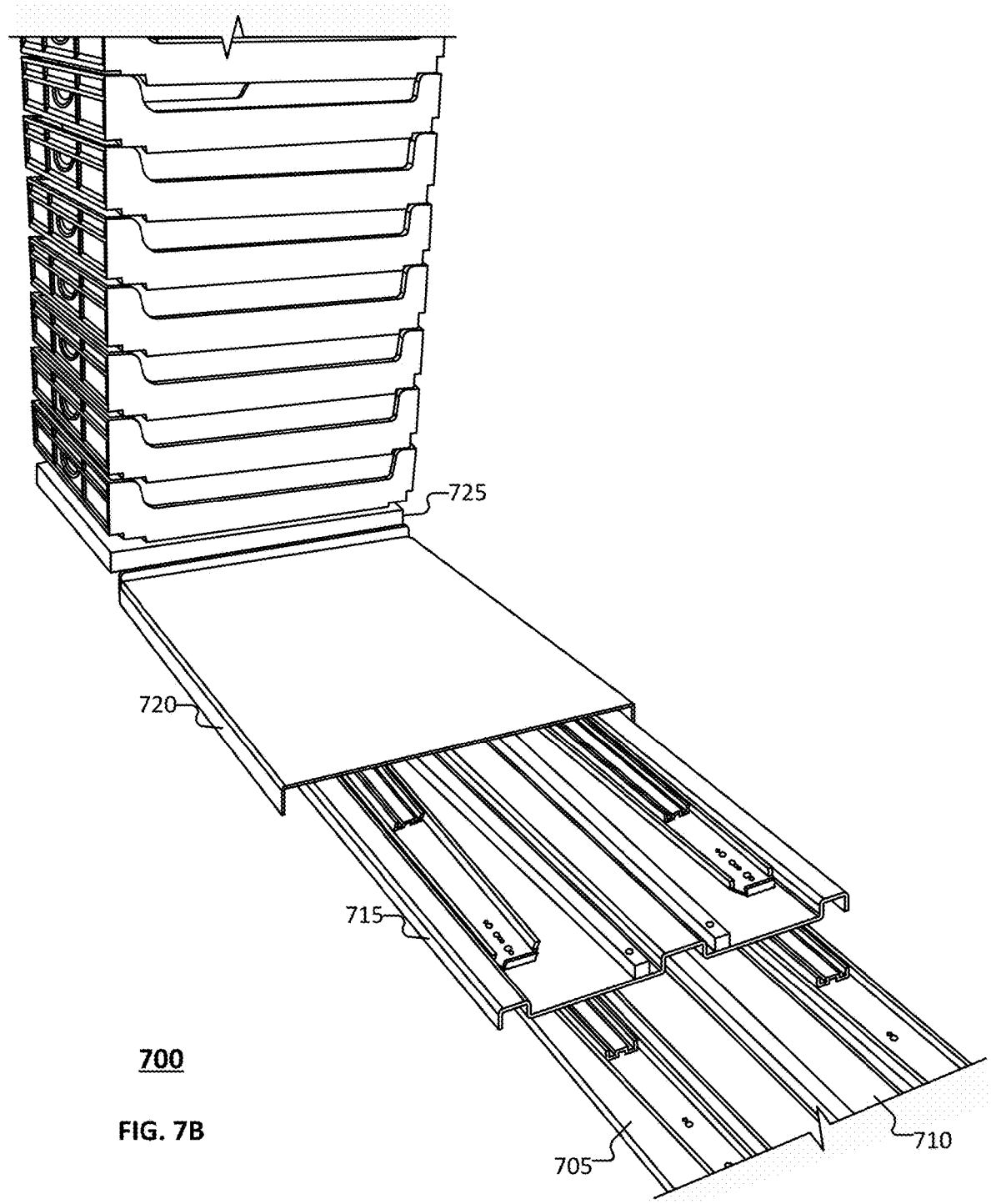
FIG. 7B is a diagram illustrating a stack pusher according to various embodiments.

FIG. 7B is a diagram illustrating a stack pusher according to various embodiments. In the example shown, robotic stack pusher system 700 is configured in an extended state according to which stack engagement pusher structure 720 is extended relative to both first pusher structure 715 and base plate 705, and first pusher structure is extended relative to base plate 705. As actuation device 710 of robotic stack pusher system 700 is controlled to transition robotic stack pusher system 700 to the extended state (e.g., by applying a linear force on one or both of stack engagement pusher structure 720 and first pusher structure 715), stack engagement pusher structure 720 in turn applies a linear force on stack/vehicle 725.

Robotic stack pusher system 700 may transition to a retracted state, such as in response to a determination that a stack/vehicle has been successfully moved to a destination location (e.g., to an input end of the robotic stack mover system). In response to determining to transition the system to the retracted state, the system controls actuation device 710 (e.g., by controlling or otherwise actuating/driving compressed air) to apply a retracting force. For example, actuation device 710 applies the retracting force (e.g., a linear force in a direction opposite to which the force used to extend the system) to one or both of stack engagement pusher structure 720 and first pusher structure 715.

Figure 8A:
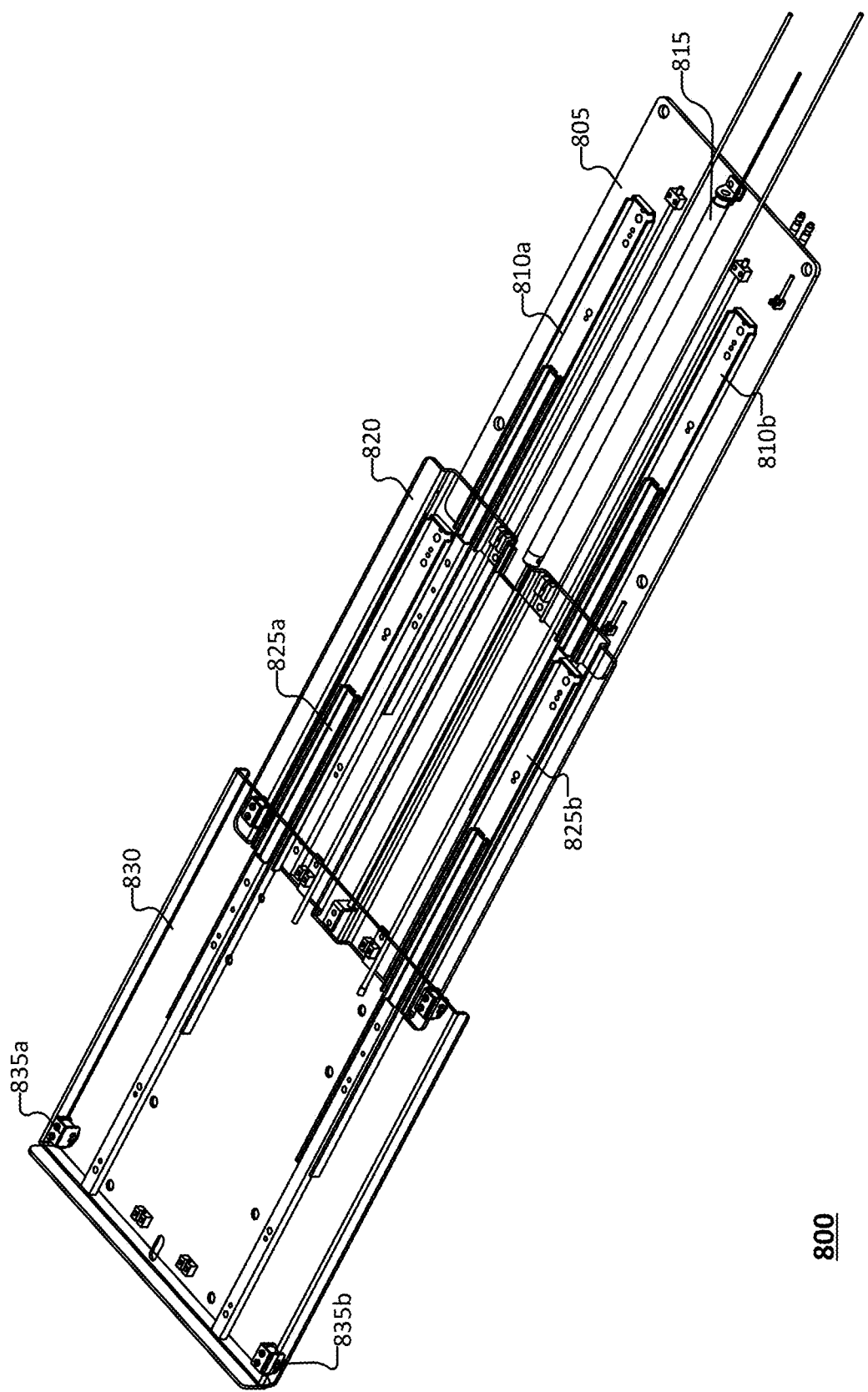
FIG. 8A is a diagram illustrating a stack pusher in an extended state according to various embodiments.
Figure 8B:
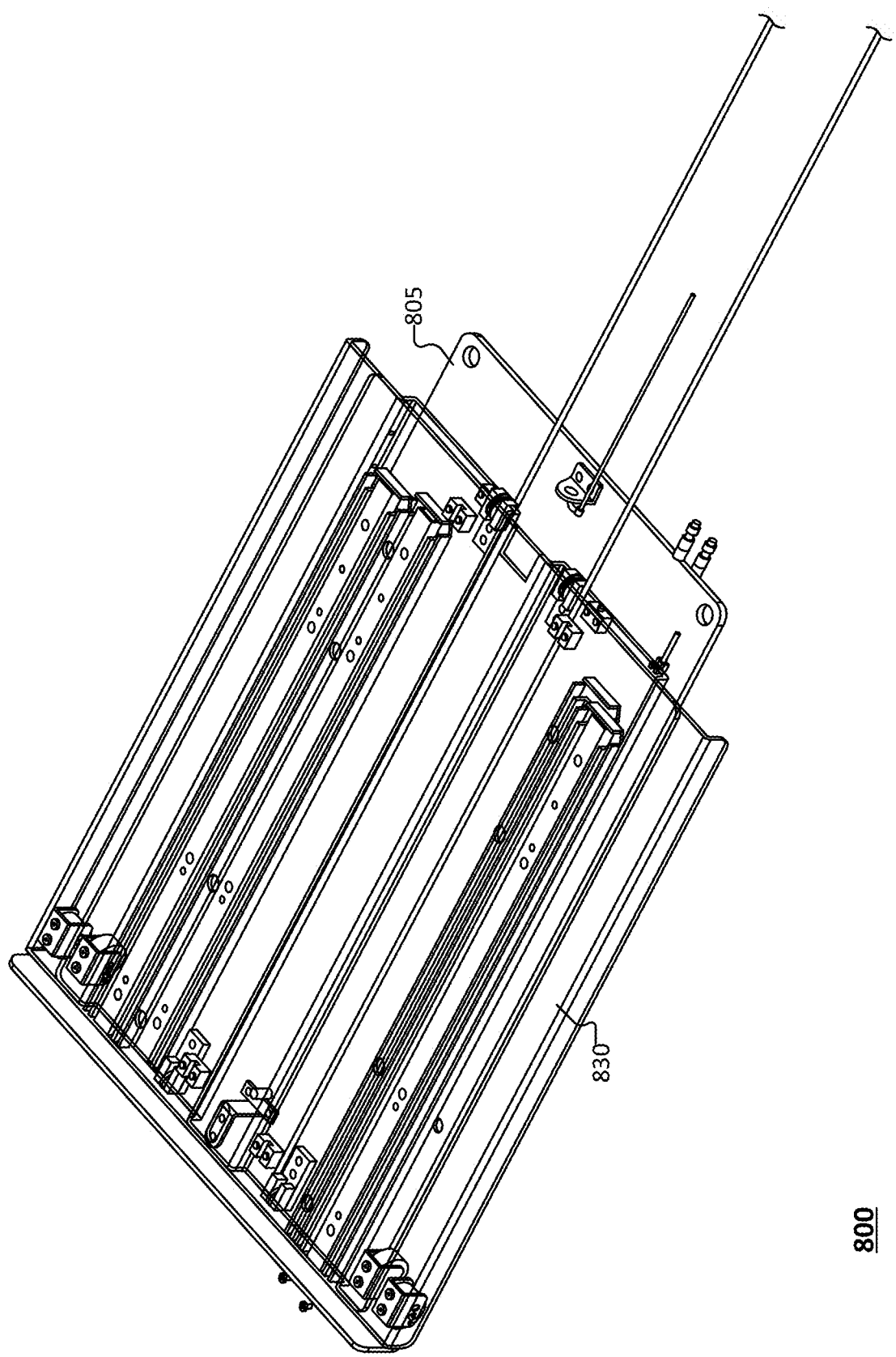
FIG. 8B is a diagram illustrating a stack pusher in a retracted state according to various embodiments.
Figure 8C:
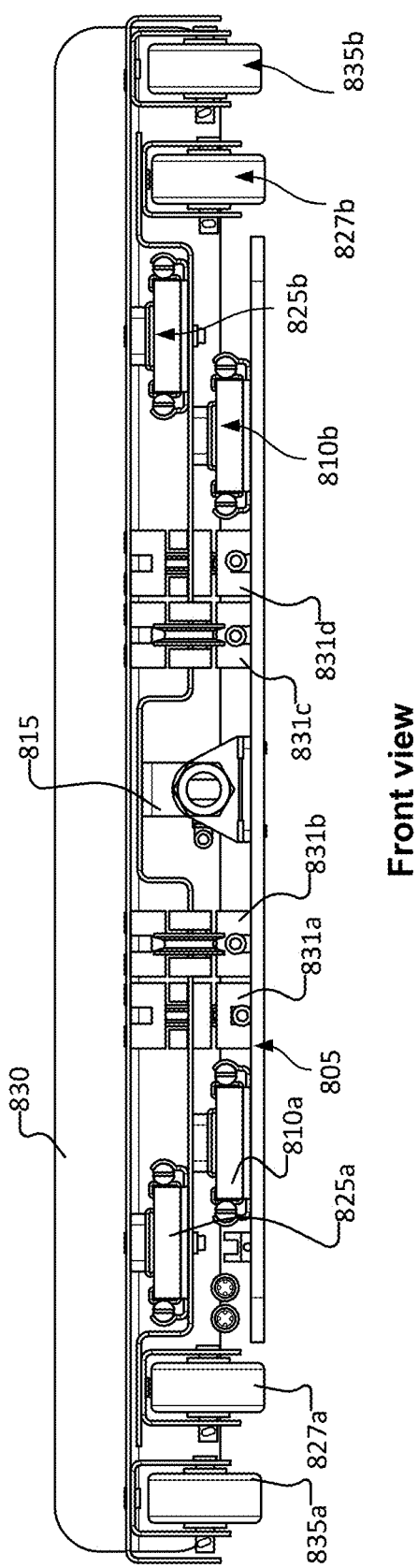
FIG. 8C is a diagram illustrating a front view of a stack pusher in a retracted state according to various embodiments.

FIG. 8A is a diagram illustrating a stack pusher in an extended state according to various embodiments. FIG. 8B is a diagram illustrating a stack pusher in a retracted state according to various embodiments. FIG. 8C is a diagram illustrating a front view of a stack pusher in a retracted state according to various embodiments.

According to various embodiments, stack pusher system 800 comprises N cascading stages (e.g., pusher structures) that extend/retract according to robotic control. N being a positive integer. In some embodiments, the N cascading stages are configured with bearing slides that are powered by a series of pulleys and an air cylinder that allows the N cascading stages to retract and expand on approximately an N:1 ratio (e.g., the N cascading stages may be completely nested with respect to each other).

In the example shown, stack pusher system 800 comprises base plate 805 and a plurality of pusher structures (e.g., first pusher structure 820 and stack engagement pusher structure 830). The plurality of pusher structures may be controlled to extend or retract relative to base plate 805, such as in connection with inserting a stack to a stack mover system. In some embodiments, the stack pusher system controls to extend/retract the plurality of pusher structure by controlling the application of a linear force by actuation device 815 (e.g., an air piston controlled with compressed air, etc.). The plurality of pusher structures may be (partially) supported by one or more wheels that roll on the ground of the warehouse at which stack pusher system 800 is deployed to promote a smooth and efficient transition between the extended state and the retracted state. As an example, as illustrated in FIG. 8A, stack engagement pusher structure 830 is supported by wheels 835a, 835b. Stack engagement pusher structure 830 may be further supported by support structures comprised in (or connected to) first pusher structure 820, such as drawer slides 825a, 825b that are configured to move between a retracted state and an expected state to facilitate the extending/retracting of stack engagement pusher structure 830 relative to first pusher structure 820. The support of the pusher structure (e.g., stack engagement pusher structure 830) by wheels and the support structures (e.g., drawer slides) promote a mechanically stable system that is supported over its range of motion (e.g., between extended state and retracted state). Similarly, first pusher structure 820 may be supported by wheels or support structures (e.g., wheels 827a, 827b). For example, first pusher structure 820 may be at least partially supported via drawer slides 810a, 810b that are comprised in (or connected to) base plate 805.

In the example shown, actuation device 815 is connected one or more of the pusher structures. For example, actuation device 815 may apply a linear force to stack engagement pusher structure 830 in connection with controlling extension/retraction of stack engagement pusher structure 830. As stack engagement pusher structure 830 extends to its extended state relative to first pusher structure 820, stack engagement pusher structure 830 may apply a linear force to first pusher structure 820 to pull first pusher structure 820 to its extended state relative to base plate 805.

In the example shown in FIG. 8B, stack pusher system 800 is configured in the retracted state. In contrast to FIG. 8A, stack engagement pusher structure 830 completely (or nearly completely) covers first pusher structure 820. For example, first pusher structure 820 is nested within stack engagement pusher structure 830. In the retracted state, both stack engagement pusher structure 830 and first pusher structure 820 are retracted relative to base plate 805. Thus, stack pusher system 800 has a compact profile which is space efficient in the retracted state but that promotes control to move stacks in the workspace via controlled extension of the pusher structure(s).

In the example shown in FIG. 8C, stack pusher system 800 comprises pulleys 831*a*, 831*b*, 831*c*, and 831*d* to which the pusher structures are connected and that facilitate the application of the linear force across the pusher structures while stack pusher system 800 is transitioned between the extended state and retracted state.

Figure 9:
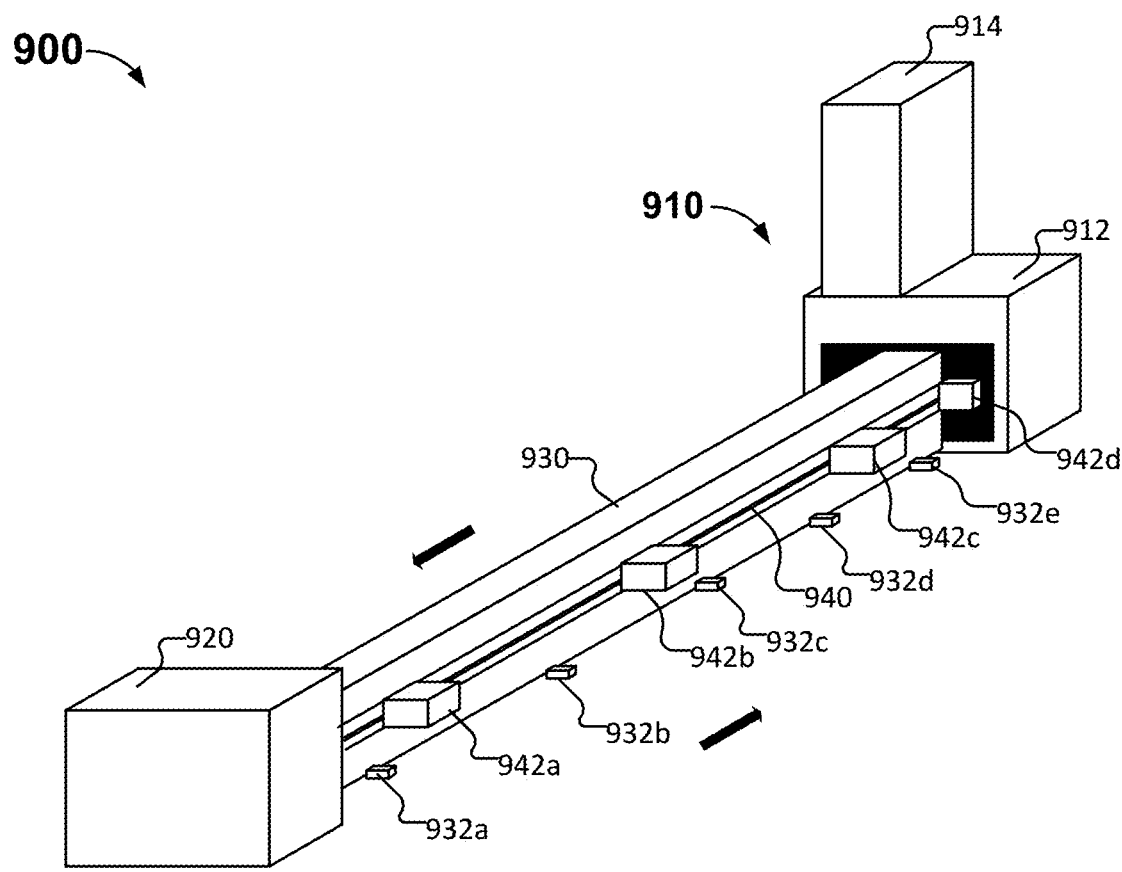
FIG. 9 is a block diagram illustrating an embodiment of a stack mover system.

FIG. 9 is a block diagram illustrating an embodiment of a stack mover system. The stack mover system may be comprised in a modular stack mover system. For example, stack mover system 900 may be implemented as stack mover system(s) 310, 320 of FIG. 3, stack mover system(s) 410, 420, 430 of FIG. 4, and/or 510, 520, 530 of FIG. 5. In the example shown in FIG. 9, system 900 comprises driving unit 910 and tensioning unit 920. Driving unit may comprise support structure 912 and motor 914. Motor 914 is configured to control movement of drive chain 940 along the path defined by guide rail 930. In various embodiments, system 900 comprises a set of rail feet, such as rail feet 932*a*, 932*b*, 932*c*, 932*d*, and/or 932*e*, to provide support for system 900. The rail feet may be bolted to a surface on which system 900 is located, such as a factory floor.

In various embodiments, rail feet support two guide rails side-by-side: a first guide rail in which part of drive chain 940 travels from tensioning unit 920 to driving unit 910 (e.g., a drive end), and a second guide rail in which part of drive chain 940 travels from driving unit 910 to tensioning unit 920. As an example, drive chain 940 is guided through the entire system 900. For example, as illustrated in FIG. 9, the drive chain 940 enters the support structure of driving unit 910 or tensioning unit 920 to change a direction of drive chain 940 and to recirculate the drive chain within system 900. In various embodiments, one guide rail is used to engage a vehicle (e.g., pull/push a vehicle along the path), and another guide rail is used to recirculate drive chain 940. The guide rails may be a channel in which a drive chain 940 is located, and the pusher units may be mounted to the drive chain 940 and to extend to an exterior of the guide rails. Drive chain 940 comprises a set of pusher units, such as 942*a*, 942*b*, 942*c*, and 942*d*. As illustrated, pusher unit 942*d* is being moved into support structure 912 of driving unit 910 at which pusher unit 942 will recirculate to begin moving towards tensioning unit 920. Drive chain 940 may be a double pitch chain to which pusher units 942*a*, 942*b*, 942*c*, and 942*d* are mounted.

According to various embodiments, a pusher unit comprises (or corresponds to) a drive bracket that is configured to be mounted to the drive chain. The drive bracket is mounted to the drive chain at a proximal end of the drive bracket. In various embodiments, the drive bracket comprises one or more chamfers to provide clearance of the drive bracket as the drive bracket traverses the robotic stack mover system, or to promote insertion of a vehicle between two adjacent drive brackets (e.g., to guide the vehicle to the space between the two adjacent guide brackets).

Pusher units may include a drive bracket that comprises one or more chamfers at proximal end (e.g., the end closer to the stack), which is connected to the drive chain such as by mounting bolt(s). The chamfers may be configured to provide clearance for the drive brackets as the drive brackets move within the robotic stack mover system (e.g., to avoid collisions with a structure of robotic stack mover system such as a driving sprocket or tensioning sprocket, or the drive chain or adjacent drive bracket). The chamfers may also serve to guide stacks/vehicles during insertion of the stacks/vehicles to the robotic stack mover system.

In some embodiments, a robotic stack pusher system is deployed in connection with system 900. The robotic stack pusher system is robotically controlled to insert stacks/vehicles to an input end of robotic stack mover system of system 900. In the example shown, the input end (e.g., the destination location for vehicles being inserted by the robotic stack pusher system) may correspond to an area closer to tensioning unit 920 than foot 932*b*. As shown, the pusher units 942*a*, 942*b*, 942*c* progress from an end at which tensioning unit 920 is disposed to an end at which driving unit 910 is disposed. Accordingly, the robotic stack pusher system inserts the stack/vehicle at the input end, and the robotic stack mover system of system 900 moves the stack/vehicle through the workspace towards the end at which driving unit 910 is disposed. As an example, by the time the stack/vehicle has moved in proximity to the driving unit 910, a robot arm(s) have completed pick and place operations with respect to the stack/vehicle and the stack/vehicle is moved to a return location.

In some embodiments, the system comprises a stack pusher system to move a payload(s), such as to insert the payload(s) to a stack mover system. The payload may be a floor-level payload. Stack pusher system is configured to move payloads of variable height or weight. For example, the payload may include a dolly comprising a set of trays stacked thereon.

Figure 10A:
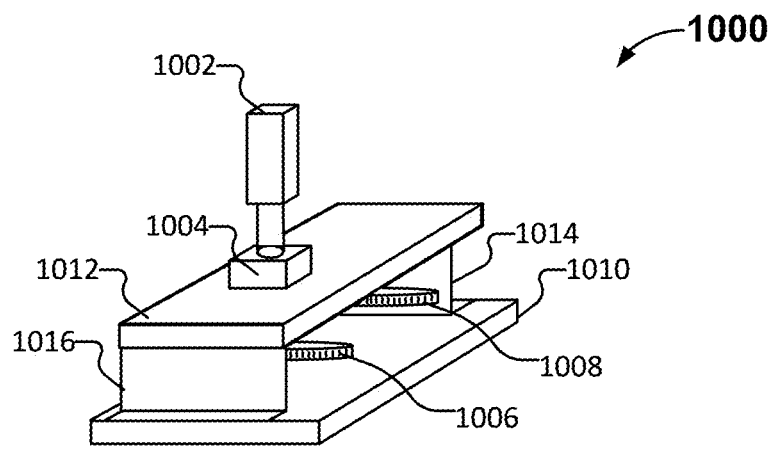
FIG. 10A is a diagram illustrating an embodiment of a driving unit of a robotic stack mover system.
Figure 10B:
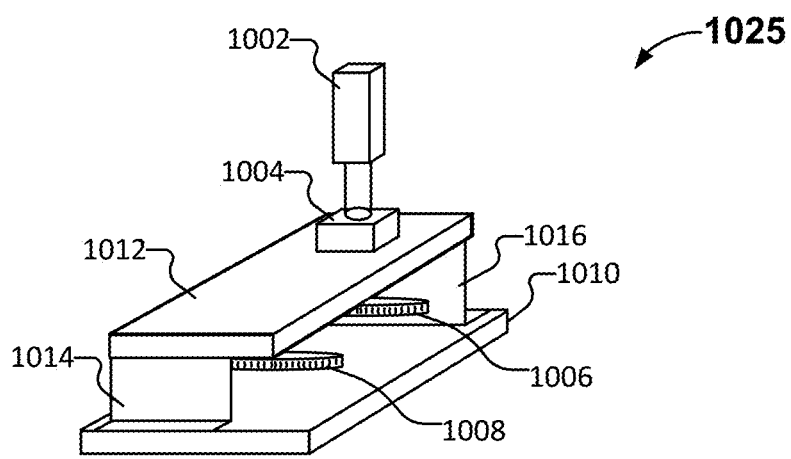
FIG. 10B is a diagram illustrating an embodiment of a driving unit of a robotic stack mover system.

FIG. 10A is a diagram illustrating an embodiment of a driving unit of a robotic stack mover system. FIG. 10B is a diagram illustrating an embodiment of a driving unit of a robotic stack mover system. As illustrated in FIGS. 10A and 10B, driving unit 1000 and driving unit 1025 may have different configurations, such as based on an end of the robotic stack mover system at which the corresponding driving unit is to be deployed. As an example, driving unit 1000 may correspond to a right-end driving unit, and driving unit 1025 may correspond to a left-end driving unit.

According to various embodiments, the driving unit is designed to be extensible for deployment in different configurations. Driving units for different configurations may comprise the same set of components, and an arrangement of the set of components may be modified based on an orientation of the driving unit relative to the robotic stack mover system. For example, driving unit 1000 and driving unit 1025 respectively comprise a motor 1002, a driving sprocket 1006, an idler sprocket 1008, a bottom support 1010 (e.g., a bottom plate), a top support 1012 (e.g., a top plate), a first side support 514 (e.g., a first side plate), and a second side support 1016 (e.g., a second side plate). Driving unit 1000 and driving unit 1025 may further include gear box 504. In some embodiments, motor 1002 is a high torque motor, and gearbox 1004 couples and drives driving sprocket 1006. Motor 1002 is connected to driving sprocket 1006 such that when motor 1002 is driven the motor causes driving sprocket 1006 to rotate. When a drive chain is engaged with driving sprocket 1006, rotation of driving sprocket 1006 correspondingly causes the drive chain to move (which can correspondingly cause a vehicle engaged with a pusher unit to also move). The support structure of the driving unit (e.g., bottom support 1010, top support 1012, first side support 1014, and second side support 1016) may be made of a metal such as aluminum, steel, or other metallic alloy, or other material that is sufficiently strong to support the driving unit and protect components operating within the driving unit.

The design of the driving unit to use a same set of components for different configurations of the driving unit promotes a more efficient manufacturability of driving units. For example, a greater level of economic efficiencies may be attained in the manufacture of such driving units.

Figure 10C:
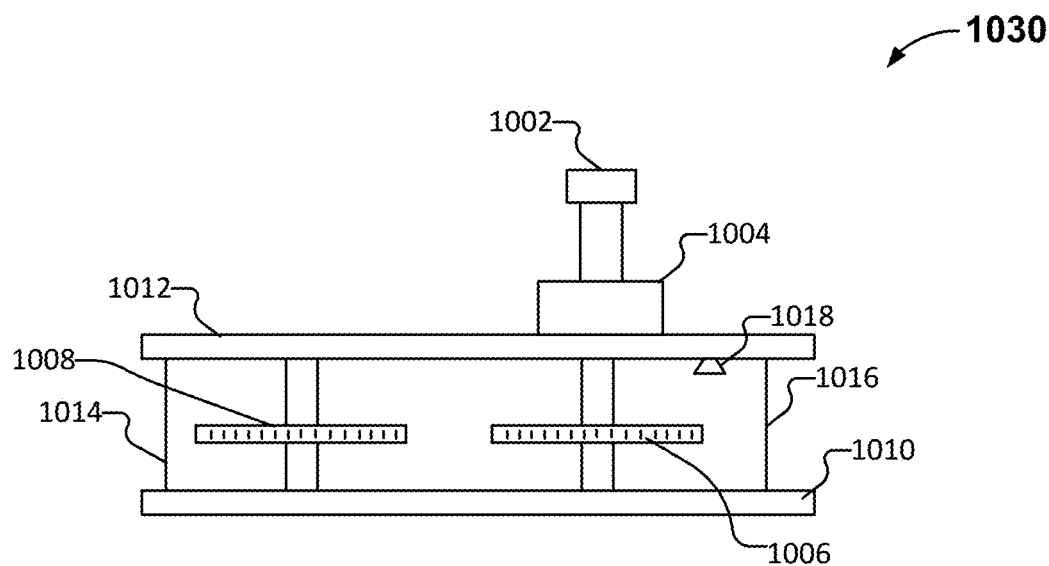
FIG. 10C is a diagram illustrating an embodiment of a driving unit of a robotic stack mover system.

FIG. 10C is a diagram illustrating an embodiment of a driving unit of a robotic stack mover system. As illustrated in FIG. 10C, driving unit 1030 may further include one or more sensors such as sensor 1018. The robotic stack mover system can use information obtained by the one or more sensors in connection with calibrating the system. For example, at least one of the one or more sensors may be configured to obtains information pertaining to an alignment of the drive chain, such as a pusher unit mounted to the drive chain. The one or more sensors can detect a location or presence of at least one of the set of pusher units. Sensor 1018 may be a sensor array, a reflective sensor, etc. that detects a location/presence of a pusher unit (e.g., a driving bracket). Various other types of sensors may be implemented.

The system uses one or more sensors to calibrate a positioning of one or more pusher units that are used to move vehicles throughout the system (e.g., along a path in a direction that is the same as a direction of a length of a guide rail). The system calibrates the one or more pusher units in connection with ensuring that the system has knowledge of a location of at least one of the one or more pusher units and/or relative locations of one or more other pusher units. Calibration of the system ensures that the system can determine a location of a pusher unit, and by extension, a location (or relative location) of a vehicle (e.g., a cart, dolly, etc.). Upon calibration, the system is able to keep track of a location of a vehicle, determine a number of vehicles that are engaged by the system (e.g., engaged by a respective pusher unit for control of moving the vehicle), etc.

According to various embodiments, driving unit 1030 is implemented in connection with system 100 of FIG. 1A-1C, system 200 of FIG. 2, system 300 of FIG. 3 (e.g., as driving unit 311 and/or driving unit 321), system 400 of FIG. 4 (e.g., as driving unit 431), and/or system 500 of FIG. 5.

Figure 10D:
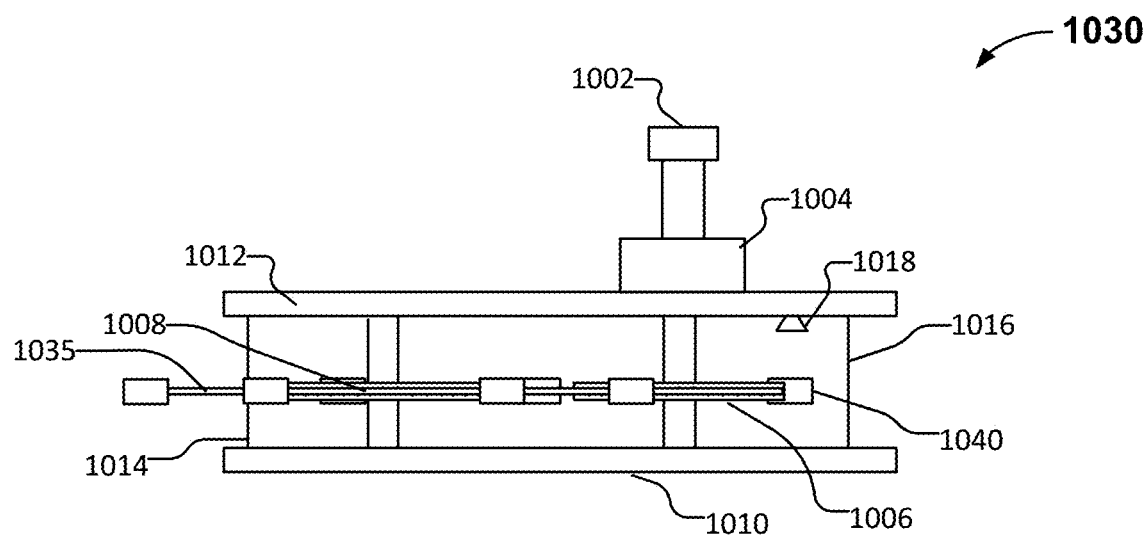
FIG. 10D is a diagram illustrating an embodiment of a driving unit of a robotic stack mover system.

FIG. 10D is a diagram illustrating an embodiment of a driving unit of a robotic stack mover system. In the example illustrated in FIG. 10D, a drive chain 1035 engages driving unit 1030. For example, drive chain 1035 has exited the guide rail at an entry of the driving unit, and drive chain 1035 traverses one or more sprockets such as driving sprocket 1006 and idler sprocket 1008. The one or more sprockets may be configured to change a direction in which drive chain 1035 travels after recirculation of drive chain 1035. Although driving unit 1030 is illustrated to comprise two sprockets, various embodiments can implement different number of sprockets.

Drive chain 1035 comprises a set of pusher units (e.g., driving brackets) such as pusher unit 1040. Sensor 1018 can be configured to detect pusher unit 1040 or to determine a position of pusher unit 1040. Sensor 1018 can be mounted to a bottom surface of top support 1012. As an example, the system uses sensor 1018 to determine when pusher unit 1040 passes a predefined location. The sensor 1018 may detect one or more edges of a pusher unit 1040, which can be used to control or otherwise track a location of one or more vehicles (tray stacks) in robotic stack mover system. In some embodiments, sensor 1018 detects an identifier associated with pusher unit 1040 such as a bar code, a QR code, or other identifier disposed (e.g., printed, engraved, etc.) on a surface of pusher unit 1040 or via reading a near field communication or radio-frequency identification tag associated with pusher unit 1040. In various embodiments, each pusher unit has a unique identifier within a particular robotic stack mover system. The system may use the information pertaining to the pusher unit (e.g., the identifier of the pusher unit, a location of the pusher unit, etc.) in connection with controlling movement of the drive chain and/or a vehicle being moved by robotic stack mover system. For example, the system may store an association between a vehicle and a relative location or relative pusher unit. The system can store a mapping of manifests to vehicle or a mapping of manifests to a relative location of a vehicle (e.g., a location relative to pusher units serving as a boundary of a space in which the vehicle is inserted, or relative to the driving unit).

If the system has knowledge of when (or a state of one or more pusher units relative to the driving unit) a vehicle is inserted into the robotic stack mover system, the system can determine a relative location of the vehicle based on detection of pusher units. For example, if the pusher units are spaced 1 m apart, and a vehicle is inserted when a first pusher unit is detected at a particular location corresponding to sensor 1018, if the system determines that two subsequent pusher units (e.g., a second pusher unit and a third pusher unit) have been detected by sensor 1018, then the system determines that the vehicle has travelled 2 m (e.g., that the vehicle is 2 m from the zone at which the vehicles are inserted to robotic stack mover system). As another example, referring to FIG. 1A, if a system has a set of predefined zones at which vehicles can be moved to such as corresponding to a space between pusher unit 1018a and pusher unit 1018b (e.g., zone 1), a space where tray stack 1022a is located (e.g., zone 2), a space where tray stack 1022b is located (e.g., zone 3), a space where tray stack 1022c is located (e.g., zone 4), and/or space corresponding to empty tray stack 1022d (e.g., zone 5), the system can store a data structure comprising a mapping of vehicles or manifests to predefined zones. For example, with reference to system 100 of FIG. 1A, the system stores in the data structure that (i) no vehicle is mapped to zone 1, (ii) tray stack 122a is mapped to zone 2, (iii) tray stack 122b is mapped to zone 3, and (iv) tray stack 122c is mapped to zone 4, and (v) an empty tray stack (e.g., tray stack placeholder 122d) is mapped to zone 5. If the robotic stack mover system drives the driving unit until sensor 1018 detects a next pusher unit, the system may increment the data structure such that (i) no vehicle or newly inserted vehicle is mapped to zone 1, (ii) no vehicle is mapped to zone 2, (iii) tray stack 122a is mapped to zone 3, (iv) tray stack 122b is mapped to zone 4, and (v) tray stack 122c is mapped to zone 5.

Accordingly, the system uses one or more sensors to track at least a relative location of a vehicle, and the system can track manifests to vehicles.

Figure 11A:
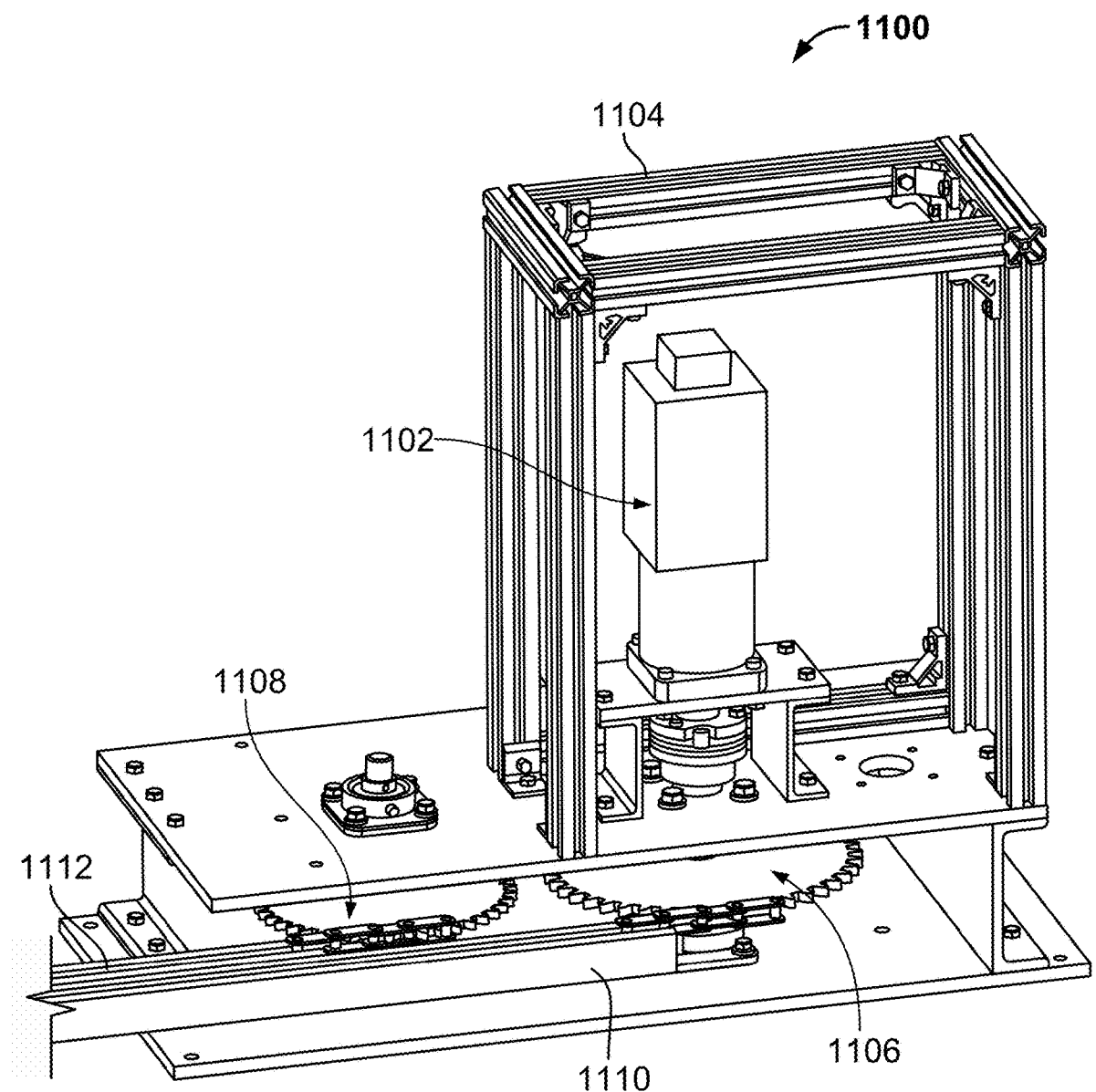
FIG. 11A is a diagram illustrating an embodiment of a driving end of a robotic stack mover system.

FIG. 11A is a diagram illustrating an embodiment of a driving end of a robotic stack mover system. In some embodiments, driving unit 1100 is implemented in connection with system 100 of FIG. 1A-1C, system 200 of FIG. 2, system 300 of FIG. 3 (e.g., as driving unit 311 and/or driving unit 321), system 400 of FIG. 4 (e.g., as driving unit 431), and/or system 500 of FIG. 5, etc. As illustrated in FIG. 11A, driving unit 1100 comprises a motor assembly 1002 (e.g., a motor and gear box), a motor support structure 1104, driving sprocket 1106, idler sprocket 1108, and a guide rail. In some embodiments, the guide rail comprises an ingress guide rail 1110 and an egress guide rail 1112. Ingress guide rail 1110 directs, and provides support for, a drive chain as the drive chain enters the driving unit 1100 (e.g., to promote engagement between driving sprocket 1106 and the drive chain as the drive chain leaves the ingress guide rail 1110). Egress guide rail 1112 directs, and provides support for, the drive chain as the drive chain exits driving unit 1100 and travels towards a tensioning unit of the robotic stack mover system.

Figure 11B:
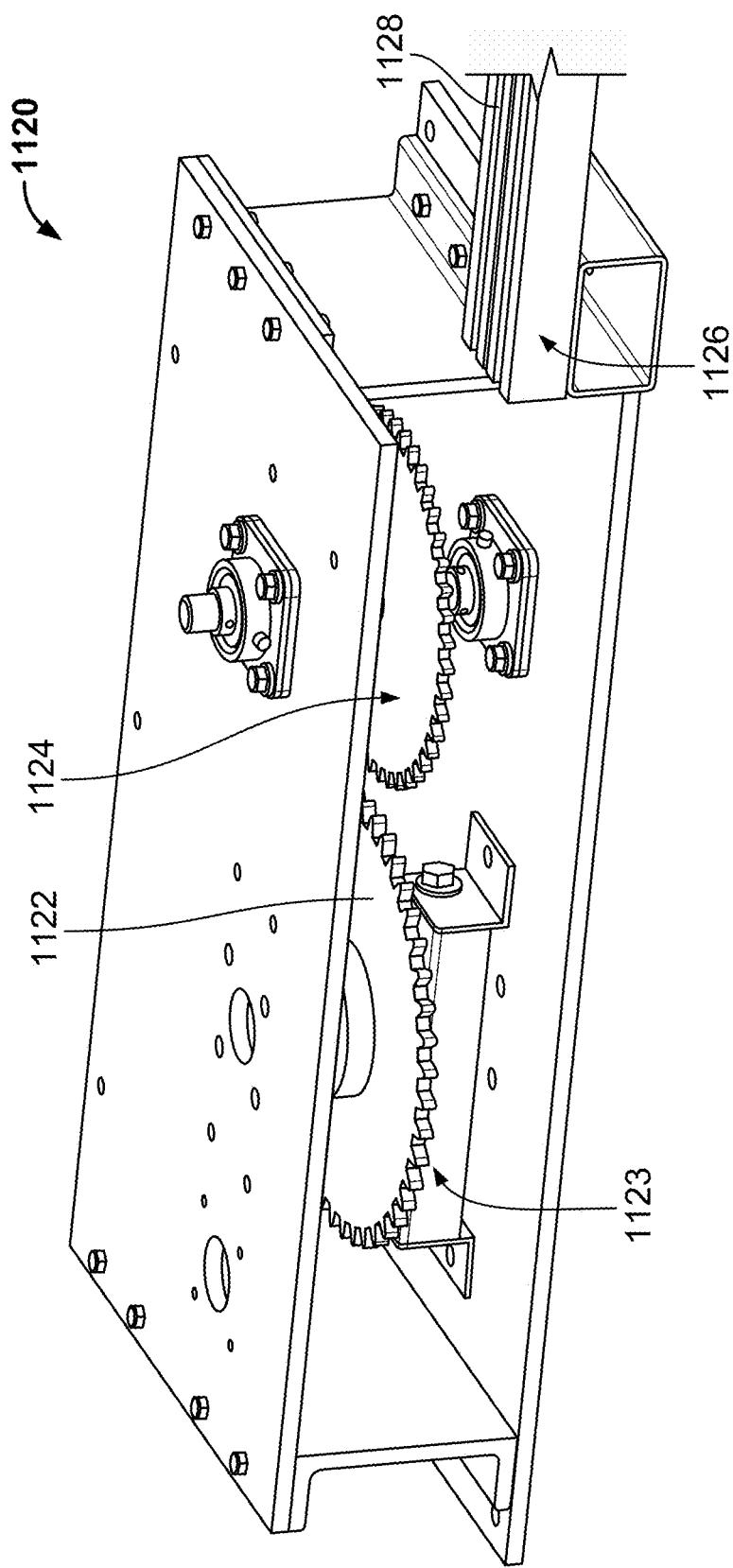
FIG. 11B is a diagram illustrating an embodiment of a tensioning end of a robotic stack mover system.

FIG. 11B is a diagram illustrating an embodiment of a tensioning end of a robotic stack mover system. In some embodiments, tensioning unit 1120 is implemented in connection with system 100 of FIG. 1A-1C, system 200 of FIG. 2, system 300 of FIG. 3 (e.g., as tensioning unit 312 and/or driving unit 311), system 400 of FIG. 4 (e.g., as driving unit 431), and/or system 500 of FIG. 5, etc. As illustrated in FIG. 11B, tensioning unit 1120 comprises tensioning sprocket 1122, tensioning sprocket 1124 (e.g., an idler sprocket), and a guide rail. In some embodiments, the guide rail comprises an ingress guide rail 1112 and an egress guide rail 1128. Ingress guide rail 1126 directs, and provides support for, a drive chain as the drive chain enters the tensioning unit 1120 (e.g., to promote engagement between driving sprocket 1106 and the drive chain as the drive chain leaves the ingress guide rail 1110). Egress guide rail 1128 directs, and provides support for, the drive chain as the drive chain exits tensioning unit 1120 and travels towards a driving unit of the robotic stack mover system (e.g., driving unit 1100 of FIG. 11A).

According to various embodiments, one or more tensioning sprockets comprised in the tensioning unit are movably mounted. For example, as illustrated in FIG. 11B, tensioning sprocket 1122 is mounted to bottom support via mounting bracket 1123. Mounting bracket 1123 is configured to enable tensioning sprocket 1122, to move such as in order to change a tension in the drive chain. The system may control the tension of the drive chain based on a position of tensioning sprocket 1122. For example, a human operator may change a position of tensioning sprocket 1122. As another example, a motor may be connected to mounting bracket 1123 or tensioning sprocket 1122, and the tension of the drive chain may be controlled by actuating the motor to change a position of mounting bracket 1123 or tensioning sprocket 1122.

Figure 11C:
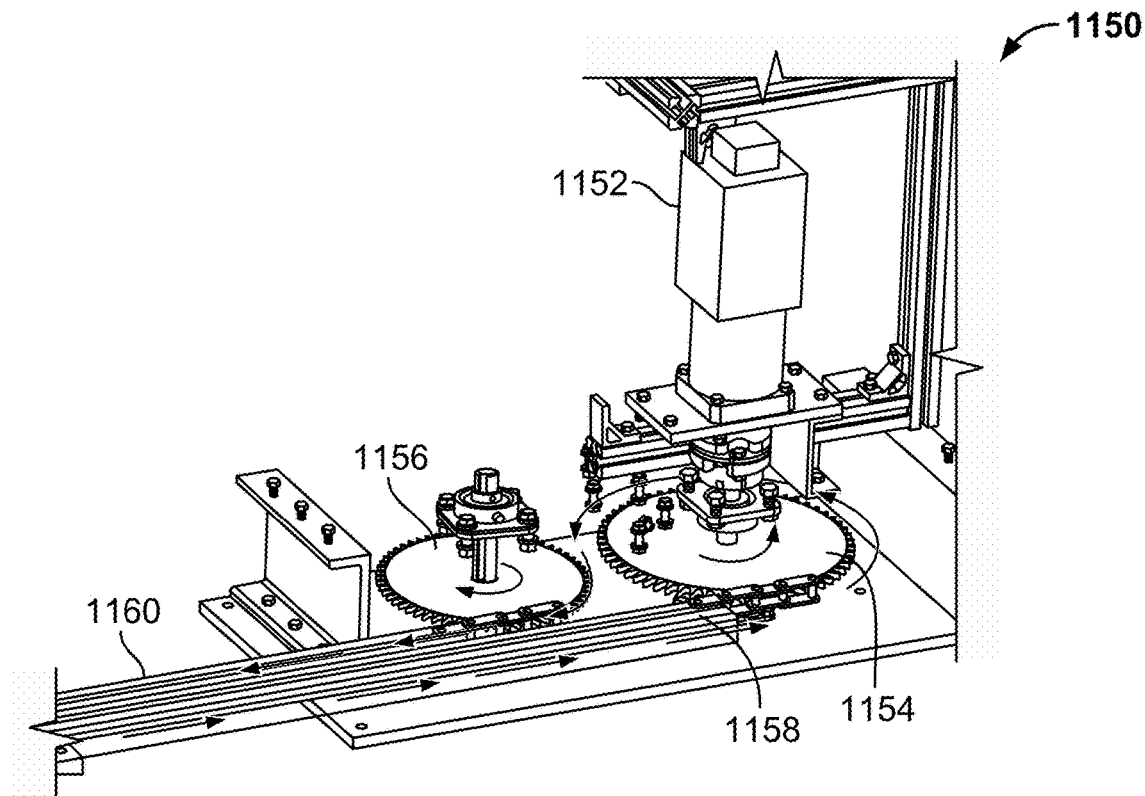
FIG. 11C is a diagram illustrating an embodiment of a driving chain traversing the driving end of a robotic stack mover system.
Figure 11D:
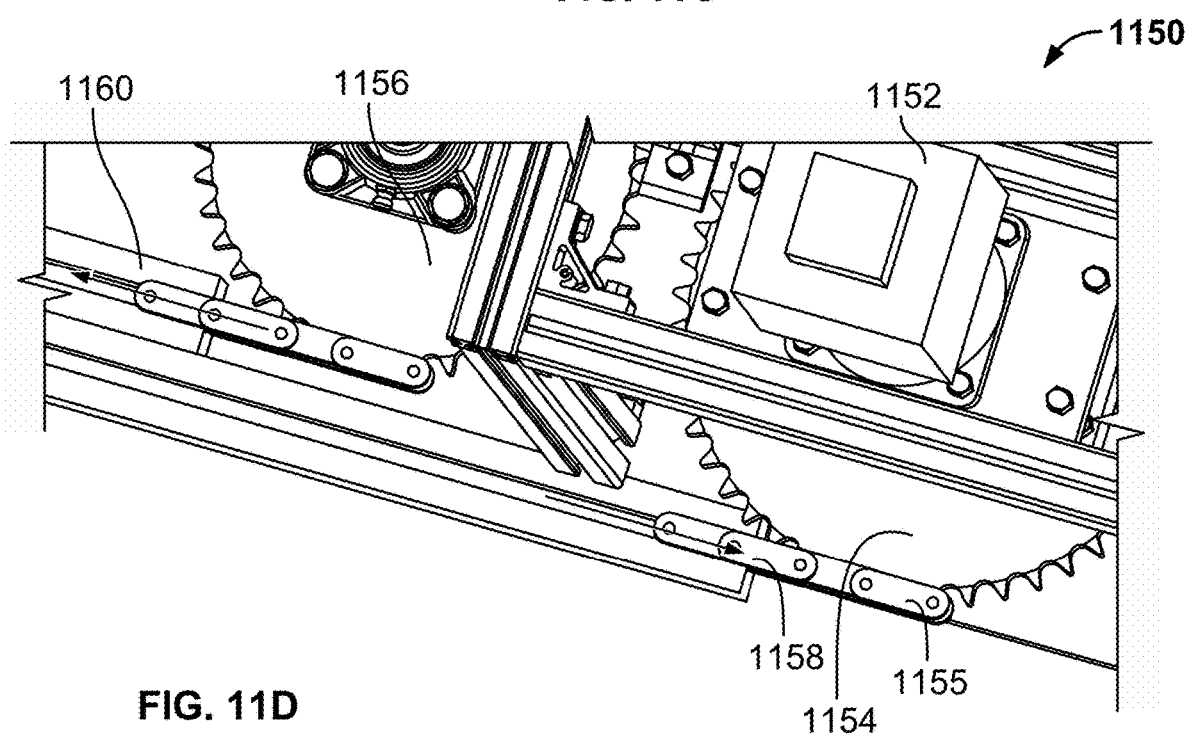
FIG. 11D is a diagram illustrating an embodiment of a driving chain traversing the driving end of a robotic stack mover system.

FIG. 11C is a diagram illustrating an embodiment of a driving chain traversing the driving end of a robotic stack mover system. FIG. 11D is a diagram illustrating an embodiment of a driving chain traversing the driving end of a robotic stack mover system. As illustrated in FIGS. 11C and 11D, driving unit 1150 comprises motor 1152 and driving sprocket 1154. In the example illustrated in FIGS. 11C and 11D, motor 1152 is driven thereby causing driving sprocket 1154. As driving sprocket 1154 is rotated, driving sprocket 1154 causes drive chain 1155, which is engaged with at least part of driving sprocket 1154 to move. For example, rotation of driving sprocket 1154 causes drive chain 1155 to exit the ingress guide rail 1158 in proximity to driving sprocket 1154, and drive chain 1155 travels around the outer circumference of driving sprocket 1154 until drive chain 1155 engages idler sprocket 1156, which serves to support drive chain 1155 and to guide drive chain 1155 to enter the egress guide rail 1160 towards the corresponding tensioning unit of the robotic stack mover system.

Figure 12A:
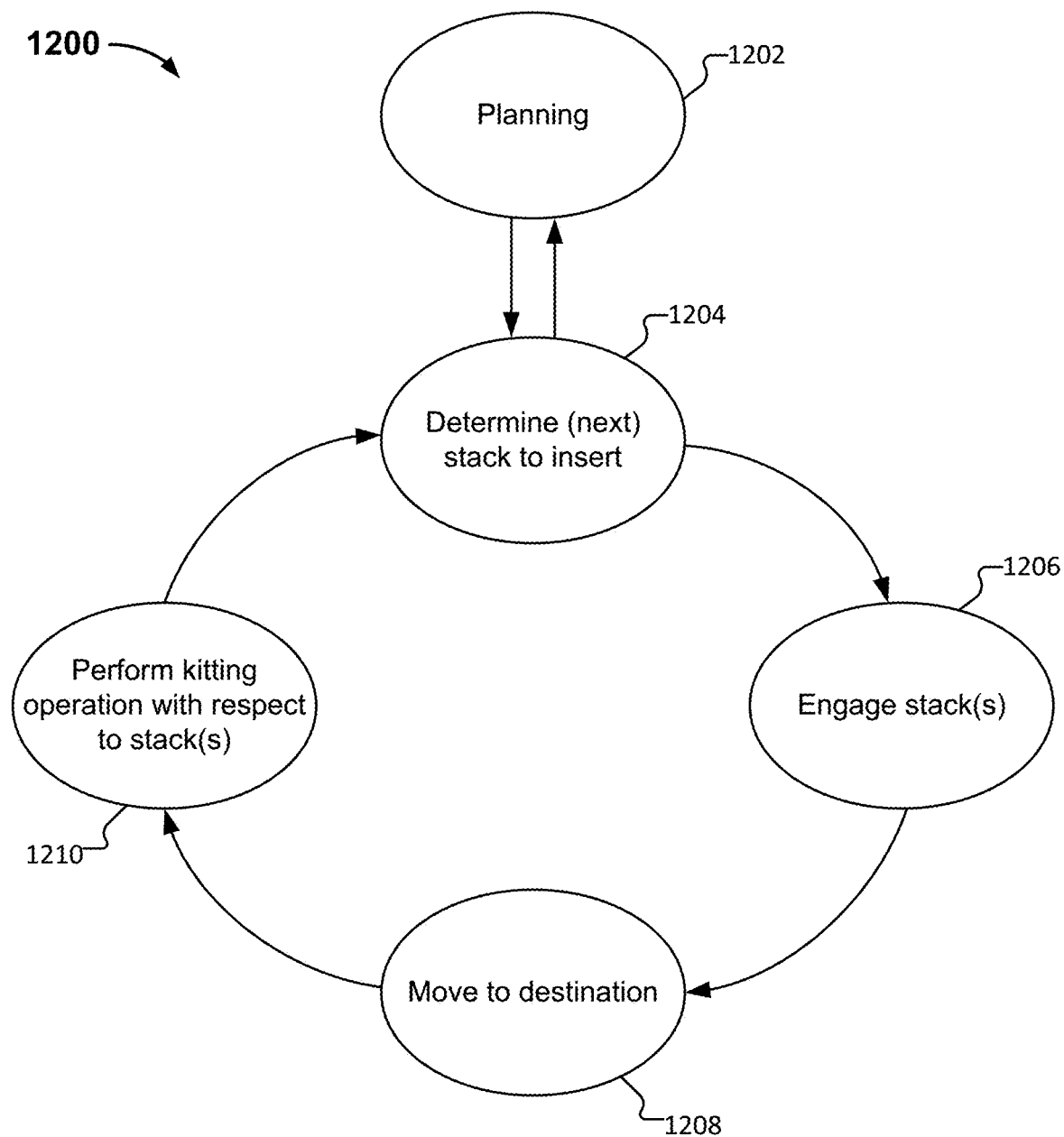
FIG. 12A is a state diagram illustrating an embodiment of an automated process to move stacks of trays.

FIG. 12A is a state diagram illustrating an embodiment of an automated process to move stacks of trays. In various embodiments, processing according to the state diagram 1200 is performed by a control computer, such as control computer 380 of FIG. 3, control computer 480 of FIG. 4, and/or control computer 580 of FIG. 5. In the example shown, a planning state, process, and/or module 1202 generates and dynamically updates a plan to insert a vehicle (e.g., a tray stack) to a robotic stack mover system such as by using robotic instrumentalities as disclosed herein to move vehicles (e.g., source tray stacks, destination tray stacks, etc.) according to a set of orders, invoices, manifests, etc. The planning state, process, and/or module 1202 receives feedback indicating which destination tray stacks have been completed, which stacks of source trays have been moved into the workspace, and/or other state and context information which can be used to continuous update the plan to move the tray stacks, or to cause the tray stacks to be returned to a designated return area, or to insert a new tray stack to the robotic stack mover system. In state 1204, a process controlling a given robotic instrumentality (e.g., robotic stack mover system 310, in the example shown in FIG. 3) determines a next set of one or more vehicles to be moved from a tray stack source to a particular location along the path along the guide rail of the robotic stack mover system according to a current overall plan as received from planning state, process, and/or module 902. For example, the robot (or the system such as control computer 380, 480, 580) may insert a new tray stack to the system (e.g., the system may control a stack pusher system to insert the new stack to stack mover system, or the system can control a buffer conveyance and the stack pusher system in coordination to insert the new stack), or to advance a tray stack already within the system (e.g., to move the tray stack further along the path defined by the robotic stack mover system, etc.). The system enters state 1206, in which a strategy and plan that may be determined to engage a tray stack, to insert a tray stack, and/or to move a tray stack within the workspace, and/or begin to move them toward the destination location is formed. The system enters state 1208 at which the system controls the robotic stack mover system to move the tray stack(s). Once the tray stack(s) that have been inserted/moved to a determined destination location has/have been grasped, the system enters state 1210 in which the system controls a robot arm(s) to perform a kitting operation with respect to the tray stack (e.g., to de-stack the trays, or to stack trays on the vehicles, etc.). The system, such as control computer 380, 480, 580, controls a robot arm(s) to move a tray along a planned (and, if needed, dynamically adapted) trajectory to the vicinity of the destination stack, e.g., a position hovering over the destination stack and/or a location or structure on which tray is to be placed. Once the kitting operation is determined to have been securely performed, the system determines that the tray stack is complete (e.g., the stack has been completed, or the de-stacking of the stack of trays has been completed), and reenters the state, process, and/or module 1202, in which a next set of one or more vehicles (e.g., tray stacks) is determined to be picked from a corresponding source and moved to a corresponding destination location (e.g., along the path of the workspace of robotic stack mover system), e.g., according to overall plan information received from planning state, process, and/or module 1202. In various embodiments, a robotic system as disclosed herein continues to cycle through the states, processes, and/or modules 1202, 1204, 1206, 1208, and 1210 of FIG. 12A until all destination stacks have been assembled.

Figure 12B:
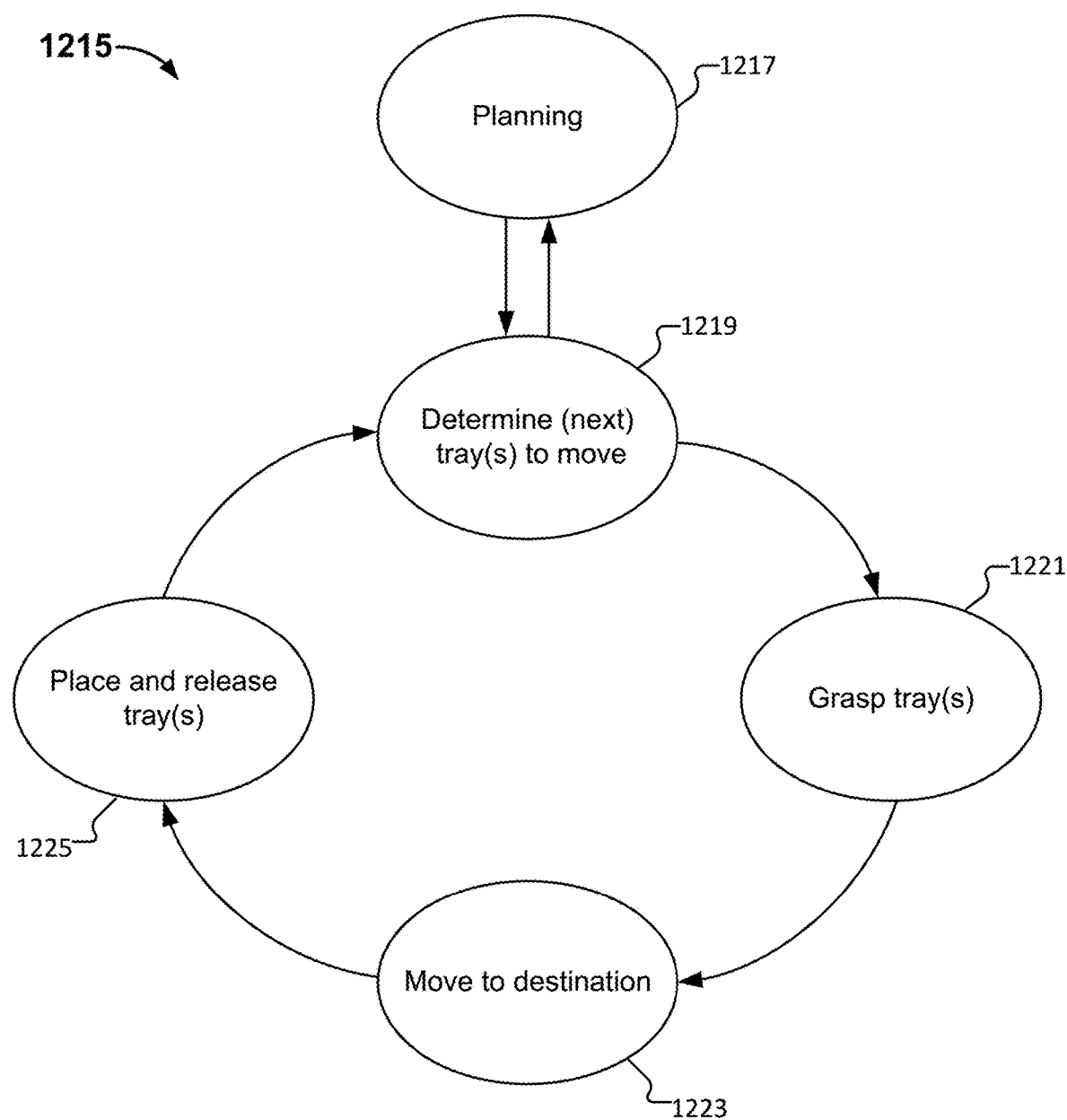
FIG. 12B is a state diagram illustrating an embodiment of an automated process to assemble stacks of trays.

FIG. 12B is a state diagram illustrating an embodiment of an automated process to assemble stacks of trays. In various embodiments, processing according to the state diagram 1215 is performed by a control computer, such as control computer 380 of FIG. 3, control computer 480 of FIG. 4, and/or control computer 580 of FIG. 5. In the example shown, a planning state, process, and/or module 1217 generates and dynamically updates a plan to assemble output stacks of trays by using robotic instrumentalities as disclosed herein to pick trays from homogeneous or non-homogeneous source stacks of trays and building destination stacks each having one or more types of trays, e.g., according to a set of orders, invoices, manifests, etc. The planning state, process, and/or module 1217 receives feedback indicating which destination tray stacks have been completed, which stacks of source trays have been moved into the workspace, and/or other state and context information which can be used to continuous update the plan to pick and place (stack) trays to assemble the destination stacks. In state 1219, a process controlling a given robotic instrumentality (e.g., robot arms 1222 and/or 1224 and associated end effectors, in the example shown in FIG. 8) determines a next set of one or more trays to be move from a source stack to a destination stack according to a current overall plan as received from planning state, process, and/or module 1217. For example, the robot (or the system such as control computer 380, 480, 580) may determine to grasp one, two, or more trays from a source stack to add them to (or start a new) destination stack. The robot enters state 1221, in which a strategy and plan that may be determined to do one or more of move into position to grasp the tray(s), grasp the trays, and/or begin to move them toward the destination stack location is formed; and the robot moves into position and grasps the trays. Once the tray(s) has/have been grasped, the robot (or the system such as control computer 380, 480, 580) enters state 1223 in which the tray is moved along a planned (and, if needed, dynamically adapted) trajectory to the vicinity of the destination stack, e.g., a position hovering over the destination stack and/or a location or structure on which the destination stack is to be built. In state 1225, the robot place(s) the tray(s) on the destination stack. In some embodiments, the state 225 includes maneuvers under force control to verify the tray(s) is/are placed securely on the destination stack, e.g., by moving (or attempting to move) the tray(s) forward and backward (or side to side, as applicable) to ensure any interconnecting structures are aligned and well slotted, such as tabs on the bottom of the trays being placed fitting into corresponding recesses in the side walls of the tray on which the tray(s) is/are being placed. Once the trays are determined to have been placed securely, the robot releases the tray(s) and reenters the state 919, in which a next set of one or more trays is determined to be picked from a corresponding source stack and moved to a corresponding destination stack, e.g., according to overall plan information received from planning state, process, and/or module 1217. In various embodiments, a robotic system as disclosed herein continues to cycle through the states 1219, 1221, 1223, and 1225 of FIG. 12B until all destination stacks have been assembled.

Figure 13A:
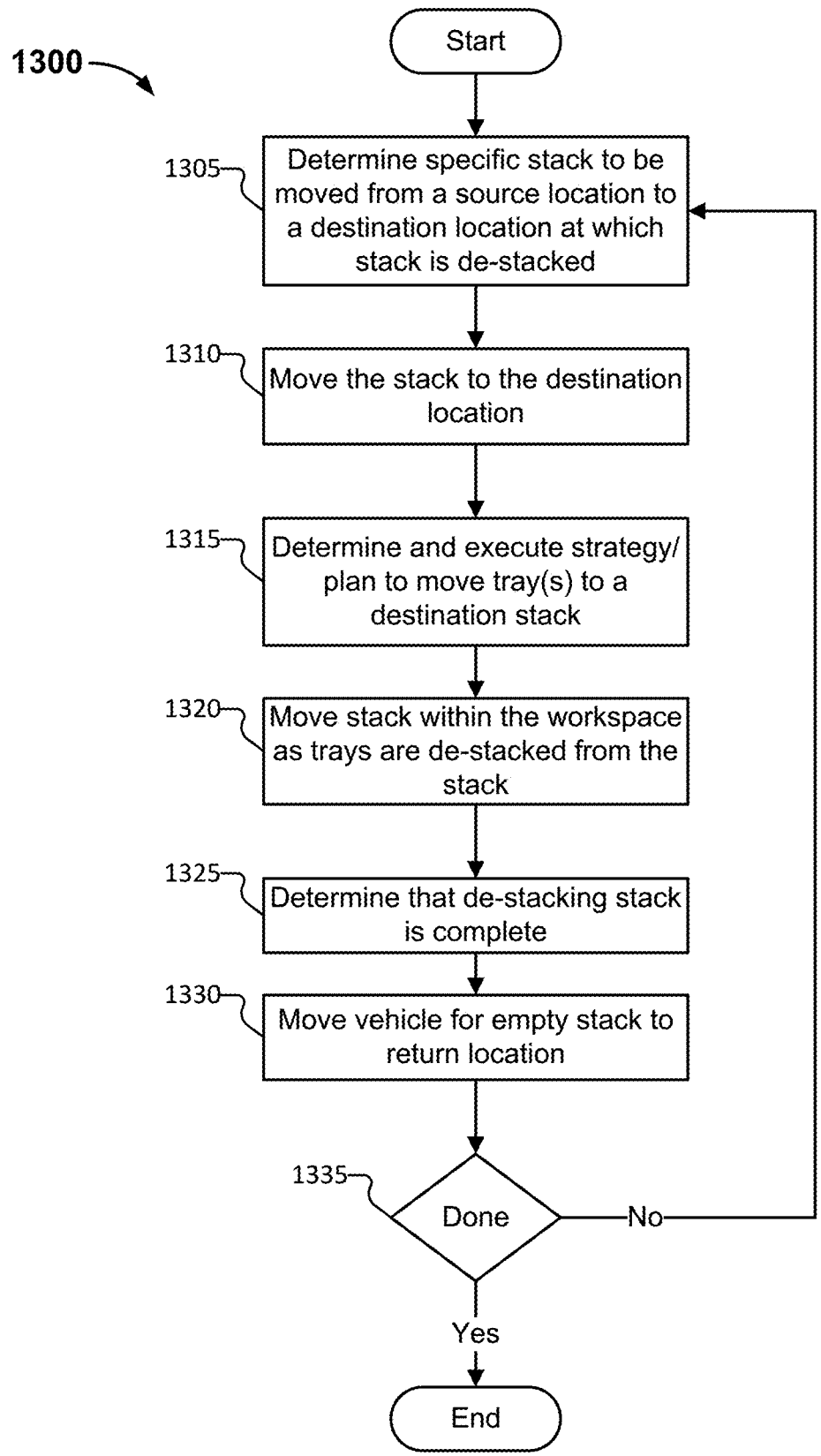
FIG. 13A is a flow diagram illustrating an embodiment of an automated process to disassemble or assemble stacks of trays.

FIG. 13A is a flow diagram illustrating an embodiment of an automated process to disassemble or assemble stacks of trays. In some embodiments, process 1300 is at least partly implemented by system 100 of FIGS. 1A-1C, system 200 of FIG. 2, system 300 of FIG. 3, system 400 of FIG. 4, and/or system 500 of FIG. 5.

At 1305, the system determines a specific stack to be moved from a source location to a destination location at which the stack is de-stacked. In some embodiments, the de-stacking the stack (e.g., stack of trays) includes controlling a robot arm to pick items (e.g., trays) from the stack and to place such items at a determined destination location (e.g., a destination location determined according to a plan for moving the items). The specific stack to be moved from the source location may be a stack that is buffered/staged in a buffer zone and for which stack pusher system is to be controlled to insert the stack to the stack mover system for the stack mover system to move the stack to the destination location According to various embodiments, the system stores a data structure with which the system maintains/stores (i) a mapping of vehicles to manifests (e.g., a packing list or other information indicating a set of items or objects within items comprised in a vehicle), (ii) a mapping of vehicles to locations or relative locations of locations within the system, (iii) a mapping of vehicles to robot arms (e.g., robot arms assigned to stack/de-stack items to/from the vehicle, etc.), (iv) a mapping of robot arms to workspaces or zones corresponding to a range of the robot arms, etc. The system may monitor/track a location of a vehicle and accordingly update the data structure such as the mapping(s), etc. The system may use the data structure to track specific items (or objects comprised in a particular item/vehicle) within the system such as to track a particular vehicle to which the item is stacked, or a particular vehicle (or associated manifest) from which the item is de-stacked/taken.

In connection with determining a plan to perform a kitting operation(s) with respect to a vehicle (e.g., to de-stack a stack of trays on a tray stack), the system determines to insert the tray stack to the robotic stack mover system, and determines a location within the workspace of the system to which the tray stack is to be moved for the system to perform the kitting operation (e.g., for the tray stack to be within range of a robot arm so the system can control the robot arm to perform the kitting operations with respect to a tray stack). The system determines a particular stack for which kitting operations are to be performed. As an example, the system may select the particular stack based on the manifests for one or more available stacks. As another example, the system determines the particular stack based on a queue of stacks (e.g., the particular stack is the next stack in the queue of stacks for which kitting operations are to be performed), etc.

At 1310, the stack is moved to the destination location. In some embodiments, the moving the stack to the destination location includes inserting the stack to a robotic stack mover system, such as to a predefined insertion location. For example, the system controls a robotic stack pusher system to insert (e.g., push) the stack to an input end of the stack mover system (e.g., the predefined insertion location). The system determines a destination location to which to move the stack (e.g., to a specific area in the workspace, or a relative location such as to move the stack a predefined distance from the source location or insertion location). In response to determining the location to which to move the stack, the system controls the robotic stack mover system to move the stack to the destination location. For example, the system controls to drive the driving unit (e.g., a motor of the driving unit) to cause a drive chain to advance, which causes a pusher unit (e.g., a driving bracket) to apply a force on the stack to be moved and to push/pull the stack to the destination location.

At 1320, a strategy and/or plan is determined and executed to move a tray from the source stack (e.g., the stack selected at 1305) to a destination location. In some embodiments, the system determines a strategy to move to and grasp the tray(s). For example, the system plans and implements a set of maneuvers to move its end effector to a position above or otherwise near the tray(s) to be grasped. A strategy to grasp the tray(s) is determined and implemented. The system determines a plan (e.g., trajectory, etc.) to move the tray(s) to a destination stack, and the system executes the plan. The trajectory/plan takes into consideration obstacles in the workspace, such as other stacks, and potential conflicts with other robotic instrumentalities, such as another pick/place robot operating in the same workspace (e.g., robot arms 342, 344 of FIG. 3).

At 1320, the system moves the stack within the workspace as trays are de-stacked from the stack. In some embodiments, 1320 is optionally performed, or the system waits until the de-stacking of the stack is complete.

According to various embodiments, the system determines to move the stack as the trays are de-stacked (e.g., before all trays have been de-stacked from the corresponding vehicle) if the system determines that the stack is to be moved to improve the ability for a robot to reach trays of the stack or to move the stack within range of a different robot. For example, with reference to FIG. 3, tray stack 325*c* is within range 348 of robot arm 344. If system determines that a tray is to be de-stacked from tray stack 325*c* and to be placed on a destination tray stack or conveyor, etc., the system determines to control the robotic stack mover system to move the tray stack 322*c* to within range 348 of robot arm 344, which can de-stack a tray from tray stack 325*c* and place the tray on a destination tray stack.

At 1325, the system determines that de-stacking trays from the stack is complete. For example, the system determines that the de-stacking is complete if the system determines that the stack is empty. In some embodiments, determining that the stack is empty comprises determining that all trays determined to be de-stacked from the stack have been successfully de-stacked. Process 1300 iterates over 1315 and 1320 until the system determines that the de-stacking trays from the stack is complete.

At 1330, the vehicle is moved to a return location. In some embodiments, in response to determining that the de-stacking of the stack is complete, the system determines to move the vehicle (e.g., the stack) to a return location. The system can move the vehicle to the return location by controlling the robot arm to pick up the vehicle (e.g., dolly on which trays were stacked) such as using an end effector at the distal end of the robot arm, or using a structure attached to a side of the robot arm (e.g., a hook mounted to the robot arm). In some embodiments, the system controls the robotic stack mover system to move the vehicle. For example, in response to determining that the de-stacking with respect to a vehicle is complete, the system drives the motor of the robotic stack mover system to cause the drive chain to move, which in turn engages the vehicle and causes the vehicle to move. The system controls to drive the motor to drive the drive chain sufficiently to move the vehicle from a current location to a return location such as to the end of the robotic stack mover system. The system may comprise a conveyance structure at the end of the robotic stack mover system that moves a vehicle placed thereon to a return location.

At 1335, a determination is made as to whether process 1300 is complete. In some embodiments, process 1300 is determined to be complete in response to a determination that no further stacks are to be de-stacked, an administrator indicates that process 1300 is to be paused or stopped, etc. In response to a determination that process 1300 is complete, process 1300 ends. In response to a determination that process 1300 is not complete, process 1300 returns to 1305.

Figure 13B:
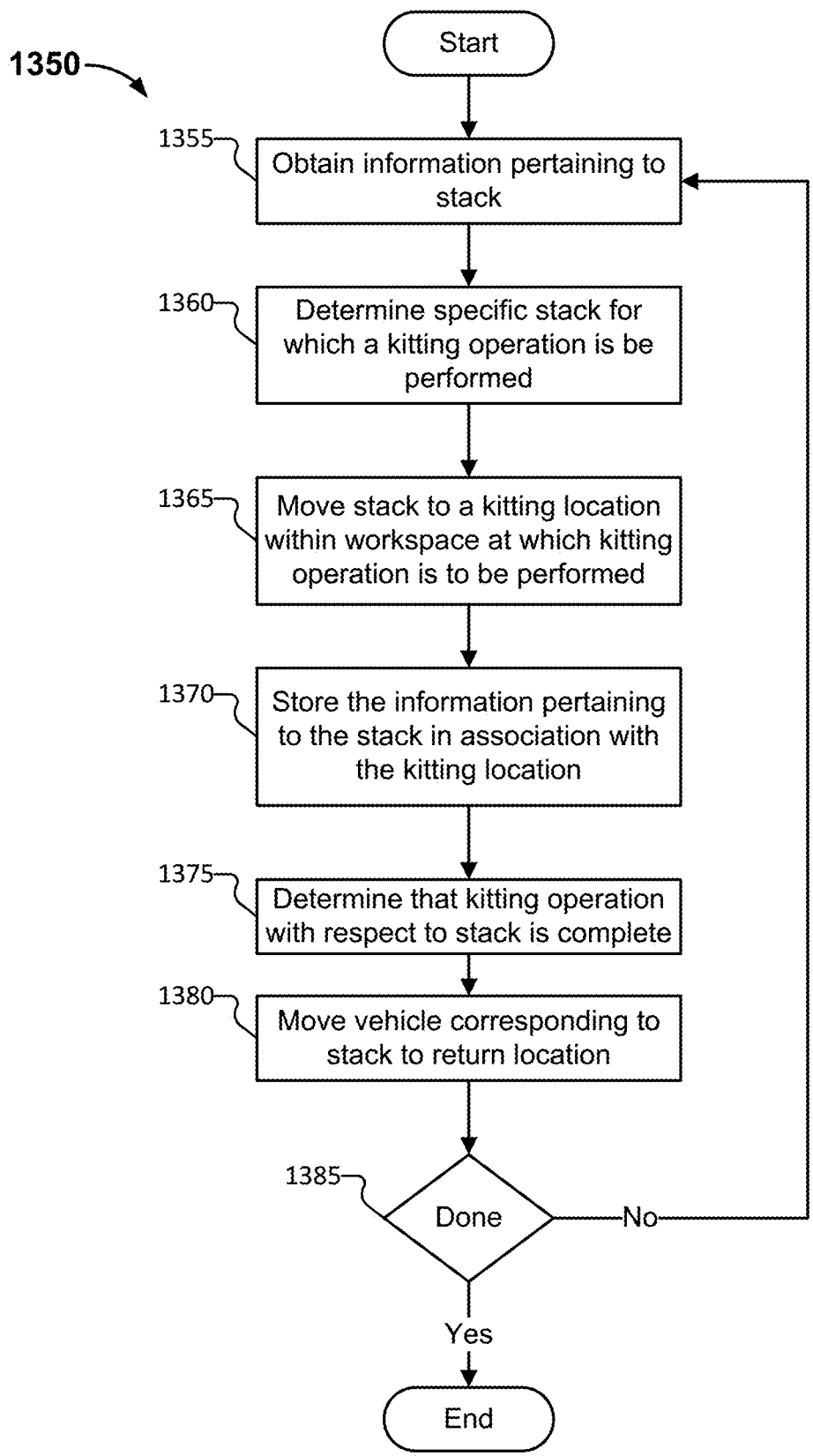
FIG. 13B is a flow diagram illustrating an embodiment of an automated process to disassemble or assemble stacks of trays.

FIG. 13B is a flow diagram illustrating an embodiment of an automated process to disassemble or assemble stacks of trays. In some embodiments, process 1350 is at least partly implemented by system 100 of FIGS. 1A-1C, system 200 of FIG. 2, system 300 of FIG. 3, system 400 of FIG. 4, and/or system 500 of FIG. 5.

At 1355, information pertaining to a stack is obtained. In some embodiments, the system determines a current location of the stack, information pertaining to a manifest associated with the stack (e.g., a set of trays comprised on the stack, a set of objects in one or more trays on the stack, a set of trays to be stacked on the stack, a set of objects to be placed on the stack, etc.).

At 1360, the system determines a specific stack for which a kitting operation is to be performed. In some embodiments, the system selects a stack for which the kitting operation is to be performed. For example, the system selects a stack for which trays are to be de-stacked. As another example, the system selects a stack on which one or more trays are to be placed. The system may select the stack based on one or more of (i) a queue for insertion to the robotic stack mover system, (ii) a manifest associated with the stack, (iii) a priority of the manifest associated with the stack, (iv) a location of the stack (such as a location of the stack relative to the robotic stack mover system), etc.

At 1365, the stack is moved to a kitting location within the workspace at which a kitting is to be performed. The system controls the robotic stack mover system to move the stack to the kitting location. As an example, the kitting location corresponds to a location within a range of a robot to perform the kitting operation (e.g., robot arms 342, 344 of FIG. 3).

At 1370, information pertaining to the stack is stored in association with the de-stacking location. In some embodiments, the system updates a mapping of stacks to locations such as a mapping of stacks to locations along the path of robotic. The system uses one or more sensors such as a vision system and/or a sensor comprised in the robotic stack mover system to determine a location of the stack.

At 1375, a kitting operation performed with respect to the stack is complete. The system controls a robot (e.g., robot arms 342, 344) to pick and place items with respect to the stack. For example, the system uses a robot to de-stack a set of one or more trays from the stack. As another example, the system uses a robot to place a tray on the stack.

At 1380, the vehicle for the stack is moved to a return location. In some embodiments, in response to determining that the kitting operation(s) with respect to the stack is complete, the system determines to move the vehicle (e.g., the stack) to a return location. The system can move the vehicle to the return location by controlling the robot arm to pick up the vehicle (e.g., dolly on which trays were stacked) such as using an end effector at the distal end of the robot arm, or using a structure attached to a side of the robot arm (e.g., a hook mounted to the robot arm). In some embodiments, the system controls the robotic stack mover system to move the vehicle. For example, in response to determining that the de-stacking with respect to a vehicle is complete, the system drives the motor of the robotic stack mover system to cause the drive chain to move, which in turn engages the vehicle and causes the vehicle to move. The system controls to drive the motor to drive the drive chain sufficiently to move the vehicle from a current location to a return location such as to the end of the robotic stack mover system. The system may comprise a conveyance structure at the end of the robotic stack mover system that moves a vehicle placed thereon to a return location.

At 1385, a determination is made as to whether process 1350 is complete. In some embodiments, process 1350 is determined to be complete in response to a determination that no further stacks are to be de-stacked, an administrator indicates that process 1350 is to be paused or stopped, etc. In response to a determination that process 1350 is complete, process 1350 ends. In response to a determination that process 1350 is not complete, process 1350 returns to 1355.

Figure 14A:
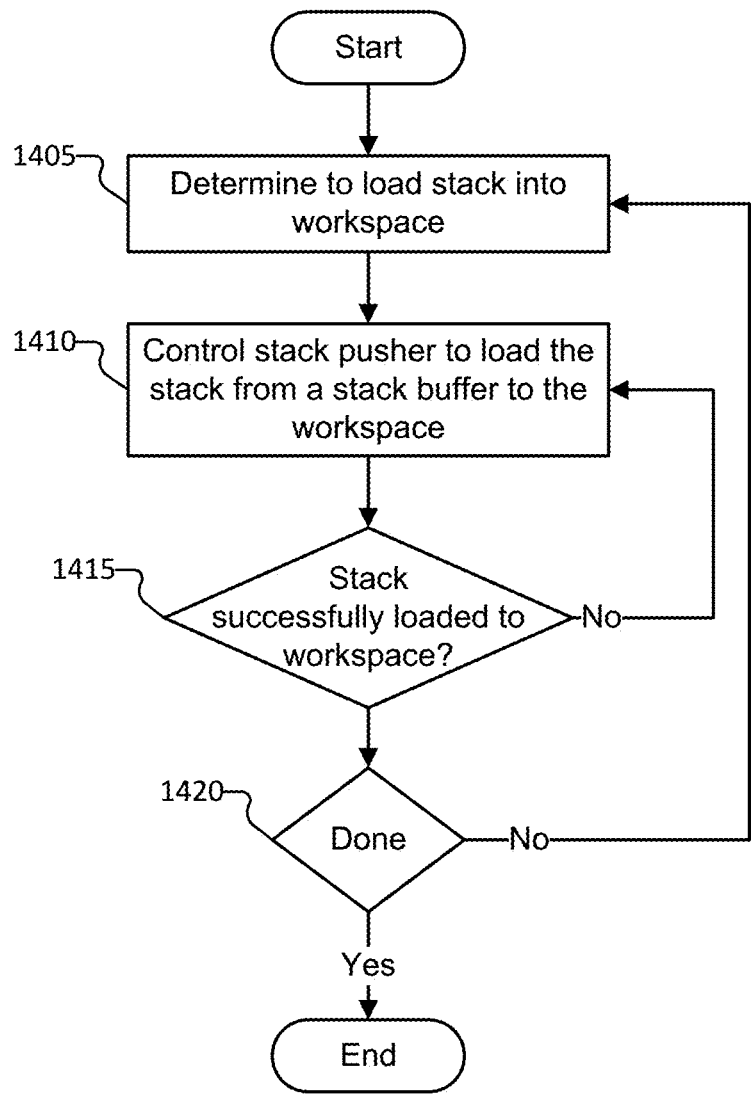
FIG. 14A is a flow diagram of a process for loading a stack to a workspace according to various embodiments.

FIG. 14A is a flow diagram of a process for loading a stack to a workspace according to various embodiments. In some embodiments, process 1400 is implemented by system 100 of FIGS. 1A-1C, system 200 of FIG. 2, system 300 of FIG. 3, system 400 of FIG. 4, and/or system 500 of FIG. 5.

At 1405, a determination is made to load a stack into a workspace. The system determines to load a stack into the workspace, such as stack mover system, in response to determining that robot arms are to be used to perform picking and placing operations with respect to items to be moved to/from the stack. The system may determine to load the stack into the workspace based on information obtained by one or more sensors in the workspace, such as sensor(s) comprised in one or more of a stack pusher system, a stack mover system, a buffer zone, etc. The system may determine to load the stack into the workspace in response to determining that the robot arm(s) in the workspace have completed loading/unloading (e.g., performing a kitting operation) a stack(s) in the workspace.

At 1410, a stack pusher is controlled to load the stack from a stack buffer to the workspace. The system robotically controls a stack pusher system to push the stack from a start position corresponding to a stack buffer zone at which the stack is queued/staged to an end position corresponding to an input end to a stack mover system (or otherwise to an input end of the workspace). Controlling the stack pusher may include controlling an actuation device to actuate and generate a linear force that pushes one or more pusher structures towards the stack and the input end.

At 1415, a determination is made as to whether the stack is successfully loaded to the workspace. The system uses sensors comprised in the workspace and/or a stack mover system to which the stack is loaded in connection with determining whether the stack is successfully loaded. For example, the system may use a vision system to generate a model of the workspace, and the system may then determine based on the model whether the stack is properly/fully inserted to the workspace. As another example, the system may use information obtained by a sensor in a stack mover system to determine whether the stack is properly loaded for pusher units of the stack mover system to engage the stack and move the stack through the workspace.

At 1420, a determination is made as to whether process 1400 is complete. In some embodiments, process 1400 is determined to be complete in response to a determination that no further stacks (e.g., stacks of trays, receptacles, etc.) are to be loaded to the workspace (e.g., a robotic stack mover system), a determination that no further objects (e.g., trays, items) are to be moved (e.g., that no further trays are to be unloaded), a user has exited the system, an administrator indicates that process 1400 is to be paused or stopped, etc. In response to a determination that process 1400 is complete, process 1400 ends. In response to a determination that process 1400 is not complete, process 1400 returns to 1405.

Figure 14B:
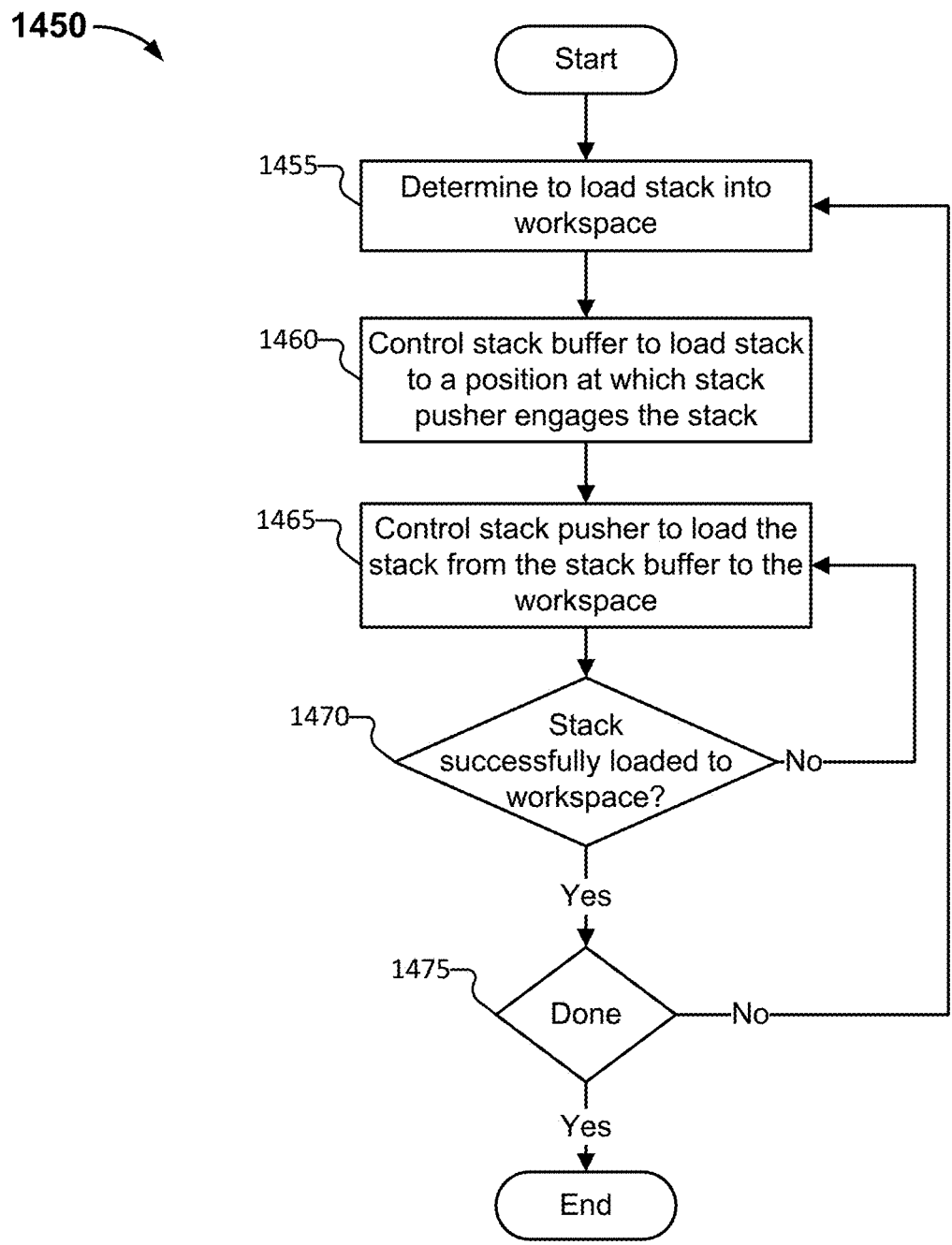
FIG. 14B is a flow diagram of a process for loading a stack to a workspace according to various embodiments.

FIG. 14B is a flow diagram of a process for loading a stack to a workspace according to various embodiments. In some embodiments, process 1450 is implemented by system 100 of FIGS. 1A-1C, system 200 of FIG. 2, system 300 of FIG. 3, system 400 of FIG. 4, and/or system 500 of FIG. 5.

At 1455, a determination is made to load a stack to a workspace. In some embodiments, 1455 corresponds to, or is similar to, 1405 of process 1400 of FIG. 14A.

At 1460, a stack buffer is controlled to load the stack to a position at which a stack pusher engages the stack. In response to determining that the stack is to be loaded to the workspace, the system determines whether the stack is in a position at which the stack pusher system engages the stack to push the stack towards the stack mover system or workspace. In response to determining that the stack is not in the position at which the stack pusher engages the stack, the system controls a buffer conveyance in a buffer zone to advance the stack to be loaded to the appropriate position.

At 1465, the stack pusher is controlled to load the stack from the stack buffer to the workspace. In response to determining that the stack is positioned in the stack buffer for the stack pusher to engage/push the stack, the system robotically controls the stack pusher to push the stack from the position in the buffer zone to the workspace (e.g., to an input end of the stack mover system. In some embodiments, 1465 corresponds to, or is similar to 1410 of process 1400 of FIG. 14A.

At 1470, a determination is made as to whether the stack is successfully loaded to the workspace. In some embodiments, 1470 corresponds to, or is similar to 1415 of process 1400 of FIG. 14A.

In response to determining that stack is not successfully loaded to the workspace at 1470, process 1450 returns to 1455 and process 1450 iterates over 1465-1470 until the system determines that the stack is successfully loaded in the workspace.

In response to determining that stack is successfully loaded to the workspace at 1470, process 1450 proceeds to 1475 at which a determination is made as to whether process 1450 is complete. In some embodiments, process 1450 is determined to be complete in response to a determination that no further stacks (e.g., stacks of trays, receptacles, etc.) are to be loaded to the workspace (e.g., a robotic stack mover system), a determination that no further objects (e.g., trays, items) are to be moved (e.g., that no further trays are to be unloaded), a user has exited the system, an administrator indicates that process 1450 is to be paused or stopped, etc. In response to a determination that process 1450 is complete, process 1450 ends. In response to a determination that process 1450 is not complete, process 1450 returns to 1455.

Figure 15:
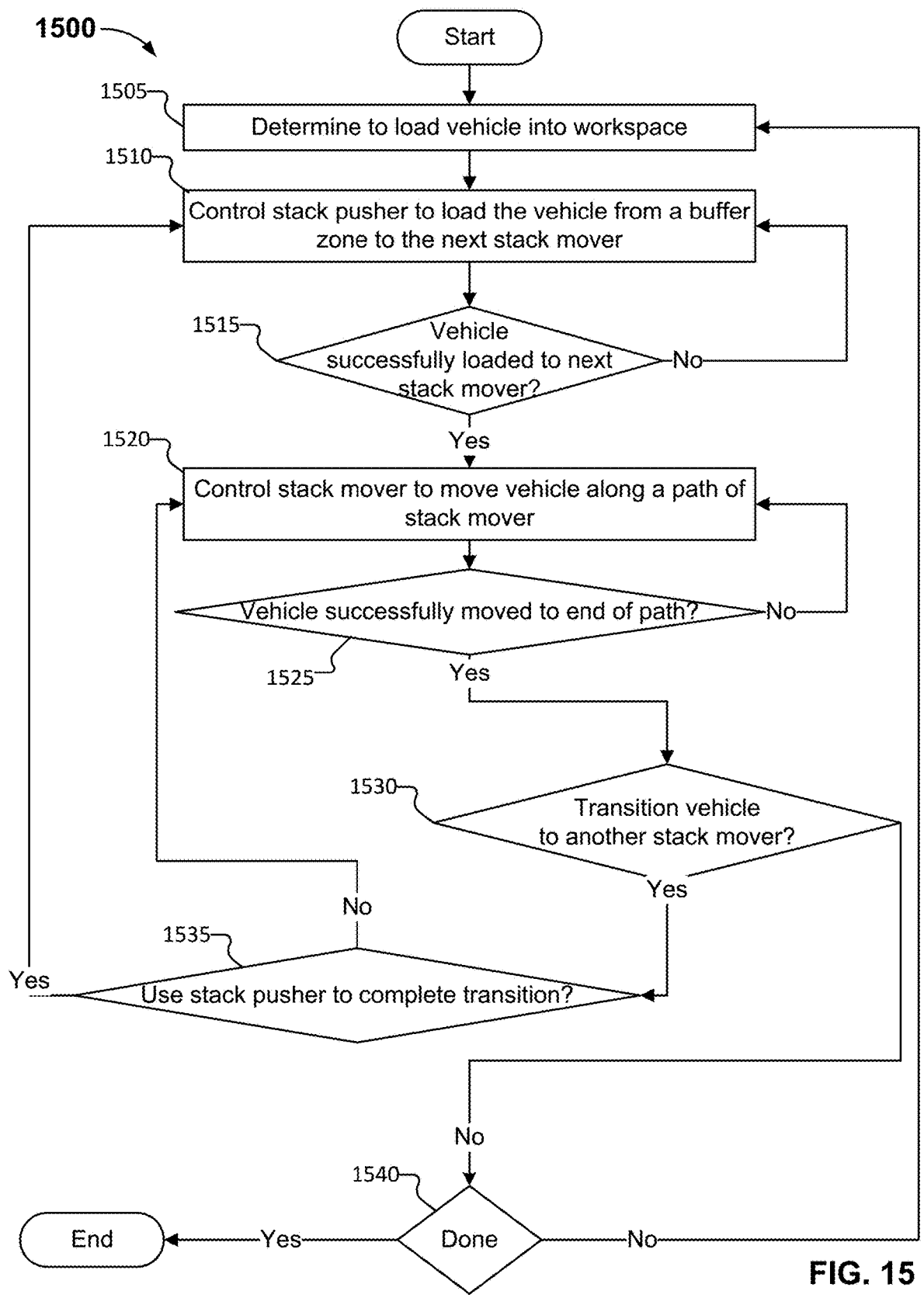
FIG. 15 is a flow diagram of a process for loading a vehicle to a workspace according to various embodiments.

FIG. 15 is a flow diagram of a process for loading a vehicle to a workspace according to various embodiments. In some embodiments, process 1500 is implemented by system 100 of FIGS. 1A-1C, system 200 of FIG. 2, system 300 of FIG. 3, system 400 of FIG. 4, and/or system 500 of FIG. 5.

At 1505, a determination is made to load a vehicle into a workspace. The system determines to load a vehicle into the workspace, such as a modular stack mover system, in response to determining that robot arms are to be used to perform picking and placing operations with respect to items to be moved to/from the vehicle. The system may determine to load the vehicle into the workspace based on information obtained by one or more sensors in the workspace, such as sensor(s) comprised in one or more of a stack pusher system, a stack mover system, a buffer zone, etc. The system may determine to load the vehicle into the workspace in response to determining that the robot arm(s) in the workspace have completed loading/unloading (e.g., performing a kitting operation) a vehicle(s) in the workspace.

At 1510, a stack pusher is controlled to load the vehicle from a buffer zone to the next stack mover. In the case of the vehicle to be loaded to a first stack mover (e.g., a first stack mover in a modular stack mover system), the next stack mover corresponds to the first stack mover. As an example, the buffer zone may be a location at which vehicles are staged/queued until being loaded into modular stack mover system. As an example, the buffer zone may correspond to a transition zone between a current stack mover system and a next stack mover system. The transition zone may span an area between the current stack mover system and the next stack mover system.

At 1515, a determination is made as to whether the vehicle is successfully loaded to the next stack mover. The system may use information obtained by one or more sensors, such as the vision system of the workspace, to determine whether the vehicle is successfully loaded to the stack mover that is to be controlled to move the vehicle. For example, the system determines whether the vehicle is in a position/orientation in which a pusher unit of the stack mover system is able to engage the vehicle to push/pull the vehicle.

In response to a determination that the vehicle is not successfully loaded to the next stack mover at 1515, process 1500 returns to 1510 and process iterates over 1510-1515 until the vehicle is successfully loaded to the next stack mover.

In response to a determination that the vehicle is successfully loaded to the next stack mover at 1515, process 1500 proceeds to 1520 at which the stack mover (e.g., the next stack mover to which the vehicle was loaded) is controlled to move the vehicle along a path of the stack mover. For example, the system controls the stack mover system to drive a motor (e.g., a driving unit), which in turn drives a drive chain to cause pusher units affixed thereto to move and push/pull vehicles along the path defined by guide rail of the stack mover system.

At 1525, a determination is made as to whether the vehicle is successfully moved to an end of the path. For example, the system determines whether a current stack mover system has moved the vehicle along its path. The system may determine that the current stack mover system has moved the vehicle along its path based on a determination that the vehicle is at the output end of the current stack mover system.

In response to a determination that the vehicle has not been successfully moved to the end of the path, process 1500 returns to 1520 and process 1500 iterates over 1520-1525 until the vehicle is moved to the end of the path of the stack mover.

In response to a determination that the vehicle has been successfully moved to the end of the path 1525, process 1500 proceeds to 1530 at which a determination is made as to whether to transition the vehicle to another stack mover. In some embodiments, the system determines whether any additional stack mover systems in the modular stack mover system are to be controlled to move the vehicle. The system may determine whether the vehicle has been output from the terminal stack mover system of the modular stack mover system, or whether the vehicle has been moved to an output end of the modular stack mover system (e.g., a vehicle return location).

In response to a determination that the vehicle is to be transitioned to another stack mover at 1530, process 1500 proceeds to 1535 at which the system determines whether a stack pusher is to be used to complete transition of the vehicle (e.g., to a next stack mover). The system may use a stack pusher to complete the transition in order to move the vehicle through the transition zone and to the input end of the next stack mover system (e.g., the next stack mover system in the modular stack mover system).

In response to a determination that a stack pusher is not to be used to complete the transition of the vehicle (e.g., to a next stack mover) at 1535, process 1500 returns to 1520 and process 1500 iterates over 1510-1530 or 1510-1535, as applicable, until the system determines that the vehicle is not to be moved through any more stack movers (e.g., of the modular stack mover system). The system may determine that a stack pusher is not to be used (e.g., not needed) to move the vehicle to the input end of the next stack mover system that is to be controlled to move the vehicle. For example, the transition zone may include a buffer conveyance structure (e.g., a conveyor) that the system controls to move the vehicle through the transition zone. As another example, the transition zone comprises the input end to the next stack mover system (e.g., the sequential stack mover systems are oriented so that an output end of the first stack mover system corresponds to the input end of the next stack mover system).

In response to a determination that a stack pusher is to be used to complete the transition of the vehicle (e.g., to a next stack mover) at 1535, process 1500 returns to 1510 and process 1500 iterates over 1520-1530 or 1520-1535, as applicable.

Conversely, in response to a determination that the vehicle is not to be transitioned to another stack mover (e.g., another stack mover in the modular stack mover system) at 1530, process 1500 proceeds to 1540. The system may determine that the vehicle is not to be transitioned to another stack mover when the last stack mover in sequence of modules of the modular stack mover system has moved the vehicle to an output end (e.g., a vehicle return location), etc.

At 1540, a determination is made as to whether process 1500 is complete. In some embodiments, process 1500 is determined to be complete in response to a determination that no further vehicles (e.g., stacks of trays, receptacles, etc.) are to be loaded to the workspace (e.g., a robotic stack mover system), a determination that no further objects (e.g., trays, items) are to be moved (e.g., that no further trays are to be unloaded), a user has exited the system, an administrator indicates that process 1500 is to be paused or stopped, etc. In response to a determination that process 1500 is complete, process 1500 ends. In response to a determination that process 1500 is not complete, process 1500 returns to 1505.

Figure 16:
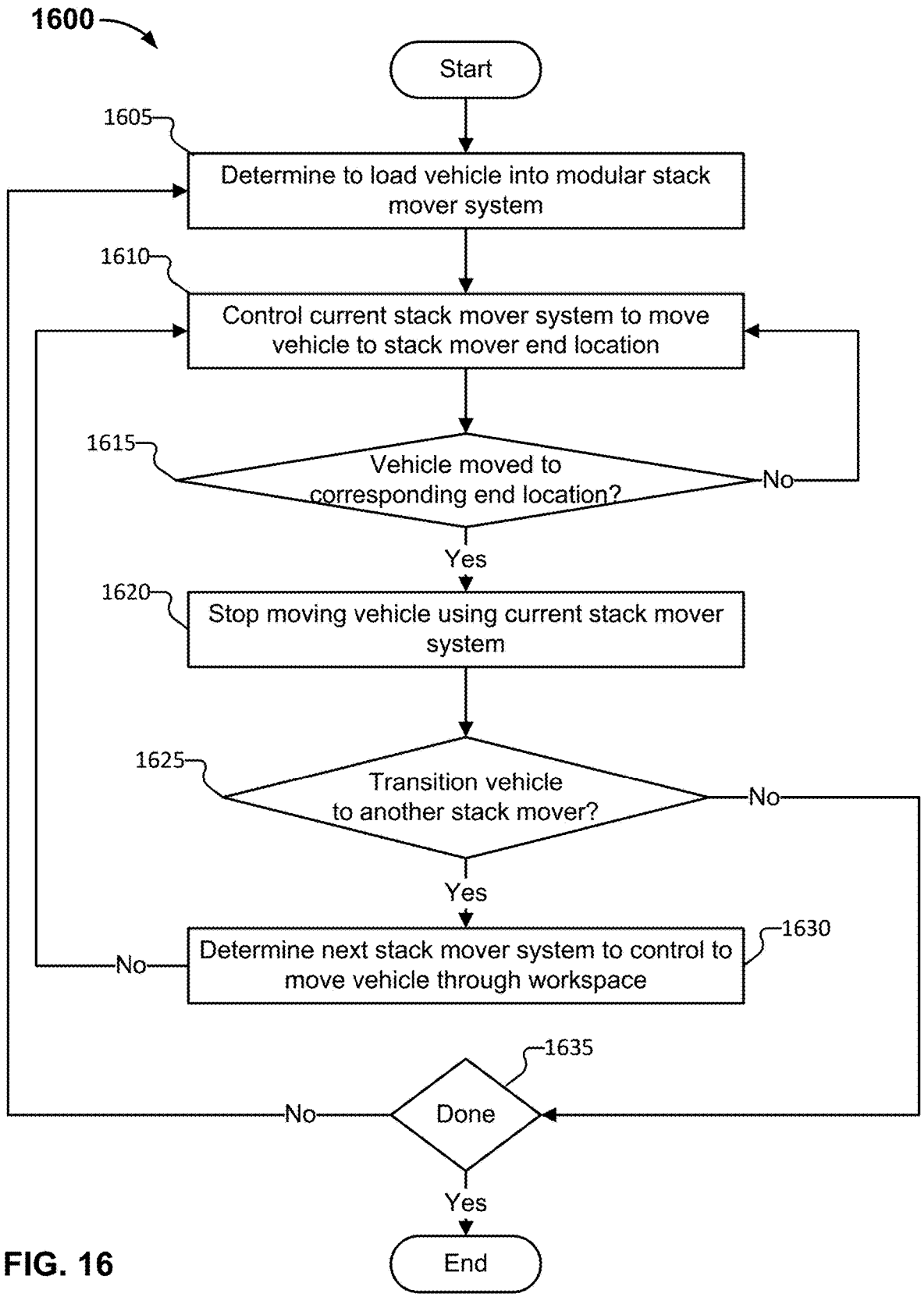
FIG. 16 is a flow diagram of a process for loading a vehicle to a workspace according to various embodiments.

FIG. 16 is a flow diagram of a process for loading a vehicle to a workspace according to various embodiments. In some embodiments, process 1600 is implemented by system 100 of FIGS. 1A-1C, system 200 of FIG. 2, system 300 of FIG. 3, system 400 of FIG. 4, and/or system 500 of FIG. 5.

At 1605, a determination is made to load the vehicle into the modular stack mover system.

At 1610, the current stack mover system is controlled to move the vehicle to the stack mover end location. The stack mover end location can be an output end of the current stack mover system. For example, the stack mover end location may correspond to a transition zone between the current stack mover system and a next stack mover system in the sequence of modules in the modular stack mover system.

At 1615, a determination is made as to whether the vehicle is moved to the corresponding end location. The system determines whether the current stack mover system has successfully completed moving the vehicle to its end location (e.g., the transition zone, a vehicle return location, an input end to a next stack mover system, etc.).

In response to determining that the moving of the vehicle to the corresponding end location of the current stack mover system has not completed at 1615, process 1600 returns to 1610 and the system controls the stack mover system to continue to move the vehicle along its path. Process 1600 may iterate over 1610-1615 until the vehicle has moved to the end location.

In response to determining that that the moving of the vehicle to the corresponding end location of the current stack mover system has completed at 1615, process 1600 proceeds to 1620 at which the current stack mover system is controlled to stop moving the vehicle. For example, in response to determining that the vehicle has been moved to the end location of the current stack mover system, the system controls the current stack mover system to stop driving the motor of the driving unit. If a subsequent stack mover system is to be used to move the system, the system may control to drive the subsequent tack mover system.

At 1625, the system determines whether the vehicle is to be transitioned to another stack mover. In some embodiments, 1625 corresponds to, or is similar to, 1530 of process 1500 of FIG. 15.

In response to a determination that the vehicle is to be transitioned to another stack mover at 1625, process 1600 proceeds to 1630 at which the system determines a next stack mover system to control to move the vehicle through the workspace. The system may further determine (e.g., based on a model of the workspace) whether the current stack mover system output end corresponds to an input end of the next stack mover system, or whether the current stack mover system output end is comprised in a transition zone that bridges a span between the current stack mover system and the next stack mover system. In response to determining that the current stack mover system output end is comprised in the transition zone, the system may control to move the vehicle through the transition zone to the input end of the next stack mover system. As an example, the system controls a stack pusher system that is configured/oriented to push the vehicle from the transition zone (e.g., the output end of the current stack mover system) to the input end of the next stack mover system. As another example, the system controls a buffer conveyance structure (e.g., a conveyor) to carry/move the vehicle through the transition zone.

In response to determining the next stack mover system to control to move the vehicle through the workspace at 1630, process 1600 returns to 1610 at which the next stack mover system (e.g., now the current stack mover system) is controlled to move the vehicle. Process 1600 may iterate over 1610-1625 until no further stack mover systems of the modular stack mover system are to be used to move the vehicle.

In response to a determination that the vehicle is to be transitioned to another stack mover at 1625, process 1600 proceeds to 1635.

At 1635, a determination is made as to whether process 1600 is complete. In some embodiments, process 1600 is determined to be complete in response to a determination that no further vehicles (e.g., stacks of trays, receptacles, etc.) are to be loaded to the workspace (e.g., a robotic stack mover system), a determination that no further objects (e.g., trays, items) are to be moved (e.g., that no further trays are to be unloaded), a user has exited the system, an administrator indicates that process 1600 is to be paused or stopped, etc. In response to a determination that process 1600 is complete, process 1600 ends. In response to a determination that process 1600 is not complete, process 1600 returns to 1605.

FIGS. 17A-17E is a diagram of illustrating a process for transitioning a vehicle from a first stack mover system to a second stack mover system according to various embodiments. FIG. 17A-17E show an example of functional state transitions in the modular stack mover system. In the example shown, the modular stack mover system comprises at least two stack mover systems. The system may control the various modules in the modular stack mover system (e.g., a set of stack mover systems) in coordination to move a vehicle through a workspace from an input end of the modular stack mover system to the output end of the modular stack mover system.

Figure 17A:
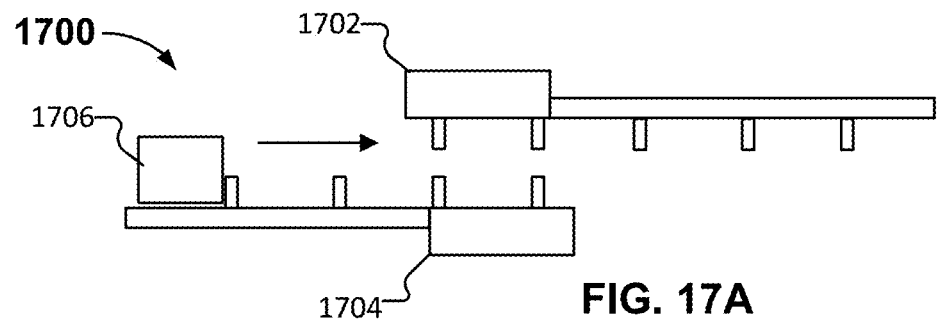
FIG. 17A is a diagram of illustrating a process for transitioning a vehicle from a first stack mover system to a second stack mover system according to various embodiments.

The first stack mover system comprises a driving unit 1702 (e.g., comprising a motor and gear to drive a drive chain). In some embodiments, driving unit 1702 is disposed on an opposing end of the second stack mover system, in which case a tensioning unit is disposed where driving unit 1702 is illustrated in FIG. 17A. The second stack mover system comprises a tensioning unit 1704. In some embodiments, tensioning unit 1704 is disposed on an opposing end of the second stack mover system, in which case a driving unit (e.g., comprising a motor and gear to drive a drive chain) is disposed where tensioning unit 1704 is illustrated in FIG. 17A.

In the example shown, the system controls the modular stack mover system to use the first stack mover system to move vehicle 1706 towards the next stack mover system (e.g., the next module in the modular stack mover system). As illustrated, when the modular stack mover system is initiated (e.g., from a cold start) the pusher units of the first stack mover system and the second stack mover system (e.g., at least where the first stack mover system and the second stack over system overlap on the horizontal axis). For example, one or more pusher units at driving unit 1702 are aligned (or substantially aligned) with one or more pusher units at tensioning unit 1704.

Figure 17B:
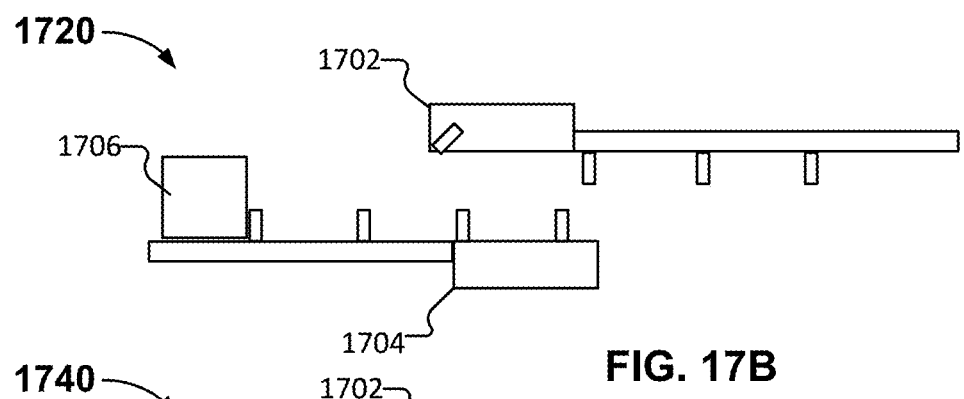
FIG. 17B is a diagram of illustrating a process for transitioning a vehicle from a first stack mover system to a second stack mover system according to various embodiments.

As illustrated in FIG. 17B, the system controls the second stack mover system (e.g., driving unit 1702) to drive the pusher units. For example, as illustrated, the pusher units of the second stack mover system are controlled to move to a location/orientation in which the pusher units provide clearance for a vehicle to be moved by the first stack mover system to the transition zone spanning the area between the first stack mover system and the second stack mover system. The pusher units of the second stack mover system are moved to be oriented/positioned to not obstruct/impede movement of the vehicle to/through the transition zone. In the example shown, the pusher units are moved so that the next pusher unit is oriented to be within driving unit 1702.

Figure 17C:
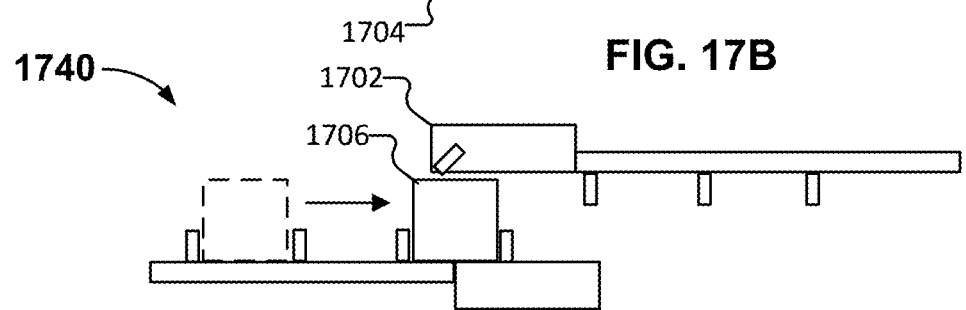
FIG. 17C is a diagram of illustrating a process for transitioning a vehicle from a first stack mover system to a second stack mover system according to various embodiments.

As illustrated in FIG. 17C, the system controls the first stack mover system to move vehicle 1706 along its path and towards the transition zone spanning the area between the first stack mover system and the second stack mover system. In the example shown, vehicle 1706 enters the transition zone unobstructed by a pusher unit of the second stack mover system.

Figure 17D:
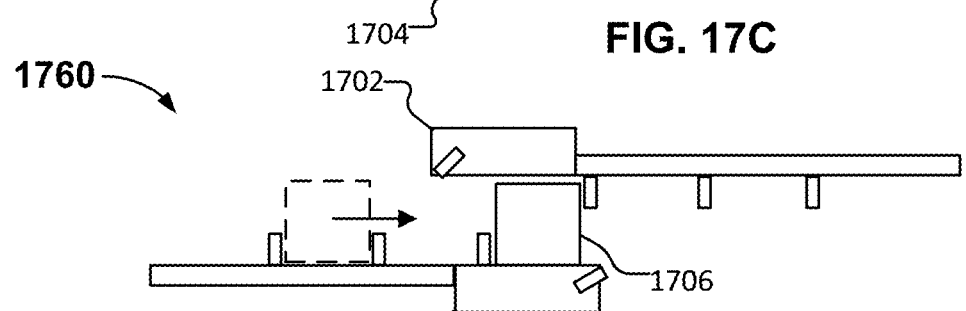
FIG. 17D is a diagram of illustrating a process for transitioning a vehicle from a first stack mover system to a second stack mover system according to various embodiments.
Figure 17E:
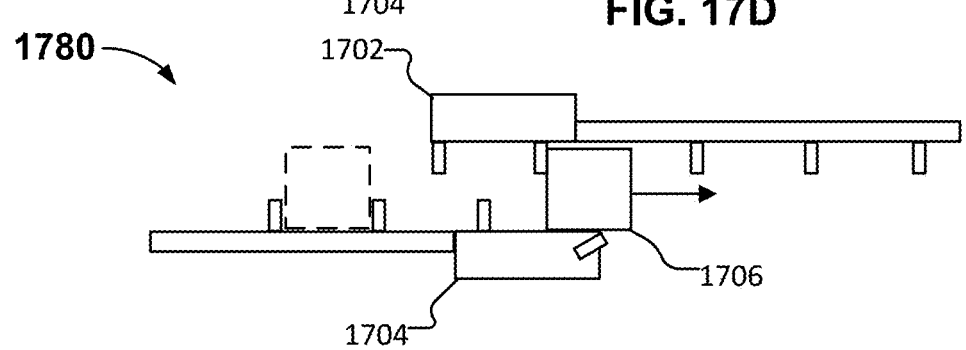
FIG. 17E is a diagram of illustrating a process for transitioning a vehicle from a first stack mover system to a second stack mover system according to various embodiments.

As illustrated in FIG. 17D, the system controls the first stack mover system to move vehicle 1706 to an output end of the first stack mover system, which may correspond to a transition location or input end of the second stack mover system. At this stage, the system controls the first stack mover system to stop driving its driving unit (e.g., to stop movement of the pusher units). The system then controls to drive the second stack mover system to move vehicle 1706, as illustrated in FIG. 17E. For example, the system drives driving unit 1702 to move the pusher units to engage vehicle 1706 to transition movement of vehicle 1706 from being driven by the first stack mover system to be driven by the second stack mover system.

Figure 18:
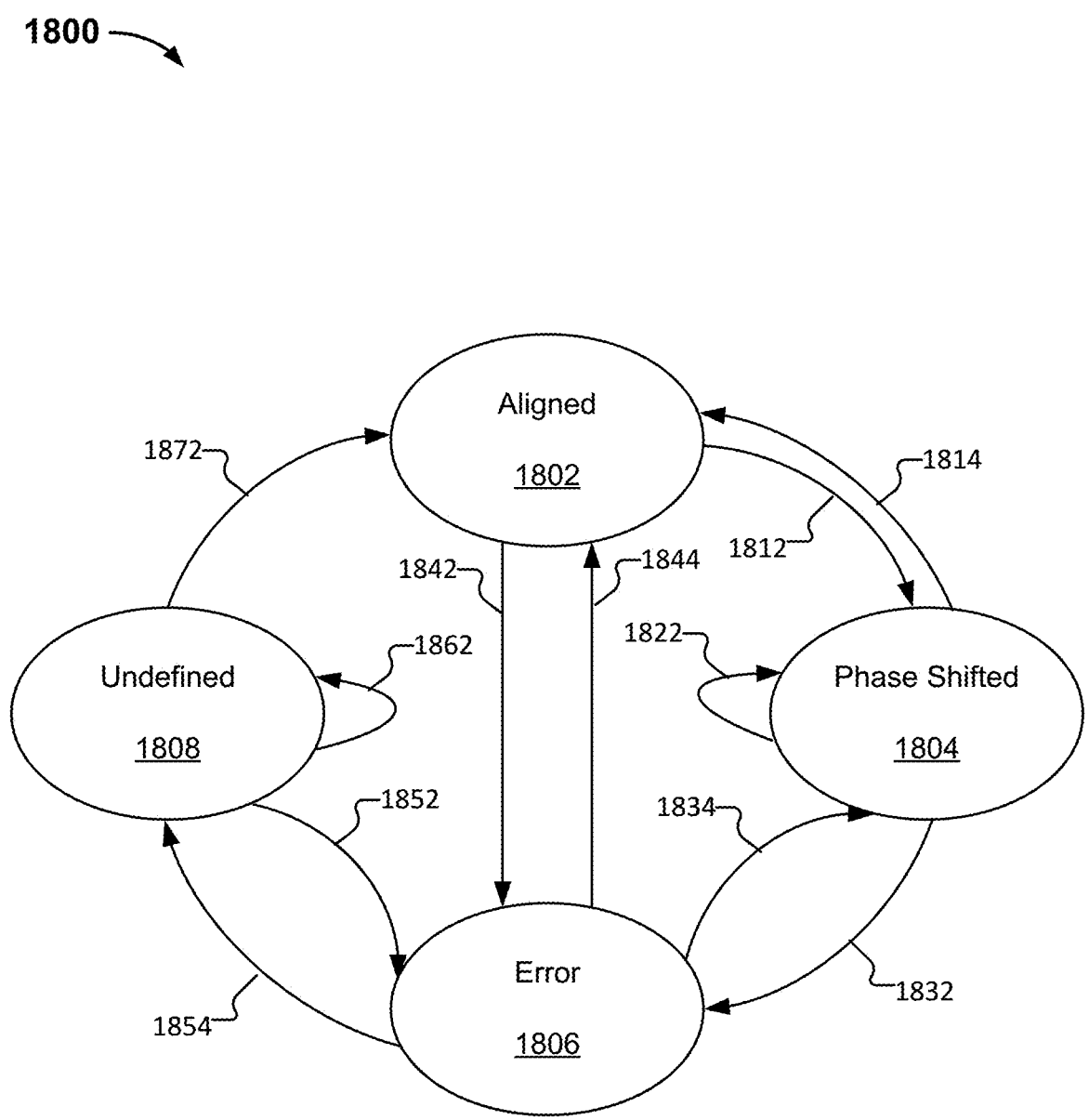
FIG. 18 is a state diagram illustrating a modular stack mover system according to various embodiments.

FIG. 18 is a state diagram illustrating a modular stack mover system according to various embodiments. The state diagram 1800 may correspond to states of the system controlling the modular stack mover system to move a vehicle through a workspace. For example, the state diagram may correspond to states of a software used by the system to control the modular stack mover system.

As illustrated in FIG. 18, at 1802 sequential stack mover systems of the modular are aligned. For example, the pusher units of the first stack mover system and the second stack mover system, as illustrated in FIG. 17A, are aligned. At 1812, the system controls one or more of the sequential stack mover systems to cause the stack mover systems to be phase shifted. For example, the system controls the one or more of the sequential stack mover systems to cause the pusher units of the stack mover systems to be phase shifted (e.g., in a manner to ensure that a second stack mover system is oriented to not obstruct, with its pusher units, the movement of the vehicle through/to the transition zone by the first stack mover system). The system may further control the sequential stack mover systems such that at 1814 the sequential stack mover system transitions back to a state in which the sequential stack mover systems are aligned (e.g., the pusher units are aligned). At 1822, the system controls the sequential stack mover systems to move one or more stack mover systems to a position at which the sequential stack mover systems remain phase shifted. When the system is in the phase shifted state at 1804, the system may deem the sequential stack mover system to be ready for moving vehicle to/through the transition zone by the first stack mover system.

At 1832, the system transitions to an error state 1806. For example, the system may transition to the error state 1806 in response to determining that two or more of the stack mover systems are misaligned. The system may reset/re-configure the two or more of the stack mover systems and transition at 1834 back to the phase shifted state 1804.

At 1842, the system transitions from the aligned state 1802 to an error state 1806, such as in response to detecting that two or more sequential stack mover systems are not aligned. At 1806, the system may control to reset alignment of the two or more sequential stack mover systems are not aligned, and the system transitions back to the aligned state 1802.

At 1808, the system is in an undefined state. The system may transition, at 1852, to error state 1806 in response to detection of an error. In response to detecting the error, the system may reset the modular stack mover system, and at 1854, transition back to the undefined state 1808. In the undefined state 1808, the system may control one or more of the sequential stack mover systems (e.g., the first stack mover system) to drive its driving unit (e.g., to move the corresponding pusher units). As the system controls the one or more of the sequential stack mover systems, at 1862, the system may return/remain in the undefined state. Conversely, as the system controls the one or more of the sequential stack mover systems, the system determines that the sequential stack mover systems enter an aligned state, and at 1872, the system transitions to the aligned state 1802.

Although the foregoing embodiments have been described in connection with the grasping, moving, and placing one or more trays, various other receptacles or containers may be implemented. Examples of other receptacles or containers include bags, boxes, pallets, crates, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A modular stack mover system, comprising:
   a first stack mover system configured to cause a vehicle to traverse a first path; and
   a second stack mover system configured to cause the vehicle to traverse a second path;
   wherein:
   the first stack mover system moves the vehicle along the first path from a source location to a first end location;
   the vehicle is retrieved from the first end location and the second mover system moves the vehicle along the second path to a destination location;
   the first mover system comprises one or more first pusher units configured to engage the vehicle and apply a linear force to the vehicle when the first pusher units are driven by the first mover system;
   the second mover system comprises one or more second pusher units configured to engage the vehicle and apply a linear force to the vehicle when the second pusher units are driven by the second mover system;
   a first pusher unit of the one or more first pusher units engage the vehicle from a first side of a rear of the vehicle; and
   the second one or more pusher units engage the vehicle from a second side of the rear of the vehicle that is opposite the first side.

2. The modular stack mover system of claim 1, wherein the destination location corresponds to a vehicle return zone.

3. The modular stack mover system of claim 1, further comprising:
   one or more processors configured to control the first stack mover system and the second stack mover system in coordination to move the vehicle from a source location to a destination location.

4. The modular stack mover system of claim 1, wherein the first path and the second path are linear.

5. The modular stack mover system of claim 4, wherein the first path is perpendicular to the second path.

6. The modular stack mover system of claim 4, wherein the first path and the second path are parallel.

7. The modular stack mover system of claim 1, wherein the first path and the second path collectively correspond to a kitting path that traverses a workspace of a robotic kitting system.

8. The modular stack mover system of claim 1, wherein:
the modular stack mover system is comprised in a robotic kitting system; and
the robotic kitting system comprises one or more robot arms and a control computer that is configured to control the one or more robot arms and the modular stack mover system in coordination in connection with performing a kitting operation with respect to the vehicle.

9. The modular stack mover system of claim 1, wherein the first stack mover system comprises:
a driving unit comprising a motor;
a drive chain;
a tensioning unit that enforces tension of the drive chain; and
a guide rail traversing a distance between the driving unit and the tensioning unit; wherein:
the motor is operatively coupled to the drive chain, and the motor is configured to drive the drive chain when the motor is driven;
the guide rail comprises a channel configured to guide and support the drive chain;
the driving chain comprises the one or more first pusher units; and
the one or more first pusher units are respectively configured to engage one or more vehicles inserted to the system, and to cause one or more vehicles to traverse a path having a same direction as a longitudinal direction of the guide rail when the driving chain is driven in response to a control signal from a robotic control system configured to operate the modular stack mover system under robotic control to position said one or more vehicles within reach of a robotic instrumentality to enable the robotic instrumentality to perform a task with respect to the one or more vehicles.

10. The modular stack mover system of claim 1, wherein an output end of the first mover system and an input end of the second mover system overlap in an overlapping zone, and the output end of the first mover system corresponds to the first end location.

11. The modular stack mover system of claim 10, wherein the first stack mover system moves the vehicle into a first end of the overlapping zone and in response to the first stack mover system moving the vehicle into the overlapping zone the second stack mover system engages the vehicle and moves the vehicle to exit a second end of the overlapping zone.

12. The modular stack mover system of claim 10, wherein in response to a determination that the vehicle has been successfully moved to the first end location, the first stack mover system is controlled to move into a release position.

13. The modular stack mover system of claim 12, wherein the release position corresponds to an orientation in which the first stack mover system does not interfere with removal of the vehicle from the first end location.

14. The modular stack mover system of claim 13, wherein controlling the first stack mover system to move into the release position includes driving a first drive chain to a position according to which first pusher units mounted to the first drive chain do not obstruct movement of the vehicle from the first stack mover system to the second stack mover system.

15. The modular stack mover system of claim 1, wherein in response to a determination that the vehicle is to be moved by the first stack mover system to the first end location, the second stack mover system is controlled to move into a receiving position.

16. The modular stack mover system of claim 15, wherein the receiving position corresponds to an orientation in the second stack mover system does not interfere with movement of the vehicle to the first end location.

17. The modular stack mover system of claim 16, wherein controlling the second stack mover system to move into the receiving position includes driving a second drive chain to a position according to which second pusher units mounted to the second drive chain do not obstruct movement of the vehicle by the first stack mover system to the first end location.

18. The modular stack mover system of claim 1, wherein:
the first stack mover system comprises a first drive chain;
an output end of the first mover system and an input end of the second mover system overlap in an overlapping zone;
the output end of the first mover system corresponds to the first end location;
in response to a determination that the vehicle is to be moved by the first stack mover system to the first end location, the second stack mover system is controlled to move into a receiving position; and
controlling the second stack mover system to move into the receiving position includes driving a second drive chain to a position according to which the one or more second pusher units mounted to the second drive chain do not obstruct movement of the vehicle by the first stack mover system to the overlapping zone.

19. The modular stack mover system of claim 1, further comprising:
a buffer zone between the first stack mover system and the second stack mover system, wherein:
the buffer zone comprises a stack pusher system configured to robotically move the vehicle from the first end location to an input end to the second stack mover system.

20. The modular stack mover system of claim 1, further comprising:
a buffer zone between the first stack mover system and the second stack mover system, wherein:
the buffer zone comprises a stack pusher system configured to robotically move the vehicle from the first end location to an input end to the second stack mover system; and
the stack pusher system is associated with one or more of the first stack mover system and the second stack mover system.

21. The modular stack mover system of claim 20, wherein:
the stack pusher is associated with one of the first stack mover system and the second stack mover system, and not associated with both the first stack mover system and the second stack mover system.

22. The modular stack mover system of claim 20, wherein:
the stack pusher is controlled in coordination with one of the first stack mover system and the second stack mover system.

23. The modular stack mover system of claim 20, wherein:

an output end of the first mover system and an input end of the second mover system overlap in an overlapping zone;

the output end of the first mover system corresponds to the first end location; and the stack pusher is disposed at an end of the overlapping zone that is opposite to the first stack mover system and the second stack mover system.

24. The modular stack mover system of claim 20, wherein:

an output end of the first mover system and an input end of the second mover system overlap in an overlapping zone;

the output end of the first mover system corresponds to the first end location; and the stack pusher is disposed an end of the overlapping zone adjacent or opposite to the first end location and the stack pusher is oriented to push the vehicle to the second stack mover system.

25. The modular stack mover system of claim 1, wherein the vehicle is a wheeled dolly on which one or more receptacles are stacked.

26. The modular stack mover system of claim 25, further comprising:

a buffer zone between the first stack mover system and the second stack mover system, wherein:

the buffer zone comprises a stack pusher system configured to robotically move the vehicle from the first end location to an input end to the second stack mover system;

the stack pusher system is associated with one or more of the first stack mover system and the second stack mover system; and the stack pusher system pushes the vehicle near the ground such that the stack pusher system engages the vehicle and not the one or more receptacles stacked on the vehicle.

27. The modular stack mover system of claim 1, further comprising:

a buffer zone between the first stack mover system and the second stack mover system, wherein:

the buffer zone comprises a stack pusher system configured to robotically move the vehicle from the first end location to an input end to the second stack mover system;

the stack pusher system comprises:
an actuation device; and
one or more pusher structures;

the actuation device is operatively coupled to at least one of the one or more pusher structures;

the actuation device is configured to actuate a position of the one or more pusher structures between a retracted state and an extended state; and the actuation device is controlled to actuate the position of the one or more pusher structures in connection with loading a payload to a robot workspace.

28. The modular stack mover system of claim 27, wherein:

the one or more pusher structures of the stack pusher system comprises a first pusher structure, one or more intermediate pusher structures, and a payload engagement pusher structure;

when the first pusher structure, the one or more intermediate pusher structures, and the payload engagement pusher structure are collectively in the retracted state, the one or more pusher structures the one or more pusher structures are configured to be in a nested configuration;

in response to being controlled to actuate the position of the one or more pusher structures, the actuation device applies an actuating force to a linear shaft to cause the linear shaft to extend from the retracted state to the extended state; and the linear shaft is coupled to at least one of the first pusher structure, the one or more intermediate pusher structures, and the payload engagement pusher structure such that the actuating force causing the linear shaft to extend to the extended state causes the first pusher structure, the one or more intermediate pusher structures, and the payload engagement pusher structure to sequentially extend from the nested configuration to move to the extended state.

29. The modular stack mover system of claim 27, wherein:

the one or more pusher structures of the stack pusher system are substantially planar elements that extend telescopically to push the vehicle.

30. The modular stack mover system of claim 1, further comprising:

a control computer configured to robotically control the modular stack mover system;

wherein the control computer controls to (i) stop driving the second stack mover system while the first stack mover system is being driven to move the vehicle to the first end location, (ii) drive the first stack mover system to move the vehicle to the first end location, (iii) in response to determining that the vehicle is at the first end location, stop driving the first stack mover system and drive the second stack mover system to move the vehicle to the destination location.

31. A kitting system, comprising:

a modular stack mover system, comprising:
a first stack mover system configured to cause a vehicle to traverse a first path;
a second stack mover system configured to cause the vehicle to traverse a second path;
wherein:
the first stack mover system moves the vehicle from a source location to a first end location; and
the vehicle is retrieved from the first end location and the second mover system moves the vehicle to a destination location;

a stack pusher system configured to insert a stack to the source location, wherein:
the stack pusher system comprises:
an actuation device; and
one or more pusher structures;
the actuation device is operatively coupled to at least one of the one or more pusher structures;
the actuation device is configured to actuate a position of the one or more pusher structures between a retracted state and an extended state; and
the actuation device is controlled to actuate the position of the one or more pusher structures in connection with loading the vehicle to a workspace of the robot arm;

a robot arm configured to perform pick and place operations with respect to items in a workspace; and a control computer configured to robotically control the modular stack mover system, the stack pusher system, and the robot arm in coordination to pick/place items from/to the vehicle.

32. The kitting system of claim 31, wherein the control computer determines a high-level plan for controlling the stack pusher system to insert the vehicle to a workspace of the robot arm, controlling the modular stack mover system to move the vehicle through the workspace, and controlling the robot arm to pick/place items from/to the vehicle while the vehicle is in the workspace.

33. A method, comprising:
   determining, by one or more processors, to move a vehicle inserted into a modular stack mover system;
   in response to determining that the vehicle is inserted into the modular stack mover system, controlling to drive a first motor of a first robotic stack mover system in connection with moving the vehicle from a source location to a first end location;
   determining that the vehicle is at the first end location; and
   in response to determining that the vehicle is at the first end location, controlling to drive a second motor of a second robotic stack mover system in connection with moving the vehicle through a robot workspace to a destination location;
   wherein:
      the first mover system comprises one or more first pusher units configured to engage the vehicle and apply a linear force to the vehicle when the first pusher units are driven by the first mover system;
      the second mover system comprises one or more second pusher units configured to engage the vehicle and apply a linear force to the vehicle when the second pusher units are driven by the second mover system;
      a first pusher unit of the one or more first pusher units engage the vehicle from a first side of a rear of the vehicle;
      the second one or more pusher units engage the vehicle from a second side of the rear of the vehicle that is opposite the first side.

34. A computer program product embodied in a non-transitory computer readable medium and comprising computer instructions for:
   determining, by one or more processors, to move a vehicle inserted into a modular stack mover system;
   in response to determining that the vehicle is inserted into the modular stack mover system, controlling to drive a first motor of a first robotic stack mover system in connection with moving the vehicle from a source location to a first end location;
   determining that the vehicle is at the first end location; and
   in response to determining that the vehicle is at the first end location, controlling to drive a second motor of a second robotic stack mover system in connection with moving the vehicle through a robot workspace to a destination location;
   wherein:
      the first mover system comprises one or more first pusher units configured to engage the vehicle and apply a linear force to the vehicle when the first pusher units are driven by the first mover system;
      the second mover system comprises one or more second pusher units configured to engage the vehicle and apply a linear force to the vehicle when the second pusher units are driven by the second mover system;
      a first pusher unit of the one or more first pusher units engage the vehicle from a first side of a rear of the vehicle;
      the second one or more pusher units engage the vehicle from a second side of the rear of the vehicle that is opposite the first side.

35. A modular stack mover system, comprising:
   a first stack mover system configured to cause a vehicle to traverse a first path;
   a second stack mover system configured to cause the vehicle to traverse a second path; and
   a buffer zone between the first stack mover system and the second stack mover system wherein:
      the first stack mover system moves the vehicle along the first path from a source location to a first end location;
      the vehicle is retrieved from the first end location and the second mover system moves the vehicle along the second path to a destination location;
      the buffer zone comprises a stack pusher system configured to robotically move the vehicle from the first end location to an input end to the second stack mover system; and
      the stack pusher is associated with one of the first stack mover system and the second stack mover system, and not associated with both the first stack mover system and the second stack mover system.

36. A modular stack mover system, comprising:
   a first stack mover system configured to cause a vehicle to traverse a first path;
   a second stack mover system configured to cause the vehicle to traverse a second path; and
   a buffer zone between the first stack mover system and the second stack mover system;
   wherein:
      the first stack mover system moves the vehicle along the first path from a source location to a first end location;
      the vehicle is retrieved from the first end location and the second mover system moves the vehicle along the second path to a destination location;
      the buffer zone comprises a stack pusher system configured to robotically move the vehicle from the first end location to an input end to the second stack mover system;
      the stack pusher system comprises:
         an actuation device; and
         one or more pusher structures;
      the actuation device is operatively coupled to at least one of the one or more pusher structures;
      the actuation device is configured to actuate a position of the one or more pusher structures between a retracted state and an extended state;
      the actuation device is controlled to actuate the position of the one or more pusher structures in connection with loading a payload to a robot workspace.

37. A modular stack mover system, comprising:
   a first stack mover system configured to cause a vehicle to traverse a first path; and
   a second stack mover system configured to cause the vehicle to traverse a second path;
   wherein:
      the first stack mover system moves the vehicle along the first path from a source location to a first end location;
      the vehicle is retrieved from the first end location and the second mover system moves the vehicle along the second path to a destination location;
      in response to a determination that the vehicle is to be moved by the first stack mover system to the first end location, the second stack mover system is controlled to move into a receiving position;

the receiving position corresponds to an orientation in the second stack mover system does not interfere with movement of the vehicle to the first end location; and controlling the second stack mover system to move into the receiving position includes driving a second drive chain to a position according to which second pusher units mounted to the second drive chain do not obstruct movement of the vehicle by the first stack mover system to the first end location.

38. A modular stack mover system, comprising:
a first stack mover system configured to cause a vehicle to traverse a first path, wherein:
   a driving unit comprising a motor;
   a drive chain;
   a tensioning unit that enforces tension of the drive chain; and
   a guide rail traversing a distance between the driving unit and the tensioning unit, wherein:
      the motor is operatively coupled to the drive chain, and the motor is configured to drive the drive chain when the motor is driven;
      the guide rail comprises a channel configured to guide and support the drive chain;
      the driving chain comprises a set of pusher units; and
      the pusher units are respectively configured to engage one or more vehicles inserted to the system, and to cause one or more vehicles to traverse a path having a same direction as a longitudinal direction of the guide rail when the driving chain is driven in response to a control signal from a robotic control system configured to operate the modular stack mover system under robotic control to position said one or more vehicles within reach of a robotic instrumentality to enable the robotic instrumentality to perform a task with respect to the one or more vehicles; and a second stack mover system configured to cause the vehicle to traverse a second path; wherein:
   the first stack mover system moves the vehicle along the first path from a source location to a first end location; and
   the vehicle is retrieved from the first end location and the second mover system moves the vehicle along the second path to a destination location.

39. A modular stack mover system, comprising:
a first stack mover system configured to cause a vehicle to traverse a first path; and
a second stack mover system configured to cause the vehicle to traverse a second path; wherein:
   the first stack mover system moves the vehicle along the first path from a source location to a first end location;
   the vehicle is retrieved from the first end location and the second mover system moves the vehicle along the second path to a destination location;
   the first stack mover system comprises a first drive chain;
   an output end of the first mover system and an input end of the second mover system overlap in an overlapping zone;
   the output end of the first mover system corresponds to the first end location;
   in response to a determination that the vehicle is to be moved by the first stack mover system to the first end location, the second stack mover system is controlled to move into a receiving position; and
   controlling the second stack mover system to move into the receiving position includes driving a second drive chain to a position according to which the one or more second pusher units mounted to the second drive chain do not obstruct movement of the vehicle by the first stack mover system to the overlapping zone.

\* \* \* \* \*